United States Patent
Ikeda et al.

(10) Patent No.: US 9,167,623 B2
(45) Date of Patent: Oct. 20, 2015

(54) COMMUNICATION SYSTEM, COMMUNICATION METHOD, MOBILE TERMINAL, AND MOBILE BASE STATION DEVICE

(75) Inventors: Shinkichi Ikeda, Kanagawa (JP); Takahisa Aoyama, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 185 days.

(21) Appl. No.: 13/818,238

(22) PCT Filed: Sep. 8, 2011

(86) PCT No.: PCT/JP2011/005058
§ 371 (c)(1), (2), (4) Date: Feb. 21, 2013

(87) PCT Pub. No.: WO2012/032783
PCT Pub. Date: Mar. 15, 2012

(65) Prior Publication Data
US 2013/0155959 A1    Jun. 20, 2013

(30) Foreign Application Priority Data
Sep. 9, 2010 (JP) ................. 2010-202515

(51) Int. Cl.
| | |
|---|---|
| H04W 4/00 | (2009.01) |
| H04H 20/71 | (2008.01) |
| G08C 17/00 | (2006.01) |
| H04W 88/08 | (2009.01) |
| H04W 36/14 | (2009.01) |
| H04W 88/02 | (2009.01) |
| H04W 76/02 | (2009.01) |
| H04W 84/12 | (2009.01) |
| H04W 80/02 | (2009.01) |

(52) U.S. Cl.
CPC .............. *H04W 88/08* (2013.01); *H04W 36/14* (2013.01); *H04W 88/02* (2013.01); *H04W 76/02* (2013.01); *H04W 80/02* (2013.01); *H04W 84/12* (2013.01)

(58) Field of Classification Search
USPC ........... 709/328, 311, 312; 370/328, 311, 312
See application file for complete search history.

(56) References Cited

U.S. PATENT DOCUMENTS

2008/0259843 A1 * 10/2008 Cai ............................... 370/328
2009/0245150 A1 * 10/2009 Tsao ............................. 370/311

(Continued)

FOREIGN PATENT DOCUMENTS

JP    2007-104306 A    4/2007

OTHER PUBLICATIONS

Huawei, Impact of Stand-alone L-GW support, [online]. 3GPP TSG SA WG2 Meeting #80 S2-103495, Aug. 30, 2010, [retrieved on Oct. 13, 2011]. Retrieved from the Internet: <URL:http://www.3gpp.org/ftp/tsg_sa/WG2_Arch/TSGS2_80_Brunstad/Docs/S2-103495.zip>.

(Continued)

*Primary Examiner* — Kiet G Tang
(74) *Attorney, Agent, or Firm* — Pearne & Gordon LLP

(57) ABSTRACT

To establish an appropriate communication path of a mobile terminal to a local network in accordance with a connection configuration of a mobile base station. A mobile base station device of the present invention includes: a base station processing unit that receives a connection request from a mobile terminal accommodated by the mobile base station device; and a switching processing unit that switches connection of the mobile terminal to a local network to either of local IP connection or remote IP connection, in accordance with backhaul media to which the mobile base station device is connected, based on the connection request from the mobile terminal.

3 Claims, 40 Drawing Sheets

(56) References Cited

U.S. PATENT DOCUMENTS

2011/0243053 A1* 10/2011 Tinnakornsrisuphap et al. .............................. 370/312
2013/0235801 A1* 9/2013 Parsons et al. ................ 370/328

OTHER PUBLICATIONS

Cdma2000 Femtocell Network: Packet Data Network Aspects, [online]. 3GPP2 X.S0059-100-0, Jan. 2010, pp. 14-25, [retrieved on Oct. 13, 2011] Retrieved from the Internet:<URL:http://www.3gpp2.org/public_html/specs/X.S0059-100-0-v1.0-100216.pdf>.

TR23.829; "Local IP Access and Selected IP Traffic Offload, Release-10".

TR36.806; "Evolved Universal Terrestrial Radio Access (E-UTRA); Relay architectures for E-UTRA (LTE-Advanced)" Release-9.

TR23.401; "General Packet Radio Service (GPRS) enhancements for Evolved Universal Terrestrial Radio Access Network (E-UTRAN) access" Release-9.

TR23.60; "General Packet Radio Service (GPRS); Service Description; Stage 2" Release-10.

International Search Report for Application PCT/JP2011/005058 dated Oct. 25, 2011.

* cited by examiner

COMMUNICATION SYSTEM, COMMUNICATION METHOD, MOBILE TERMINAL, AND MOBILE BASE STATION DEVICE

TECHNICAL FIELD

The present invention relates to a communication system, a communication method, a mobile terminal, and a mobile base station device for connecting a mobile terminal accommodated in a mobile base station to a local network through an appropriate path.

BACKGROUND ART

As a measure for expanding the coverage of a cellular communication system, the introduction of femto base stations that form cells for covering narrow areas such as residential houses, schools, and enterprises has proceeded. Further, expectation for local IP access services to be connected to local networks utilized through femto base stations managed by homes, schools, enterprises and the like has increased. This is expectation for the high level of QoS guarantee and security according to the use of cellular technology, as compared to local network connection using a wireless LAN in the related art.

The local network connection through the femto base station has been studied in standard-setting organizations that formulate cellular standard technology. Particularly, in 3GPP (3rd Generation Partnership Project), as local IP access (LIPA), the formulation of network architecture, procedures, and protocols have proceeded (Non Patent Literature 1).

Non Patent Literature 1 discloses a method of causing a mobile terminal to specify an access point name (hereinafter, referred to as an APN) as an identifier indicating a local network (hereinafter, also referred to as a LIPA network) serving as a connection destination and performing local IP access (LIPA).

Here, a use case (remote access to a local network; hereinafter, also referred to as Remote IP Access or RIPA) is considered in which secure connection to a local network is performed from the outside of home, schools, or enterprises using a femto base station.

The femto base station installed in home is connected to a core network of an operator through a broadband channel. When a cable for connection to the broadband channel is detached, the femto base station is connected to a neighboring macro base station through a cellular channel to establish connection to a core network, and maintains the connection of the mobile terminal located down the femto base station. In this manner, technology for expanding the coverage of a cellular communication system using the cellular channel is particularly called relay technology (or mobile relay technology). The relay technology in 3GPP has been examined in TR36.806.

As mentioned above, when the mobile terminal accommodated in a moving femto base station (hereinafter, referred to as the mobile base station) moves together with the mobile base station, the movement thereof in the cellular system is hidden. That is, when seen from the mobile terminal, the high-position base station does not change and thus the movement is not detected. Therefore, a mobility management process (Tracking Update Procedure specified in TS23.401, Location Update Procedure specified in TS23.060, or the like) or a handover process is not performed. Thereby, when the mobile base station accommodates a plurality of mobile terminals, it is characterized by being capable of reducing mobility management signaling from individual mobile terminals, and reducing traffic costs. However, as previously stated, the connection to a local network is performed by the explicit specification of the mobile terminal, and it is assumed that the switching of the LIPA and RIPA is also performed by the reconnection of the mobile terminal or a handover process.

Based on these factors, in an environment in which the mobile base station accommodates the mobile terminal, the mobile terminal cannot detect its own movement, and thus there is a problem in that the connection to the local network cannot be correctly switched at the time of the movement associated with the mobile base station. That is, there is a problem in that the movement along with the mobile base station causes a communication session to be cut off unexpectedly, and user convenience is considerably damaged. In order to solve such problems, a method of causing the mobile base station to establish a secure tunnel such as a home gateway and a VPN (Virtual Private Network) at home, and collectively accommodating the local network connection of the mobile terminal located down the mobile base station is considered.

CITATION LIST

Non Patent Literature

Non Patent Literature 1; TR23.829; "Local IP Access and Selected IP Traffic Offload, Release-10"

SUMMARY OF INVENTION

Technical Problem

However, in relay technology disclosed in TR36.806, it is not possible to establish a VPN tunnel in which the mobile base station functioning as a relay node is used as an endpoint. This will be described below.

TR36.806 discloses two methods for realizing the mobile base station. A first method is to establish PDN connection similarly to a mobile terminal (user equipment; referred to as UE) in the related art, and accommodate the PDN connection of the mobile terminal (UE) thereon. The PDN connection is connection to a public data network (PDN). In this case, the PDN to which the mobile base station is connected is to be used for routing UE traffic within the core network, and external reachability of the Internet or the like is not required originally.

Further, the PDN to which the mobile base station is connected causes UE traffic to reach an external network such as the Internet, thereby leading to the transfer of unnecessary packets (for example, malicious packets), and thus there is a concern of a security level being degraded. The relay base station is originally operator equipment. Direct communication of the relay base station with the external network lowers the security level, and thus it is considered that the relay base station is not implemented as an operator that manages a mobile base station.

In addition, a second method is to establish only a wireless bearer between a mobile base station functioning as a relay node and a macro base station that accommodates the mobile base station, and accommodate UE traffic. In this case, the mobile base station does not establish PDN connection, and thus has no IP address. That is, the mobile base station is not able to establish a VPN tunnel on an IP network.

An object of the present invention is to provide a communication system, a communication method, and a mobile terminal and a mobile base station device used in the communication method which are capable of establishing an appropriate communication path of the mobile terminal to a local network in accordance with the connection configuration of a mobile base station.

Solution to Problem

The present invention provides a mobile base station device, including: a base station processing unit that receives a connection request from a mobile terminal accommodated by the mobile base station device; and a switching processing unit that switches connection of the mobile terminal to a local network to either of local IP connection or remote IP connection, in accordance with backhaul media to which the mobile base station device is connected, based on the connection request from the mobile terminal.

Moreover, the mobile base station device further includes: a first communication unit that controls a communication with the local network; a second communication unit that controls a communication with a macro base station; and a third communication unit that controls a communication with the mobile terminal, and when the base station processing unit receives the connection request from the mobile terminal through the third communication unit, the switching processing unit switches the connection of the mobile terminal to the local network to the local IP connection when the backhaul media is the first communication unit, and switches the connection of the mobile terminal of the local network to the remote IP connection when the backhaul media is the second communication unit.

The present invention also provides a communication system, including: a mobile base station device which is capable of accommodating a plurality of mobile terminals including a mobile terminal in an active mode and a mobile terminal in an idle mode, and connectable to a local network; and an MME which is connected to a core network, and performs management of states and mobility of the plurality of mobile terminals, wherein the mobile base station device switches connection of the mobile terminals to a local network to either of local IP connection or remote IP connection, in accordance with backhaul media to which the mobile base station device is connected, based on a connection request from the mobile terminal in the active mode, and the MME manages a state and mobility of the mobile terminal in the idle mode, based on a bearer modification command of the mobile terminal in the idle mode which is identified by a local gateway.

The present invention also provides a communication system, including: a mobile base station device which is capable of accommodating a plurality of mobile terminals including a mobile terminal in an active mode and a mobile terminal in an idle mode, and connectable to a local network through a local gateway; and an MME which is connected to a core network, and performs management of states and mobility of the plurality of mobile terminals, wherein the local gateway detects disconnection of the mobile base station device from the local network based on a response reception from the mobile base station device, to identify the plurality of mobile terminals accommodated in the mobile base station device, and transmits a bearer modification request of the plurality of identified mobile terminals to the MME, and based on the bearer modification request of the plurality of mobile terminals received from the local gateway, the MME performs the bearer modification request to the mobile base station device with respect to the mobile terminal in the active mode, and does not perform the bearer modification request to the mobile base station device with respect to the mobile terminal in the idle mode.

The present invention also provides a communication system, including: a mobile base station device which is capable of accommodating a plurality of mobile terminals including a mobile terminal in an active mode and a mobile terminal in an idle mode, and connectable to a local network; and an MME which is connected to a core network, and performs management of states and mobility of the plurality of mobile terminals, wherein when it is detected that a backhaul media is switched, the mobile base station device transmits identification information of the mobile base station device included in a bearer release command message established by the plurality of accommodated mobile terminals, to the MME, and the MME identifies the plurality of mobile terminals having a bearer established, based on the identification information of the mobile base station device, and performs management of states and mobility of the plurality of identified mobile terminals.

The present invention also provides a communication system, including: a mobile base station device which is capable of accommodating a plurality of mobile terminals including a mobile terminal in an active mode and a mobile terminal in an idle mode, and connectable to a local network; and an MME which is connected to a core network, and performs management of states and mobility of the plurality of mobile terminals, wherein when it is detected that a backhaul media is switched, the mobile base station device transmits identification information of the mobile base station device included in a bearer modification request established by the plurality of mobile terminals, to the MME, and the MME identifies the plurality of mobile terminals having a bearer established based on the identification information of the mobile base station device, wherein the MME performs the bearer modification request to the mobile base station device with respect to the mobile terminal in the active mode, and does not perform the bearer modification request to the mobile base station device with respect to the mobile terminal in the idle mode based on the bearer modification request of the plurality of mobile terminals received from a local gateway.

The present invention also provides a mobile terminal, including: a wireless communication unit that performs a process for connection to a mobile base station device; a control unit that controls a communication through the mobile base station device; and an application unit that causes an application to work, the application performing a communication by established communication connection, wherein the control unit switches connection of a local network to either of local IP connection or remote IP connection, based on a bearer release command from the mobile base station device based on switching of backhaul media which is received through the wireless communication unit, and the application unit that causes an application to work, the application performing a communication by either communication connection of the local IP connection or the remote IP connection switched.

The present invention also provides a communication method for switching connection of a mobile terminal accommodated in a mobile base station device to a local network, the communication method including: a step of transmitting a connection request to the local network from the mobile terminal to the mobile base station device; and a step of switching the connection of the mobile terminal to the local network to either of local IP connection or remote IP connection, in accordance with backhaul media to which the mobile base station device is connected, based on the connection request to the local network from the mobile terminal.

Advantageous Effects of Invention

According to the communication system, a communication method, a mobile terminal, and a mobile base station device of the present invention, the connection path of the mobile terminal to the local network is switched to any of direct connection or remote connection in accordance with the connection configuration of the mobile base station, thereby allowing an appropriate communication path of the mobile terminal to be established. Further, even when the mobile terminal is accommodated in the mobile base station and the movement thereof within the communication system is hidden, it is possible to prevent local network connection from being cut off unexpectedly, and to secure user convenience.

DESCRIPTION OF EMBODIMENTS

Hereinafter, embodiments of the present invention will be described with reference to the accompanying drawings.

First Embodiment

In a communication system according to the present embodiment, a mobile base station functioning as a relay node detects the movement of a mobile terminal by the update of a backhaul of the mobile base station, promotes reconnection by disconnecting a LIPA connection of the mobile terminal at that timing, and correctly controls a path during the reconnection in accordance with the type of backhaul media. For this reason, according to the communication system of the present embodiment, a path connection to a local network of the mobile terminal is switched to any of direct connection or remote connection in accordance with the connection configuration of the mobile base station, thereby allowing an optimum communication path of the mobile terminal to be established.

<Communication System Configuration>

Figure 1:
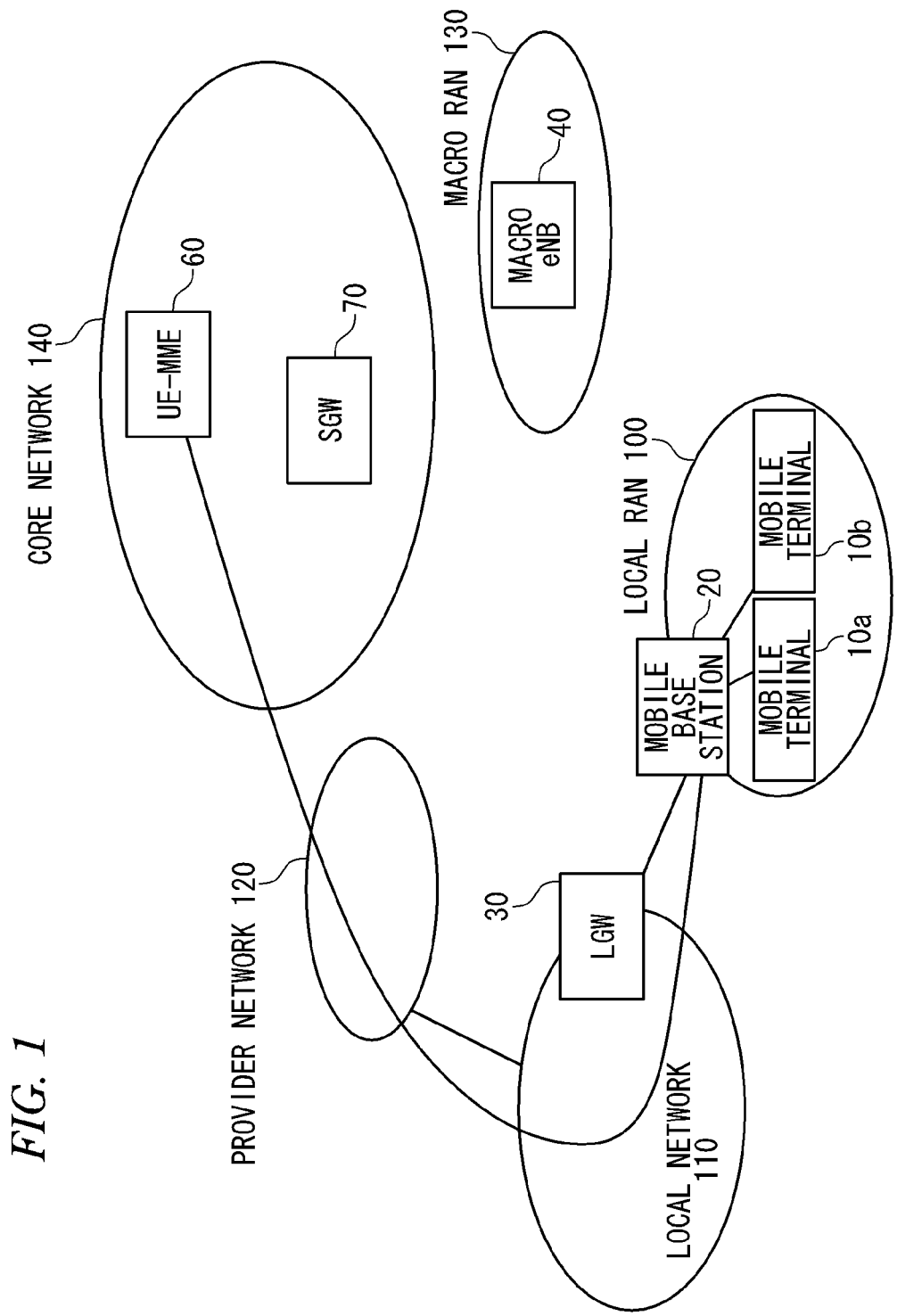
FIG. 1 is a diagram illustrating a configuration of a communication system according to a first embodiment.

FIG. 1 is a diagram illustrating a configuration of the communication system according to the first embodiment of the present invention. The communication system shown in FIG. 1 includes a plurality of mobile terminals (UE) 10a and 10b (hereinafter, referred to as the mobile terminals 10a and 10b) which are connected to a local RAN 100, a mobile base station 20 that forms the local RAN 100, a local gateway (LGW) 30 (hereinafter, referred to as the LGW 30) functioning as a gateway at the time of LIPA connection to a local network 110 via the mobile base station 20, a macro base station eNB 40 (hereinafter, referred to as the macro eNB 40) which is connected to a macro RAN 130, a UE-MME 60 which is connected to a core network 140, a serving gateway (SGW) 70 (hereinafter, referred to as the SGW 70) which is connected to the core network 140, the local network 110, a provider network 120, the macro RAN 130, and the core network 140 of an operator. Meanwhile, although not shown in FIG. 1, an RN-MME 50 which is a mobility management entity (MME) of a relay node is included within the core network 140 (see FIG. 2).

Meanwhile, in the communication system according to the first embodiment, it is assumed that all the mobile terminals 10a and 10b are in an active mode.

In FIG. 1, the mobile base station 20 is directly connected to the local network 110. In addition, the mobile terminals 10a and 10b are LIPA-connected to the local network 110 through the mobile base station 20 and the LGW 30. The UE-MME 60 is a mobility management entity (MME) of the mobile terminals 10a and 10b, and performs the management of the states and mobility of the mobile terminals 10a and 10b.

Figure 2:
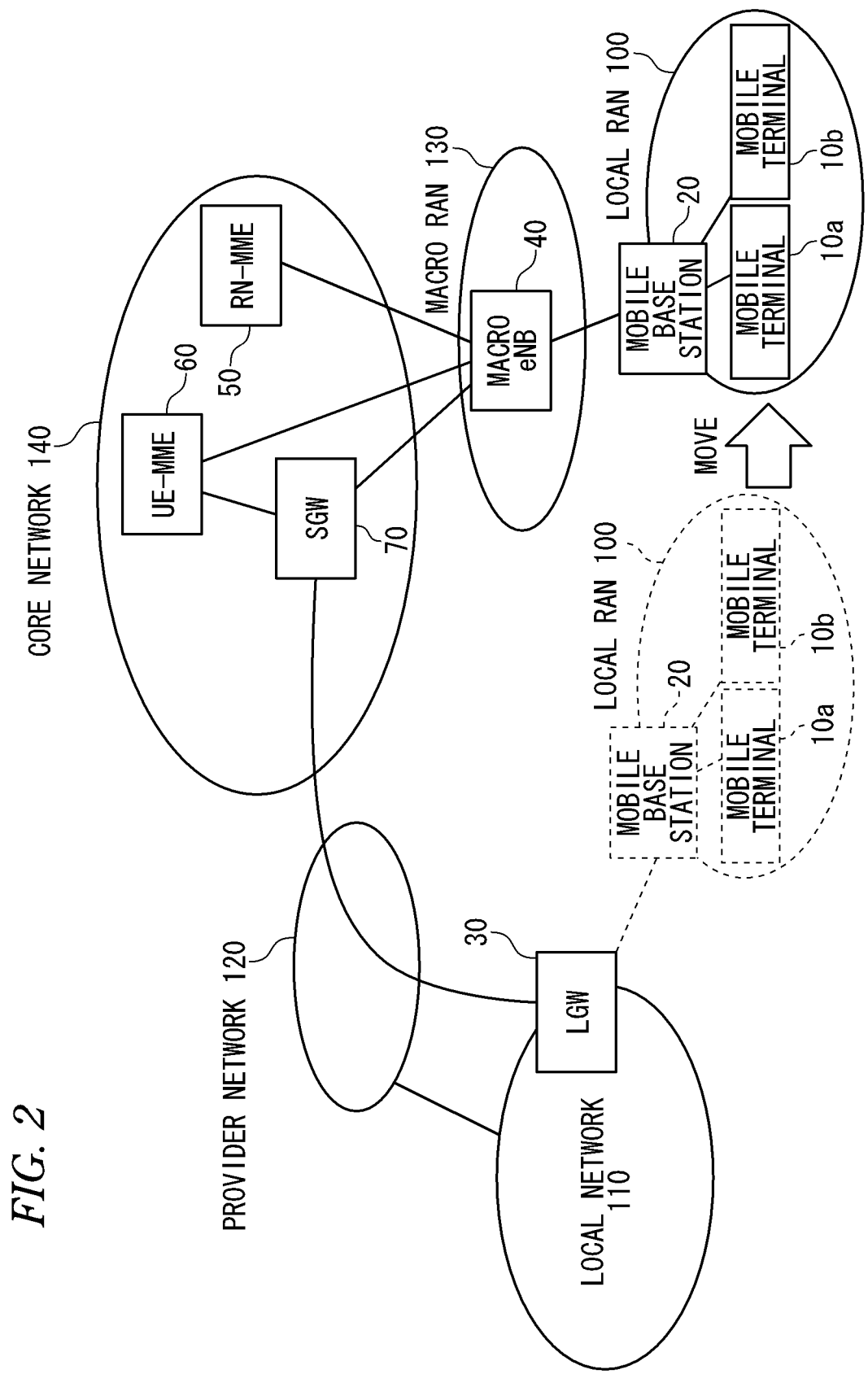
FIG. 2 is a diagram illustrating a state of the communication system according to the first embodiment.

FIG. 2 is a diagram illustrating a state of the communication system according to the first embodiment, and particularly, shows a state of the communication system when the mobile base station 20 is disconnected from the local network 110, and is connected to the macro eNB 40 of the macro RAN 130.

As shown in FIG. 2, the mobile base station 20 is connected to the macro eNB 40, and establishes a wireless bearer under management of the RN-MME 50. The mobile terminals 10a and 10b are connected to the LGW 30 through the mobile base station 20 and the SGW 70, and establish RIPA connection to the local network 110.

<System Operation>

Figure 3:
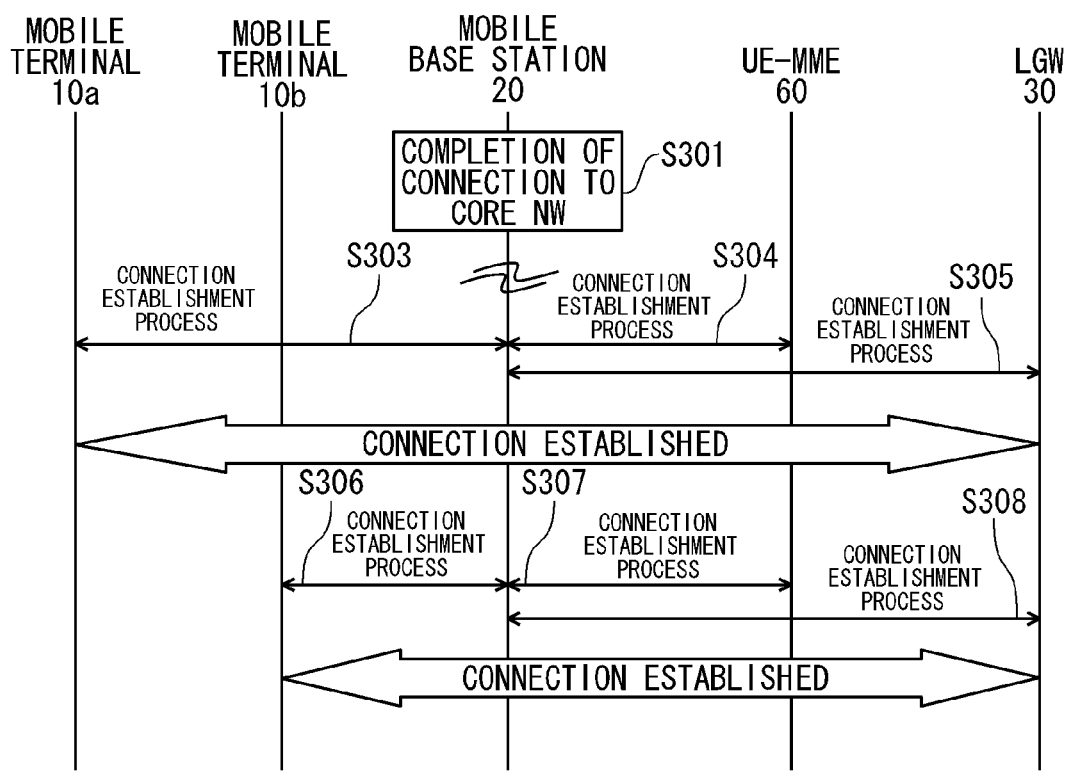
FIG. 3 is a connection sequence diagram of mobile terminals 10a and 10b according to the first embodiment.
Figure 4:
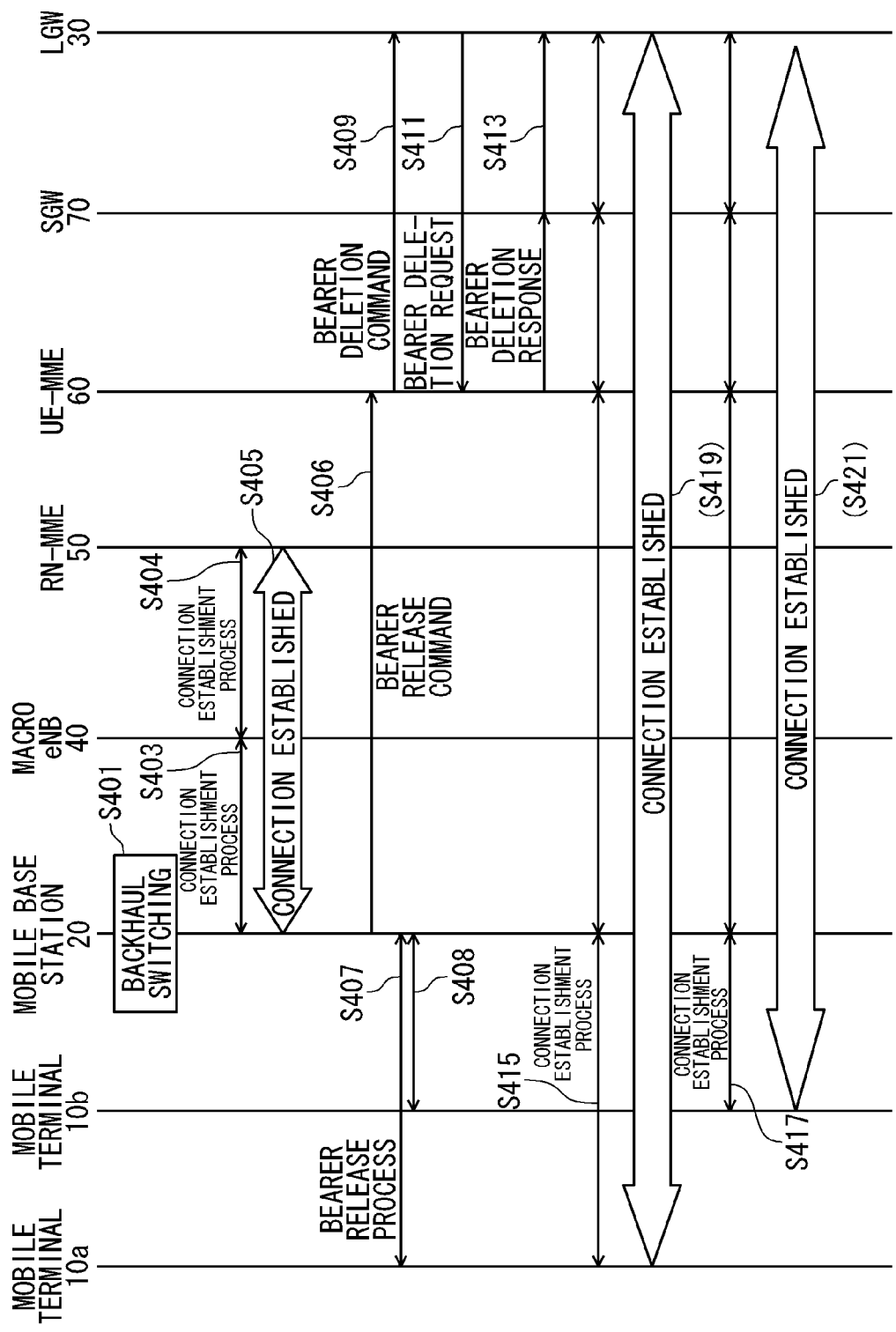
FIG. 4 is a sequence diagram (1) illustrating a bearer release command.
Figure 5:
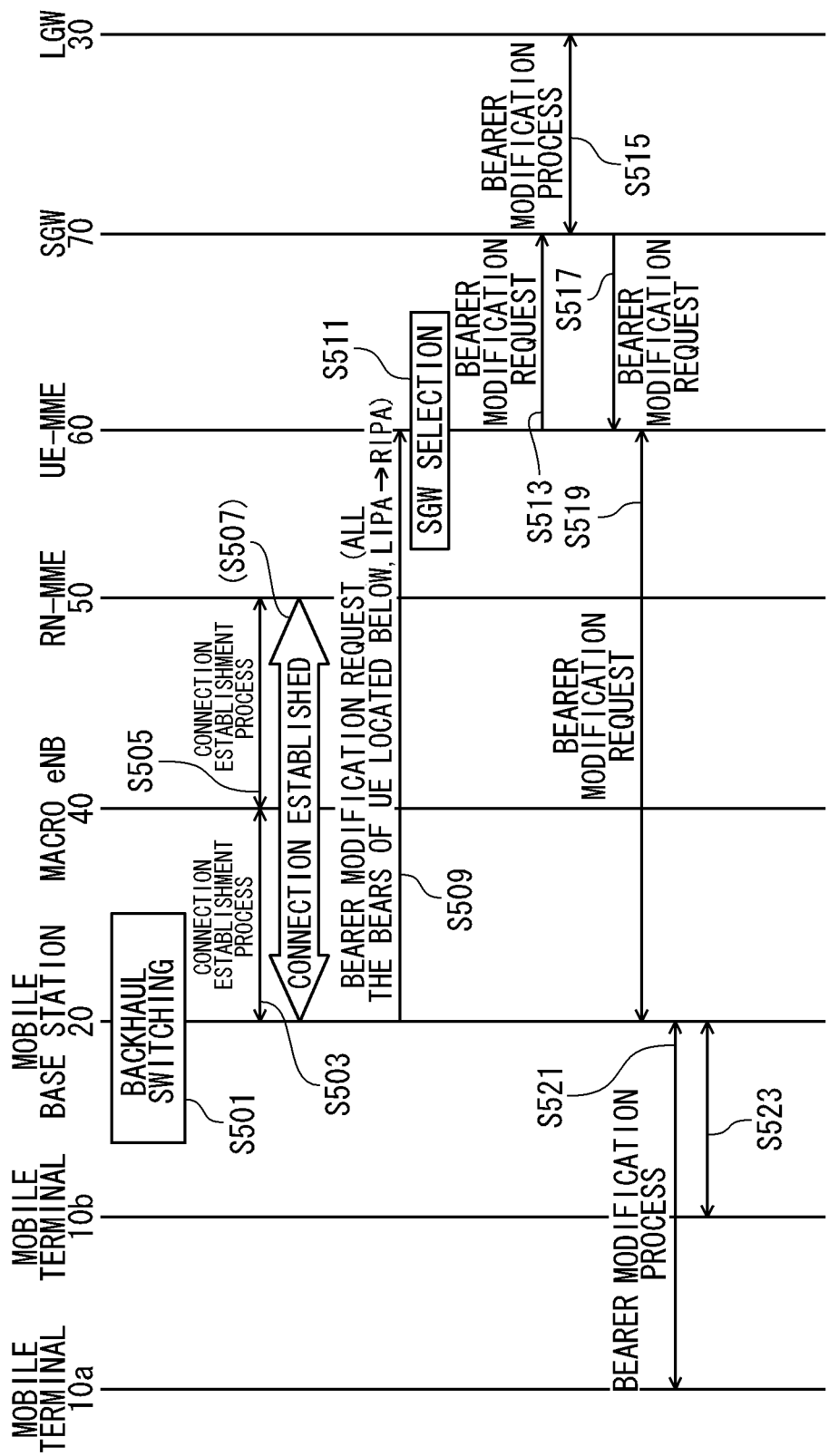
FIG. 5 is a sequence diagram (1) illustrating a bearer modification command.

Operations relating to the communication system shown in FIGS. 1 and 2 will described with reference to FIGS. 3 to 5. FIG. 3 is a diagram illustrating a connection sequence of the mobile terminals 10a and 10b in the configuration of the communication system shown in FIG. 1. FIG. 4 is a sequence diagram (1) illustrating a bearer release command. FIG. 5 is a sequence diagram (1) illustrating a bearer modification command.

As shown in FIG. 3, prior to the connection of the mobile terminals 10a and 10b, the mobile base station 20 secures the connectivity to the core network 140 via the local network 110 and the provider network 120 (step S301: completion of connection to core NW). Specifically, the mobile base station 20 establishes secure connection to the core network 140 using a protocol such as PPPoE.

Subsequently, the mobile terminal 10a starts a connection establishment process. When the mobile terminal 10a transmits a connection request to the mobile base station 20, the mobile base station 20 transfers the connection request to the UE-MME 60, and after this, the process is performed based on an initial connection procedure disclosed in TR23.829 (steps S303 to S305: connection establishment process). Communication connection for LIPA (for example, PDN connection or PDP context) is established between the mobile terminal 10a and the LGW 30. Similarly to the mobile terminal 10a, the mobile terminal 10b establishes the communication connection for LIPA between the mobile terminal 10b and the LGW 30 (steps S306 to S308: connection establishment process).

Next, reference will be made to FIG. 4 to describe a method of commanding bearer release and a method of commanding bearer modification, with respect to a switching sequence of local network connection when the mobile base station 20, and the local RAN 100 including the mobile terminals 10a and 10b move and are accommodated in the macro eNB 40.

FIG. 4 is a sequence diagram illustrating a method of commanding bearer release. The mobile base station 20 detects the switching of a backhaul (step S401: backhaul switching). The backhaul of the mobile base station 20 uses a wired LAN or a wireless LAN such as Ethernet (registered trademark), a wireless PAN (Personal Area Network), and communication media such as a millimeter-wave communication link, when being connected to the local network 110. In addition, the mobile base station 20 uses a cellular channel when being connected to the macro RAN 130. Here, it is detected that the backhaul of the mobile base station 20 is switched, for example, from a wired LAN to a cellular channel.

Meanwhile, as mentioned above, the mobile base station 20 may detects that the backhaul of the mobile base station 20 is actually switched. In addition, the mobile base station 20 may determine that the backhaul of the mobile base station 20 is switched by receiving a signal that commands the switching of the backhaul of the mobile base station 20. It is considered that the signal commanding the switching of the backhaul of the mobile base station 20 is, for example, a switching command signal which is input through a screen or a button by a user, a switching command signal which is remotely input, or the like. At that time, further, when the mobile base station 20 determines that the backhaul of the mobile base station 20 is switched in a point of time when the connectivity of backhaul media of a switching destination is confirmed, the mobile base station 20 can switch the backhaul media accurately by preventing false detection.

When the backhaul switching to a cellular channel is detected, the mobile base station 20 performs a connection establishment process to the RN-MME 50 through the macro eNB 40 (steps S403 and S404: connection establishment process), and establishes communication connection for accommodating UE traffic (step S405: connection established). Detailed operations for establishing the communication connection can use, for example, a procedure as disclosed in TR36.806.

In step S405, when the connection for accommodating UE traffic is established, the mobile base station 20 transmits a bearer release command for a bearer established by the mobile terminals 10a and 10b to be accommodated, to the UE-MME 60, based on bearer context information to be held (step S406: bearer release command). Here, the bearer established by the mobile terminals 10a and 10b to be accommodated indicates, for example, an EPS bearer, a PDN connection, a PDP context, a radio bearer, and the like.

Simultaneously with step S406, the mobile base station 20 performs a release process of a relevant bearer (particularly, wireless bearer) on the mobile terminals 10a and 10b (steps S407 and S408: bearer release process).

Meanwhile, in step S406, the mobile base station 20 may issue a bearer release command for each bearer. In addition, the mobile base station 20 may issue a bearer release command for each mobile terminal, or for each PDN connection or PDP context. Further, the mobile base station 20 may issue bearer release commands to all the bearers collectively. Thereby, the mobile base station 20 can reduce signaling traffic.

The UE-MME 60 receiving the bearer release command through step S406 transfers a bearer deletion command to the LGW 30 (step S409: bearer deletion command). The LGW 30 then releases a context for the commanded bearer, and transmits a bearer deletion request to the UE-MME 60 (step S411: bearer deletion request). The UE-MME 60 releases the context of the commanded bearer and then transmits a bearer deletion response to the LGW 30 (step S413: bearer deletion response). The bearer release process is then completed. Meanwhile, when the SGW 70 is allocated to the LIPA connection of the mobile terminals 10a and 10b, the SGW 70 is also involved in a bearer deletion process between the UE-MME 60 and the LGW 30.

The mobile terminals 10a and 10b releasing a bearer constituting the RIPA connection performs a reconnection establishment process (steps S415 and S417: connection establishment process). At this time, the mobile terminals 10a and 10b specify an access point name (APN) for LIPA again and performs reconnection. This is because the mobile terminals 10a and 10b do not detect their own movement, and recognize that continuous LIPA to a local network is possible.

By receiving the reconnection of the mobile terminals 10a and 10b, the mobile base station 20 performs rewriting to an access point name (APN) for RIPA, or adds information that commands switching to the access point name (APN) for RIPA to connection request messages from the mobile terminals 10a and 10b, and causes the UE-MME 60 to continue the reconnection establishment process of the mobile terminals 10a and 10b. Here, it is considered that the information, added to the connection request messages from the mobile terminals 10a and 10b, which commands switching to the access point name (APN) for RIPA is, for example, an access point name (APN) for RIPA and a switching command flag, or an access point name (APN) for RIPA.

By receiving the continuation of the reconnection establishment process of the mobile terminals 10a and 10b, the UE-MME 60 selects the SGW 70 for connection to the access point name (APN) for RIPA, that is, connection to the LGW 30, allocates the SGW to the mobile terminals 10a and 10b, and establishes connection for RIPA (steps S419 and S421: connection established).

Meanwhile, the mobile base station 20 may notify the mobile terminals 10a and 10b of the access point name (APN) for RIPA during the bearer release process. In addition, the mobile base station 20 may notify the mobile terminals 10a and 10b of information (for example, flag) that promotes connection to the access point name (APN) for RIPA during the bearer release process. By receiving this, the mobile terminals 10a and 10b specify the access point name (APN) for RIPA and perform the reconnection establishment process. Thereby, the mobile base station 20 checks the connection request messages from the mobile terminals 10a and 10b one by one, thereby allowing a load of replacement with the access point name (APN) for RIPA to be reduced. In addition, thereby, it is possible to reduce a load of the mobile base station 20 commanding the UE-MME 60 to perform switching to the access point name (APN) for RIPA. Particularly, it is effective in the reduction of a system load of the communication system in which a plurality of mobile terminals (UE) are accommodated.

A sequence illustrating a method of commanding bearer modification will be described with reference to FIG. 5. FIG. 5 is a sequence diagram (1) illustrating a method of commanding bearer modification.

As shown in FIG. 5, when the mobile base station 20 detects backhaul switching (step S501: backhaul switching), and establishes a connection for accommodating UE traffic (step S503, 505: connection establishment process, and step S507: connection established), the mobile base station transmits a bearer modification request message for a bearer established by the mobile terminals 10a and 10b to be accommodated, to the UE-MME 60, based on bearer context information to be held (step S509: bearer modification request). Here, the bearer established by the mobile terminals 10a and 10b to be accommodated indicates an EPS bearer, a PDN connection, a PDP context, a radio bearer, and the like.

The mobile base station 20 commands the switching of a connection destination of a bearer to be targeted from the access point name (APN) for LIPA to the access point name (APN) for RIPA, in the bearer modification request message. For example, the mobile base station 20 may add the access point name (APN) for RIPA to the bearer modification request message. In addition, the mobile base station 20 may explicitly add information (for example, flag) that commands the switching of an access point name (APN) to the bearer modification request message.

Meanwhile, the mobile base station 20 may issue the bearer modification request message for each bearer. In addition, the mobile base station 20 may issue the bearer modification request message for each mobile terminal, or for each PDN connection/PDP context. Further, the mobile base station 20 may collectively issue the bearer modification request message to all the bearers, thereby allowing the mobile base station 20 to reduce signaling traffic.

The UE-MME 60 receiving a bearer modification request selects and allocates the SGW 70 for connection to the access point name (APN) for RIPA (step 511: SGW selection), and transmits the bearer modification request message to which a contact address or the like of the LGW 30 is added, to the SGW 70 (step S513: bearer modification request).

The SGW 70 receiving the bearer modification request message generates a bearer context of the mobile terminals 10a and 10b to be targeted, and transfers the bearer modification request message to the LGW 30. By receiving this, the LGW 30 corrects (for example, contact address or the like of the SGW 70) a bearer context of the mobile terminals 10a and 10b to be targeted, in a bearer modification process, and transmits a bearer modification response message to the SGW 70 (step S515: bearer modification process). When the generation/update of the bearer context is completed, the SGW 70 transmits the bearer modification response message to the UE-MME 60 (step S517: bearer modification response).

The UE-MME 60 updates the bearer context of the mobile terminals 10a and 10b to be targeted, and transmits the bearer modification response message to the mobile base station 20 (step S519: bearer modification response). The mobile base station 20 performs the bearer modification process of updating a wireless bearer (particularly, QoS parameter or the like) of the mobile terminals 10a and 10b, based on the received bearer modification response message (steps S521 and S523: bearer modification process).

Meanwhile, when gateways derived from the access point name (APN) for LIPA and the access point name (APN) for RIPA are different from each other, relocation from the LGW 30 to a PDN gateway (PGW) for RIPA, or relocation from the PDN gateway (PGW) for RIPA to the LGW 30 may be performed.

In addition, in a connection establishment process via the mobile base station 20, messages exchanged between the UE-MME 60 and the LGW 30 are not necessarily required to be routed through the mobile base station 20. This is applied particularly to a case where the LGW 30 is connected directly to a core network. Specifically, when the LGW 30 establishes a secure tunnel (for example, VPN) with an external connection device (for example, VPN gateway) on the core network through a provider network, messages can be exchanged directly with the core network device such as the UE-MME 60 or the SGW 70. Thereby, it is possible to reduce a load due to a message process of the mobile base station 20.

In addition, in the above description, the mobile terminals (UE) 10a and 10b specify an APN for LIPA or an APN for RIPA. However, the mobile terminals do not specify, particularly, the APN for LIPA or the APN for RIPA, but may add an indicator that specifies LIPA or RIPA, in addition to a general APN in the related art. Thereby, it is not necessary to generate and manage a large number of APNs, and thus it is possible to reduce a process load of the network device (for example, UE-MME 60, SGW 70, or LGW 30) in the connection management of the mobile terminals (UE) 10a and 10b.

<Configuration and Operation of Mobile Base Station Device>

Figure 6:
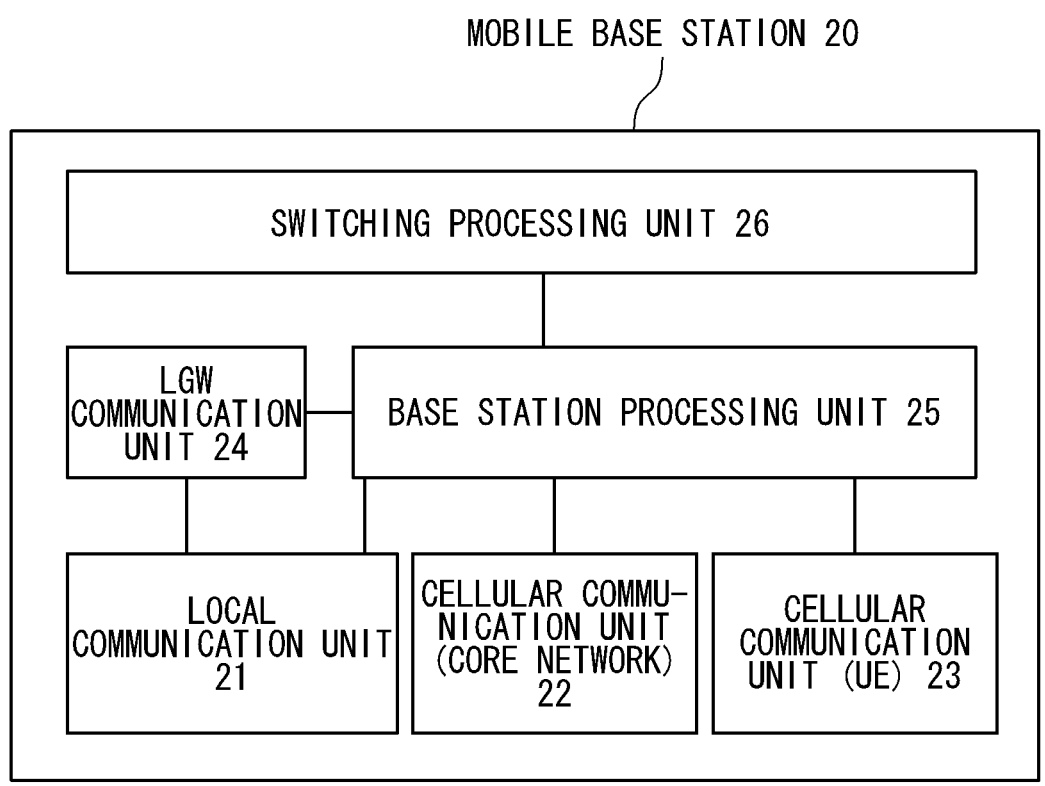
FIG. 6 is a block diagram illustrating a configuration of a mobile base station 20 according to the first embodiment.

Next, a configuration of the mobile base station 20 will be described with reference to FIG. 6. FIG. 6 is a block diagram illustrating a configuration of the mobile base station 20 according to the first embodiment. The mobile base station 20 shown in FIG. 6 includes a local communication unit 21 that controls communication with the local network 110, a cellular communication unit (core network) 22 that controls communication of the macro RAN 130 with the macro eNB 40, a cellular communication unit (UE) 23 that controls communication with the mobile terminals 10a and 10b to be accommodated, an LGW communication unit 24 that controls communication with the LGW 30 through the local communication unit 21, a base station processing unit 25 that performs a process for accommodating the mobile terminals 10a and 10b through all the communication units (local communication unit 21, cellular communication unit (core network) 22, cellular communication unit (UE) 23, and LGW communication unit 24), and a switching processing unit 26 that performs a connection switching process. Here, the local communication unit 21 is equivalent to, for example, a communication interface (communication device) for connection to a communication link such as a wired LAN or a wireless LAN.

Figure 7:
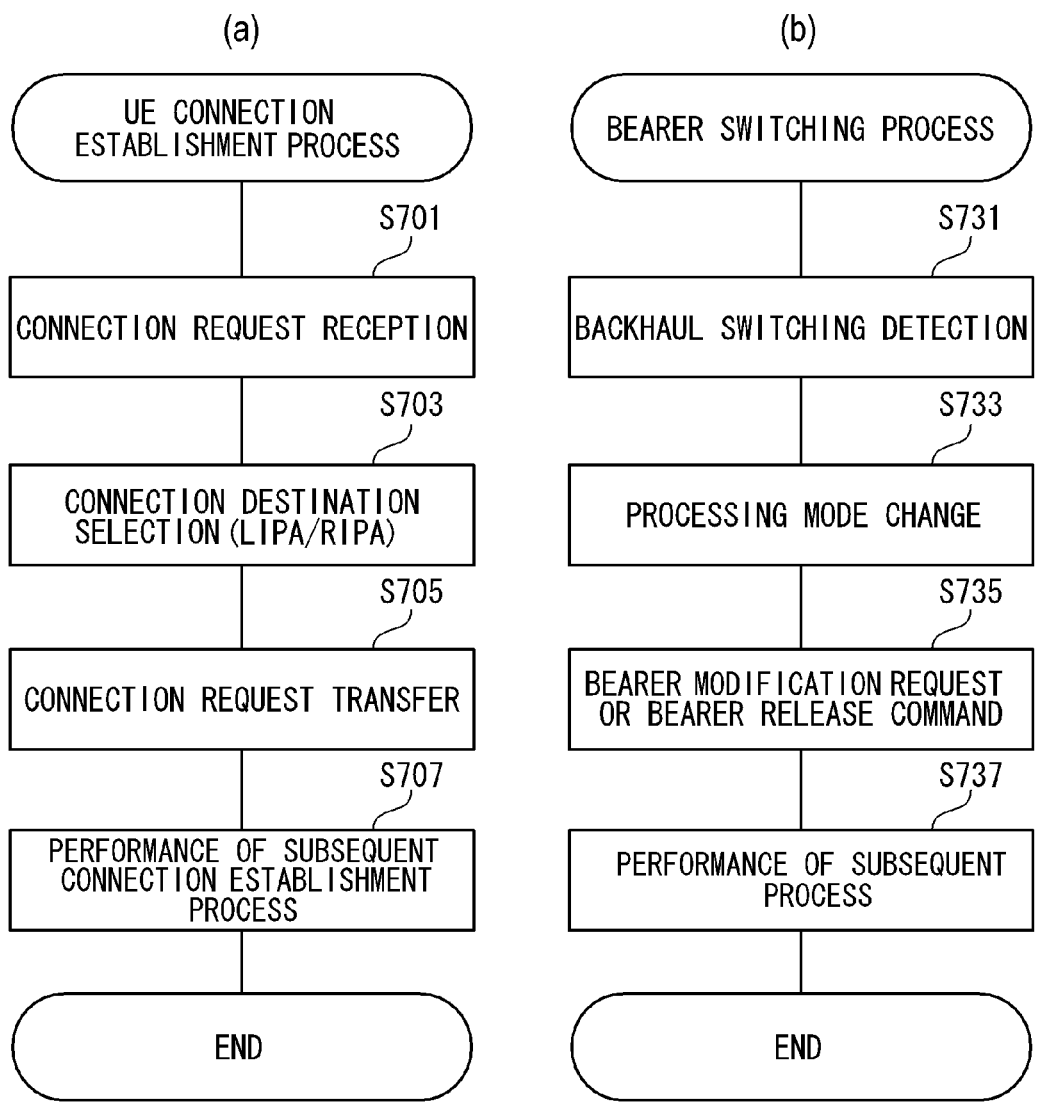
FIG. 7(a) is a flow diagram illustrating a "UE connection establishment process" of the mobile base station 20 according to the first embodiment.
FIG. 7(b) is a flow diagram illustrating of a "bearer switching process" of the mobile base station 20 according to the first embodiment.

Here, operations of the mobile base station 20 shown in FIG. 6 will be described with reference to FIGS. 7(a) and 7(b). FIG. 7(a) is a flow diagram illustrating a "UE connection establishment process" of the mobile base station 20 for performing a connection establishment process of the mobile terminal (UE) to the local network, and FIG. 7(b) is a flow diagram illustrating a "bearer switching process" of the mobile base station 20 for performing bearer switching of the UE.

In the flow diagram of a "UE connection establishment process" shown in FIG. 7(a), when the base station processing unit 25 receives a connection request from the mobile terminals 10a and 10b through the cellular communication unit (UE) 23 (step S701: connection request reception), the base station processing unit 25 notifies the switching processing unit 26 of that effect.

The switching processing unit 26 selects a connection destination based on a backhaul media used when a notification is received from the base station processing unit 25 (step S703: connection destination selection). That is, when the backhaul media is the local communication unit 21, the switching processing unit 26 selects local IP access (LIPA). When the backhaul media is the cellular communication unit (core network), the switching processing unit 26 selects remote access (RIPA) to the local network.

Subsequently, as the access point name (APN) equivalent to the selected connection destination, the access point name (APN) for LIPA or the access point name (APN) for RIPA) is added to the connection request message of the mobile terminals 10a and 10b (or overwritten to the access point name (APN) which is written in the connection request message), and is transferred to the UE-MME 60 through the base station processing unit 25, and the backhaul media (cellular communication unit (core network) 22 or local communication unit 21) (step S705: connection transfer request). Afterward, the base station processing unit 25 performs an operation required for the connection establishment process of the mobile terminals 10a and 10b, such as a process of the message received from each communication unit (step S707: performance of subsequent connection establishment process).

In the flow diagram of a "bearer switching process" shown in FIG. 7(b), when the switching processing unit 26 detects that the switching of the backhaul media is performed (or switching is required) (step S731: backhaul switching detection), the switching processing unit 26 selects, as a processing mode of the base station processing unit 25, any one mode of (1) a mode operating as the femto base station by connection through the communication media such as a wired/wireless LAN, or (2) a mode operating as a relay node through a cellular channel, and applies the mode to the base station processing unit 25 (step S733: processing mode change).

Subsequently, the switching processing unit 26 commands the base station processing unit 25 to transmit the bearer modification request message through the cellular communication unit (core network) 22 or the local communication unit 21. Alternatively, the switching processing unit 26 commands the base station processing unit 25 to transmit the bearer release command through the cellular communication unit (core network) 22, the local communication unit 21, or the cellular communication unit (UE) 23 (step S735: bearer modification request or bearer release command). Afterward, the base station processing unit 25 performs an operation required for the update process or the release process for a bearer of the mobile terminals 10a and 10b, such as a process of the message received from each communication unit (step S737: performance of subsequent process).

<Configuration and Operation of Mobile Terminal>

Figure 8:
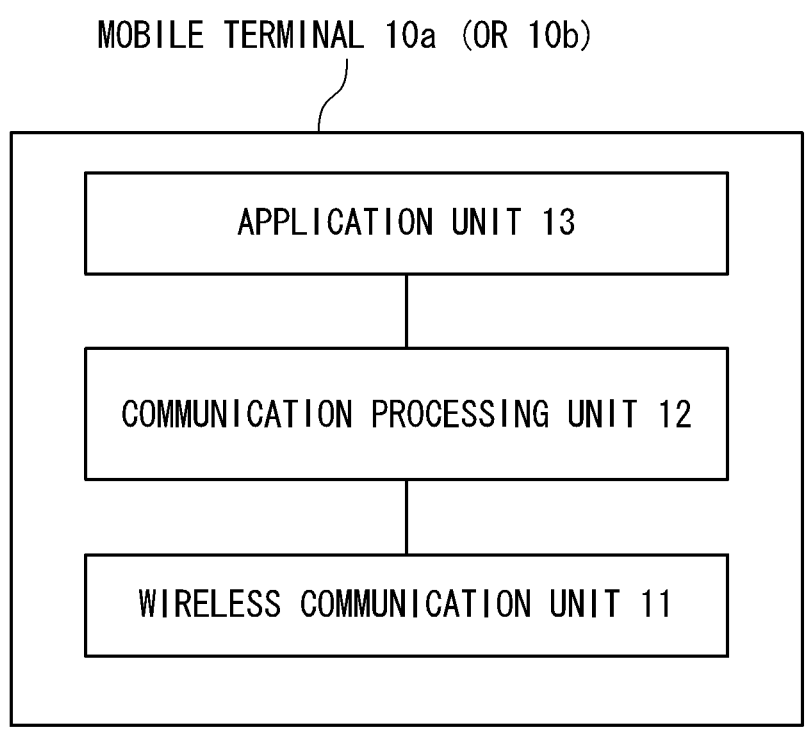
FIG. 8 is a block diagram illustrating a configuration of the mobile terminals 10a and 10b according to the first embodiment.

Next, configurations of the mobile terminals 10a and 10b will be described with reference to FIG. 8. FIG. 8 is a block diagram illustrating configurations of the mobile terminals 10a and 10b. The configurations of the mobile terminals 10a and 10b are the same as each other, and thus are denoted by the mobile terminal 10a (or 10b) in FIG. 8, for convenience.

The mobile terminal 10a (or 10b) shown in FIG. 8 includes a wireless communication unit 11 for connection to the mobile base station 20, a communication processing unit 12 that controls communication through the mobile base station 20, and an application unit 13 for getting applications, performing communication using the established communication connection, to work.

Figure 9:
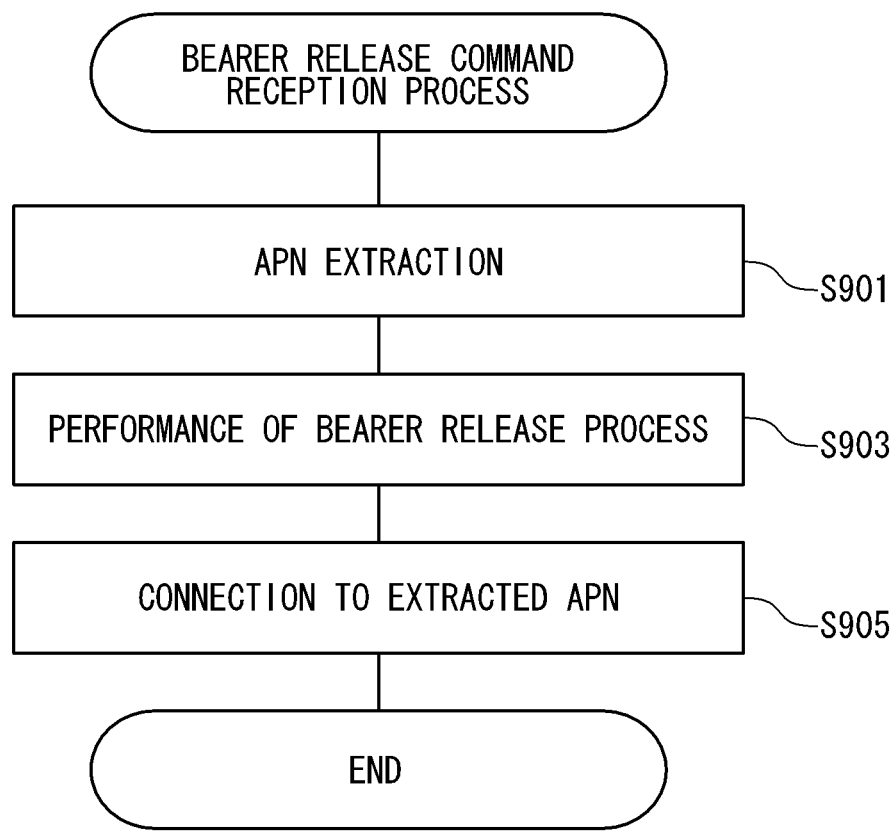
FIG. 9 is a flow diagram illustrating of a "bearer release command reception process" of the mobile terminals 10a and 10b according to the first embodiment.

Reference will be made to FIG. 9 to describe operations when a bearer release command including a command of a connection destination identifier is received, particularly, at the time of connection switching to the local network 110, as operations of the mobile terminal 10a (or 10b) shown in FIG. 8. FIG. 9 is a flow diagram illustrating a "bearer release command reception process" of the mobile terminals 10a and 10b according to the first embodiment.

In the flow of the "bearer release command reception process" shown in FIG. 9, when the mobile terminal 10a (or 10b) receives a bearer release command message from the mobile base station 20 through the wireless communication unit 11, the communication processing unit 12 identifies an identifier APN of a connection destination from the bearer release command message (step S901: APN identification).

Subsequently, the communication processing unit 12 performs a process of releasing a bearer for connection to the local network 110 (step S903: performance of bearer release process). Specifically, a bearer release procedure as disclosed in TS23.401 or TS23.060 is performed.

When the bearer release process is completed, the mobile terminal 10a (or 10b) first starts a connection establishment process to PDN indicated by the identified access point name (APN) (step S905: connection to identified APN). Specifically, an initial connection procedure (Initial Attach Procedure) or an additional connection procedure (Additional PDN Connectivity Procedure) as disclosed in TS23.401 or TS23.060 is performed.

Meanwhile, the mobile terminal 10a (or 10b) that supports the system operations shown in FIG. 5 is to perform a bearer modification process disclosed in TS23.401 or TS23.060 in the related art. Particularly, during the bearer modification process performed between the mobile base station 20 and the mobile terminal, (1) when the mobile terminal 10a (or 10b) notifies that the access point name (APN) of the connection destination is updated from the mobile base station 20 (for example, when information such as a flag that notifies a change in the access point name (APN) of the connection destination and the access point name (APN) after the change are notified), or (2) when the mobile terminal detects that the access point name (APN) after the change is notified and is different from the access point name (APN) connected until then, the mobile terminal 10a (or 10b) may correct and change (a) a QoS parameter to a proper value in the application unit 13, or may execute (b) an application operation and (c) an application proper for a connection destination network after another change or QoS.

Second Embodiment

In the communication system according to the first embodiment, all the mobile terminals (UE) are assumed to be in an active mode. However, when the mobile terminal (UE) located down the mobile base station is in an idle mode, a context of the idle mode UE (Idle mode user equipment (UE)) is not present in the mobile base station, and thus the mobile base station cannot perform a bearer release or bearer modification process. Therefore, in a communication system according to a second embodiment, the idle mode UE is specified based on the UE context held by the LGW, and the switching of the connection of the idle mode UE is performed at the same timing as that of the switching of the active mode UE. For this reason, according to the communication system of the present embodiment, a connection path of the mobile terminal to the local network is switched to any of direct connection or remote connection in accordance with the connection configuration of the mobile base station, and thus an optimum communication path of the mobile terminal can be established.

Here, the idle mode UE indicates a mobile terminal (UE) which is in an idle mode, and the active mode UE indicates a mobile terminal (UE) which is in an active mode.

<Communication System Configuration>

Figure 10:
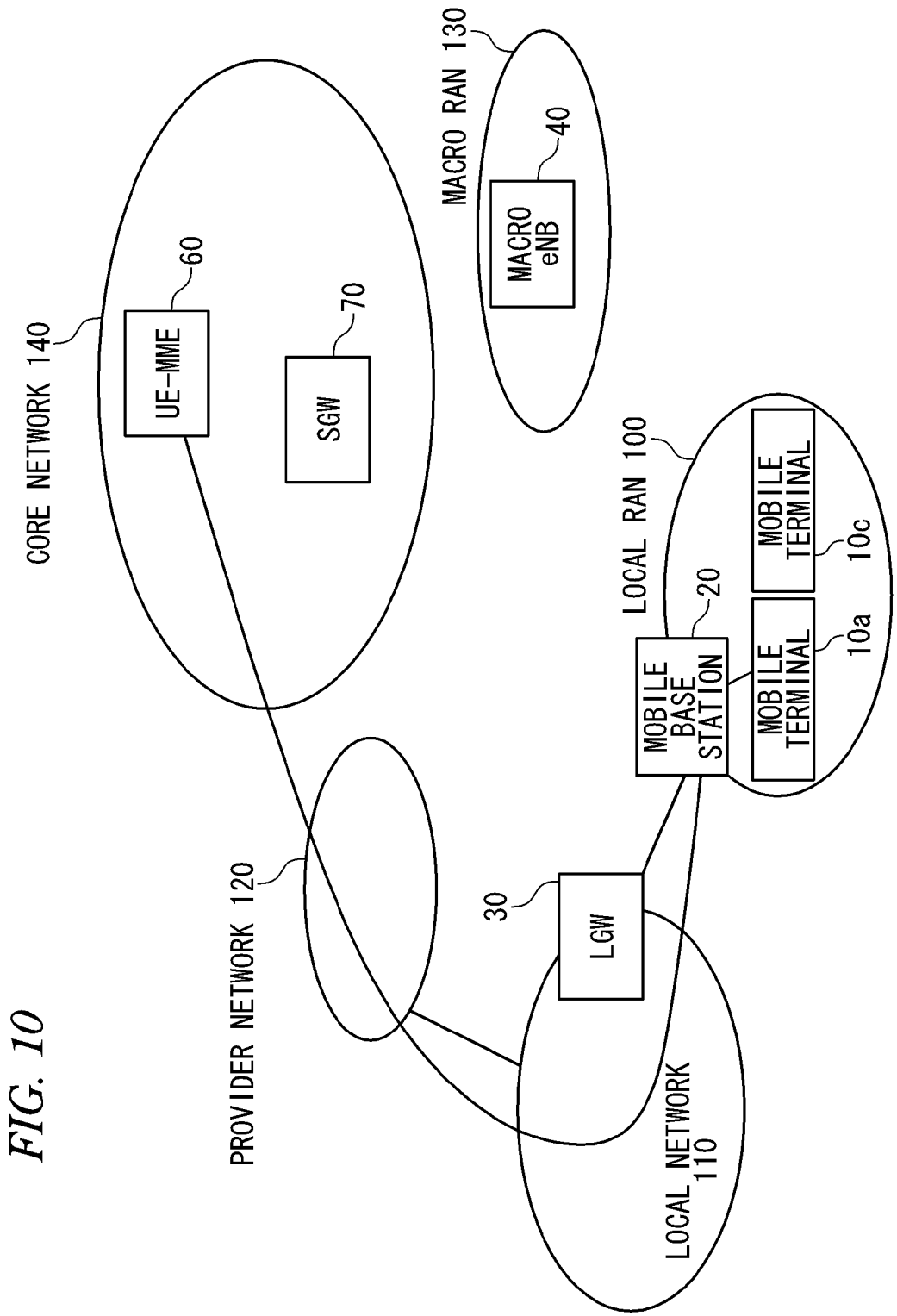
FIG. 10 is a diagram illustrating a configuration of a communication system according to a second embodiment.

FIG. 10 is a diagram illustrating a configuration of the communication system according to second embodiment of the present invention. Here, the communication system shown in FIG. 10 is different from the communication system shown in FIG. 1, in that, in the mobile terminals 10a and 10c accommodated by the mobile base station 20, the mobile terminal 10a is the active mode UE, and the mobile terminal 10c is the idle mode UE. The configurations other than this point are the same as those of the first embodiment. In FIG. 10, components common to those in FIG. 1 are denoted by the same reference numerals and signs.

In FIG. 10, the mobile base station 20 is connected directly to the local network 110. In addition, the mobile terminals 10a and 10c are LIPA-connected to the local network 110 through the mobile base station 20 and the LGW 30. The UE-MME 60 is connected to the core network 140, and performs the management of the states and mobility of the mobile terminals 10a and 10c.

After this, in the second embodiment, for convenience, the mobile terminal 10a which is in an active mode may be referred to as the active mode UE 10a, and the mobile terminal 10c which is in an idle mode may be referred to as the idle mode UE 10c.

Figure 11:
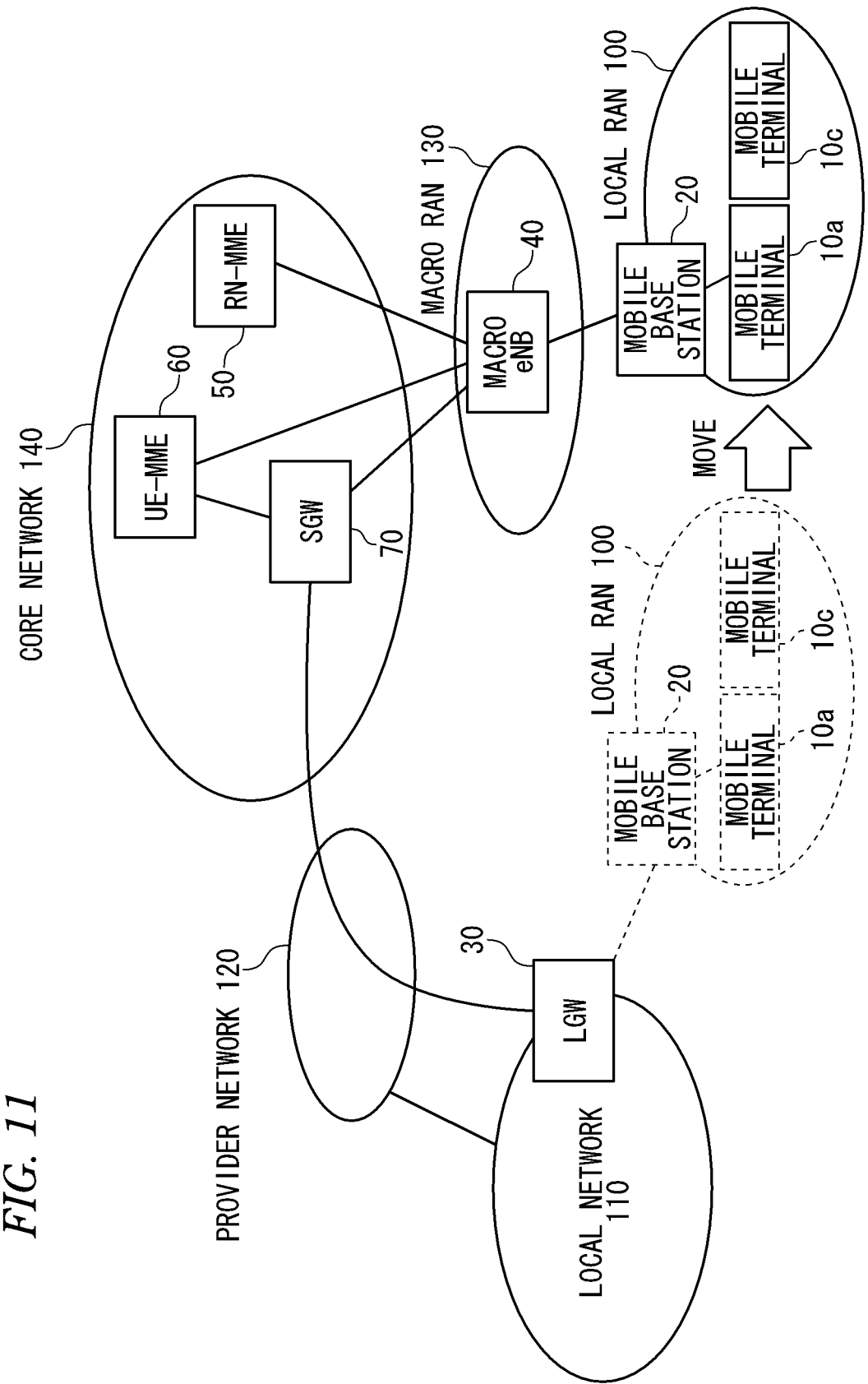
FIG. 11 is a diagram illustrating a state of the communication system according to the second embodiment.

FIG. 11 is a diagram illustrating a state of the communication system according to the second embodiment, and shows a state when the mobile base station 20 is disconnected from the local network 110, and is connected to the macro eNB 40 of the macro RAN 130. The communication system shown in FIG. 11 is different from the communication system shown in FIG. 2, in that the active mode UE 10a and the idle mode UE 10c are mixed. The configurations other than this point are the same as those of the first embodiment. In FIG. 11, components common to those in FIG. 2 are denoted by the same reference numerals and signs.

<System Operation>

Figure 12:
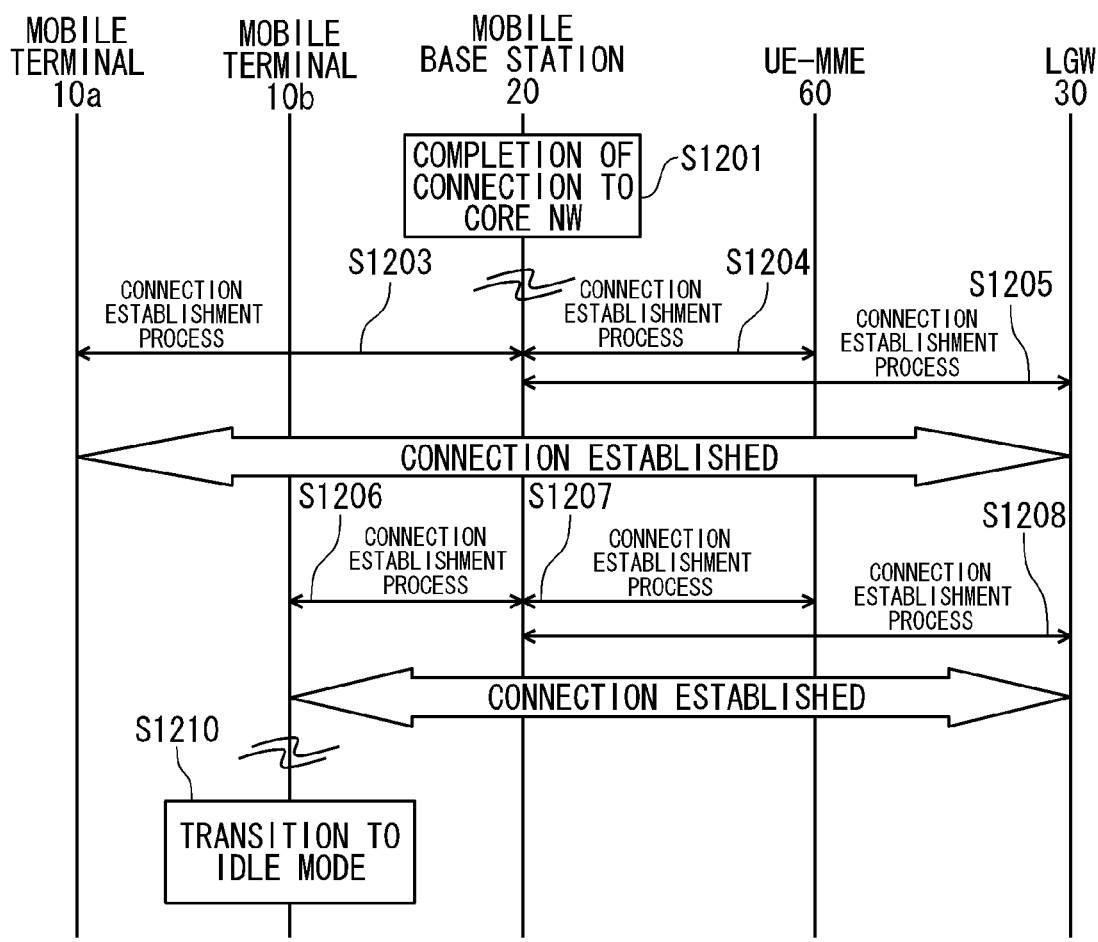
FIG. 12 is a connection sequence diagram of mobile terminals 10a and 10b according to the second embodiment.

Operations of the communication system shown in FIGS. 10 and 11 will be described with reference to FIGS. 12 and 13. FIG. 12 is a diagram illustrating a connection sequence of the mobile terminals 10a and 10c in the configuration of the communication system shown in FIG. 10.

As shown in FIG. 12, prior to the connection of the mobile terminals 10a and 10c, the mobile base station 20 secures the connectivity to the core network 140 via the local network 110 and the provider network 120 (step S1201: completion of connection to core NW). Specifically, the mobile base station 20 establishes secure connection to the core network 140 using a protocol such as PPPoE.

Subsequently, the mobile terminal 10a starts a connection establishment process. When the mobile terminal 10a transmits a connection request to the mobile base station 20, the mobile base station 20 transfers the connection request to the UE-MME 60, and after this, the process is performed based on an initial connection procedure disclosed in TR23.829 (steps S1203 to S1205: connection establishment process). Communication connection for LIPA (for example, PDN connection or PDP context) is established between the mobile terminal 10a and the LGW 30. Similarly to the mobile terminal 10a, the mobile terminal 10c establishes the communication connection for LIPA between the mobile terminal 10c and the LGW 30 (steps S1206 to S1208: connection establishment process).

Further, in the connection sequence shown in FIG. 12, it is assumed that the mobile terminal 10c establishes connection for LIPA, and then transitions to an idle mode (step S1210: transition to idle mode). Thereby, a bearer context relating to the mobile terminal 10c in the mobile base station 20 is deleted.

Figure 13:
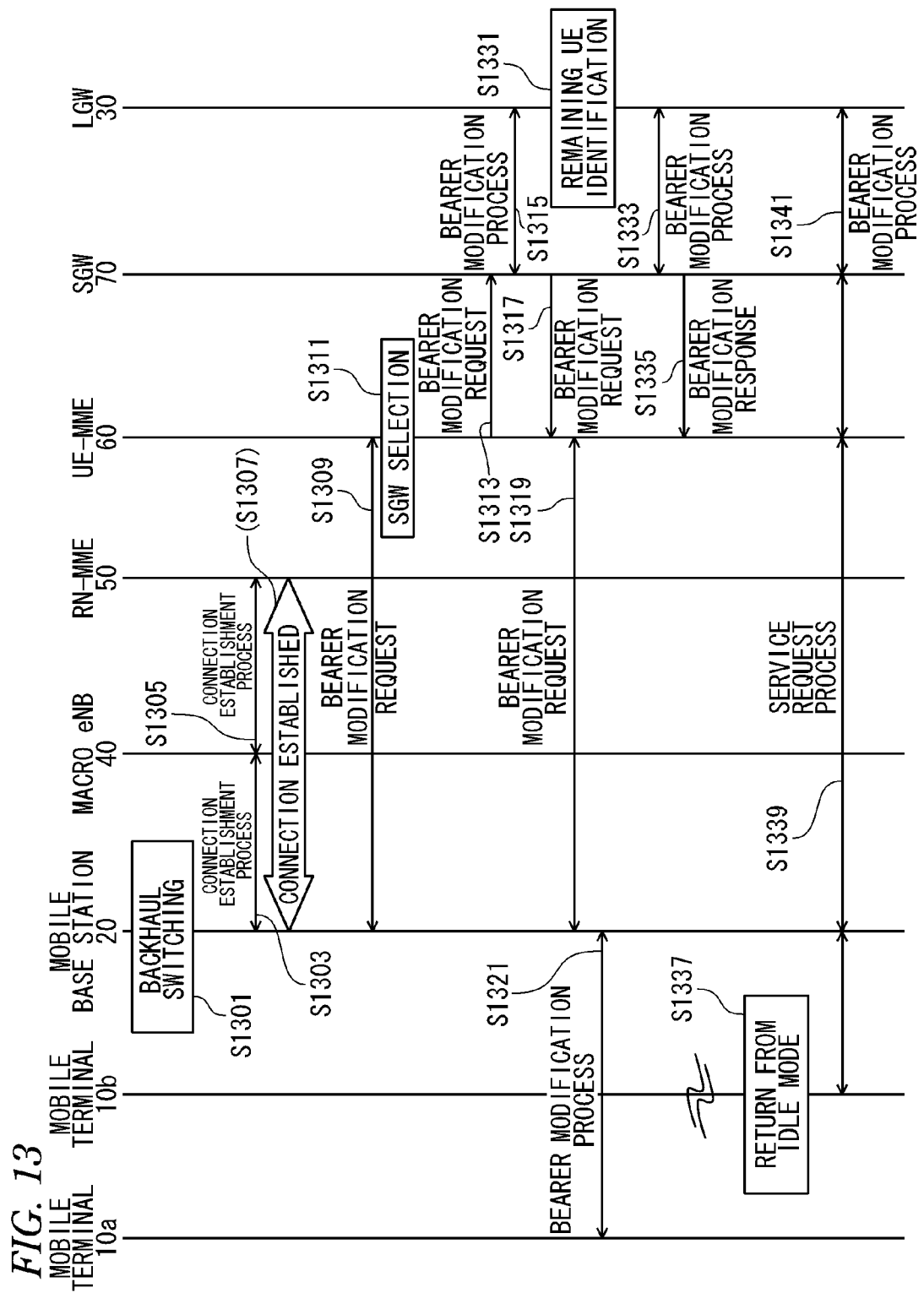
FIG. 13 is a switching sequence diagram of local network connection according to the second embodiment.

Reference will be made to FIG. 13 to describe a switching sequence of the local network connection when the local RAN 100 including the mobile base station 20 and the mobile terminals 10a and 10c moves and is accommodated in the macro eNB 40. FIG. 13 is a switching sequence diagram of the local network connection in the present embodiment.

As shown in FIG. 13, when the mobile base station 20 detects backhaul switching (step S1301: backhaul switching), and establishes a connection for accommodating UE traffic (steps S1303 and S1305: connection establishment process, and step S1307: connection established), the mobile base station 20 transmits a bearer modification request message for a bearer established by the mobile terminal 10a to be accommodated, to the UE-MME 60, based on bearer context information to be held (step S1309: bearer modification request). Here, the bearer established by the mobile terminal 10a to be accommodated indicates an EPS bearer, a PDN connection, a PDP context, a radio bearer, and the like.

The mobile base station 20 commands the switching of a connection destination of a bearer to be targeted from the access point name (APN) for LIPA to the access point name (APN) for RIPA, in the bearer modification request message. For example, the mobile base station 20 may add the access point name (APN) for RIPA to the bearer modification request message. In addition, the mobile base station 20 may explicitly add information (for example, flag) that commands the switching of an access point name (APN) to the bearer modification request message.

Meanwhile, the mobile base station 20 may issue the bearer modification request message for each bearer. In addition, the mobile base station 20 may issue the bearer modification request message for each mobile terminal, or for each PDN connection/PDP context. Further, the mobile base station 20 may collectively issue the bearer modification request message to all the bearers, thereby allowing the mobile base station 20 to reduce signaling traffic.

The UE-MME 60 receiving a bearer modification request selects and allocates the SGW 70 for connection to the access point name (APN) for RIPA (step 1311: SGW selection), and transmits the bearer modification request message to which a contact address or the like of the LGW 30 is added, to the SGW 70 (step S1313: bearer modification request). Here, when the SGW 70 of the core network is allocated at the time of the LIPA connection, the same SGW may be used, thereby allowing a processing load associated with the SGW selection in the UE-MME 60 to be reduced.

The SGW 70 receiving the bearer modification request message generates a bearer context of the mobile terminal 10a to be targeted, and transfers the bearer modification request message to the LGW 30. By receiving this, the LGW 30 corrects (for example, contact address or the like of the SGW 70) a bearer context of the mobile terminal 10a to be targeted, in a bearer modification process, and transmits a bearer modification response message to the SGW 70 (step S1315: bearer modification process). When the generation/update of the bearer context is completed, the SGW 70 transmits the bearer modification response message to the UE-MME 60 (step S1317: bearer modification response).

The UE-MME 60 updates the bearer context of the mobile terminal 10a to be targeted, and transmits the bearer modification response message to the mobile base station 20 (step S1319: bearer modification response). The mobile base station 20 performs the bearer modification process of updating a wireless bearer (particularly, QoS parameter or the like) of the mobile terminal 10a, based on the received bearer modification response message (step S1321: bearer modification process).

Meanwhile, when gateways derived from the access point name (APN) for LIPA and the access point name (APN) for RIPA are different from each other, relocation from the LGW 30 to a PDN gateway (PGW) for RIPA, or relocation from the PDN gateway (PGW) for RIPA to the LGW 30 may be performed.

As mentioned above, in the switching sequence shown in FIG. 13, step S1301 of the switching process for the mobile terminal 10a which is in an active mode to step S1321 are the same as steps S501 to S521 for the mobile terminal 10a described in the sequence shown in FIG. 5.

Here, the difference between the switching sequence shown in FIG. 13 and the sequence shown in FIG. 5 is a process of the LGW 30 which is performed subsequently to step S1321. That is, the LGW 30 in which the bearer modification process for the active mode UE 10a is completed and the path switching for the local network connection is completed identifies the idle mode UE based on bearer context information (context information for managing an EPS bearer or a PDP context) held by the LGW (step S1331: remaining UE detection). That is, the mobile terminal (UE) except the active mode UE on which the bearer modification process is previously performed is identified to be the idle mode UE.

In step S1331, the LGW 30 may identify only the mobile terminal (UE) particularly accommodated by the mobile base station 20. For example, any one of a CSG or cell ID, a base station ID, a location registration area ID (for example, tracking area ID, location area ID, or routing area ID), and the like, or a plurality of combinations of the mobile base station 20 notified by the mobile terminal (UE) at the time of the connection establishment process to LIPA, are recorded, and the mobile terminal (UE), on which the bearer modification process is not yet performed, among the mobile terminals (UE) belonging to the same CSG or cell ID as that of the active mode UE on which the bearer modification process is previously performed, a base station ID, and a location registration area ID is identified to be the idle mode UE.

The LGW 30 performs the bearer modification process for the identified idle mode UE 10c with respect to the SGW 70 (step S1333: bearer modification process). Here, the SGW 70 is the same SGW as that previously allocated to the active mode UE 10a. This is to use characteristics on the operation of the system in which the mobile terminal (UE) is accommodated in the same mobile base station is present in the same location and thus is accommodated in substantially necessarily the same SGW.

The SGW 70 generates a bearer context of the idle mode UE 10c, sets a state of the mobile terminal 10c to an idle mode, and transmits a bearer modification command message to the UE-MME 60 (step S1335: bearer modification command).

The UE-MME 60 updates the bearer context of the mobile terminal 10c held by the UE-MME 60 based on the received bearer modification command message (for example, updates a contact address or the like of the SGW), and detects that the mobile terminal is in an idle mode from the state recorded in the context of the mobile terminal 10c. The bearer modification request to the mobile base station 20 is not performed.

Thereby, the mobile terminal 10c can continue to be in an idle mode, and can reduce the battery consumption of the mobile terminal 10c.

Meanwhile, when the SGW 70 performs a bearer modification command on the UE-MME 60, it may be explicitly notified that the mobile terminal 10c to be targeted is in an idle mode. Afterward, during a service request process performed when the mobile terminal 10c returns from an idle mode in step S1337 ("return from idle mode" in FIG. 13), the reestablishment (mainly, reestablishment of a QoS parameter) of the entire communication connection including a wireless bearer is performed (step S1339: service request process, and S1341: bearer modification process).

Meanwhile, when gateways derived from the access point name (APN) for LIPA and the access point name (APN) for RIPA are different from each other, relocation from the LGW 30 to the PGW for RIPA (or from the PGW of RIPA to the LGW) may be performed. More specifically, the bearer context of the active UE is first handed over from the LGW 30 to the PGW. Thereafter, during the bearer modification process of the idle mode UE performed by the LGW 30, PGW relocation for the idle mode UE is performed.

<Operation of Mobile Base Station 20>

Figure 14:
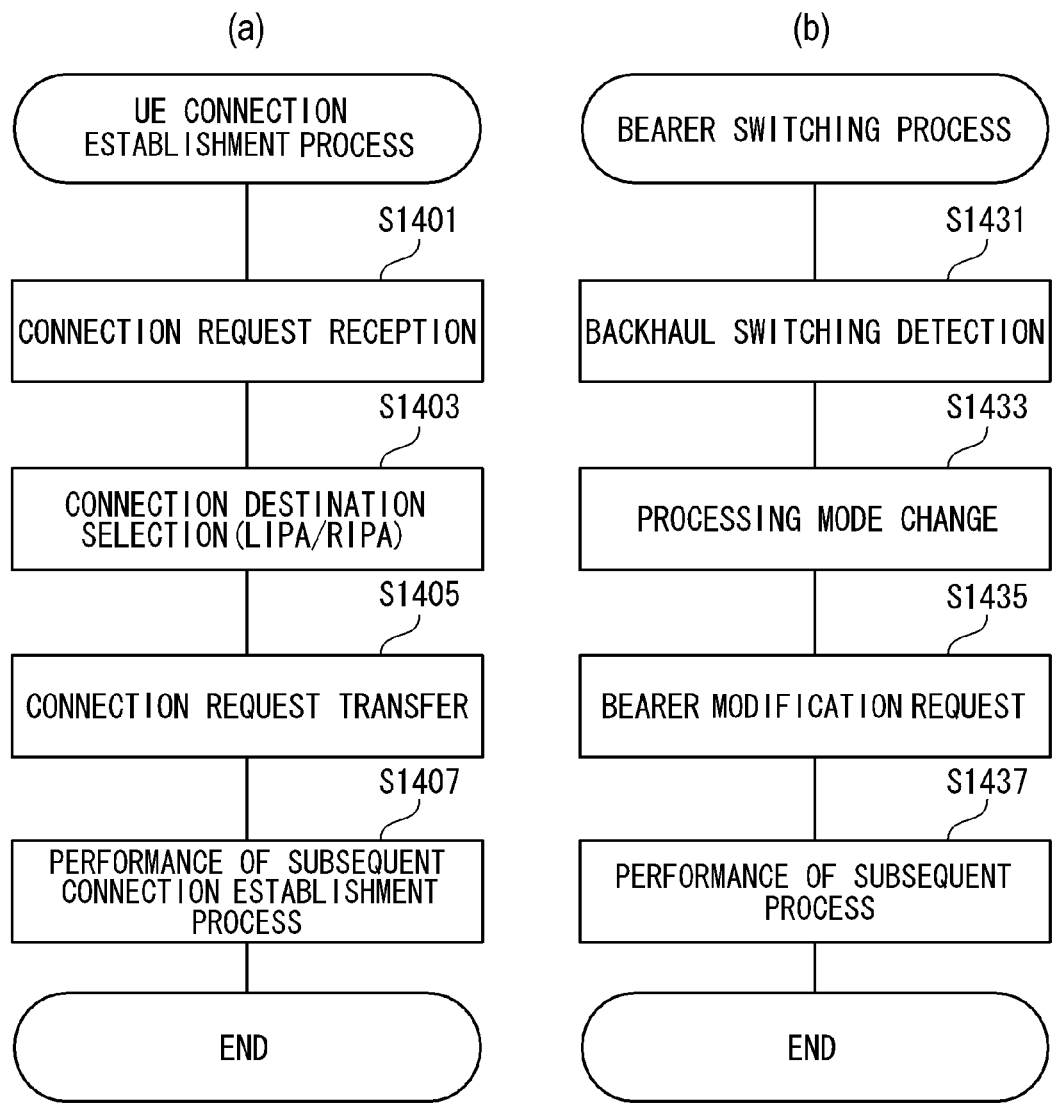
FIG. 14(a) is a flow diagram illustrating a "UE connection establishment process" of a mobile base station 20 according to the second embodiment.
FIG. 14(b) is a flow diagram illustrating a "bearer switching process" of the mobile base station 20 according to the second embodiment.

Operations of the mobile base station 20 according to the present embodiment will be described with reference to FIGS. 14(a) and 14(b). Meanwhile, the configuration of the mobile base station 20 in the present embodiment is the same as the configuration of the mobile base station shown in FIG. 6, and thus the description thereof will be omitted. FIG. 14(a) is a flow diagram illustrating a "UE connection establishment process" of the mobile base station 20 according to the second embodiment, and FIG. 14(b) is a flow diagram illustrating a "bearer switching process" of the mobile base station 20 according to the second embodiment.

In the "UE connection establishment process" shown in FIG. 14(a), when the base station processing unit 25 receives a connection request from the mobile terminal (UE) through the cellular communication unit (UE) 23 (step S1401: connection request reception), the base station processing unit 25 notifies the switching processing unit 26 of that effect.

The switching processing unit 26 selects a connection destination based on the backhaul media used at the time of receiving a notification from the base station processing unit 25 (step S1403: connection destination selection (LIPA/RIPA)). That is, when the backhaul media is the local communication unit 21, the switching processing unit 26 selects local IP access (LIPA). When the backhaul media is the cellular communication unit (core network), the switching processing unit 26 selects remote access (RIPA) to the local network.

Subsequently, as the access point name (APN) equivalent to the selected connection destination, the access point name (APN) for LIPA or the access point name (APN) for RIPA is added to the connection request message of the mobile terminals 10a and 10c (or overwritten to the access point name (APN) which is written in the connection request message), and is transferred to the UE-MME 60 through the base station processing unit 25, and the backhaul media (cellular communication unit (core network) 22 or local communication unit 21) (step S1405: connection transfer request). Afterward, the base station processing unit 25 performs an operation required for the connection establishment process of the mobile terminals (UE), such as a process of the message received from each communication unit (step S1407: performance of subsequent connection establishment process).

In the "bearer switching process" shown in FIG. 14(b), when the switching processing unit 26 detects that the switching of the backhaul media is performed (or switching is required) (step S1431: backhaul switching detection), the switching processing unit 26 selects, as a processing mode of the base station processing unit 25, any one mode of (1) a mode operating as the femto base station, and (2) a mode operating as a relay node, and applies the mode to the base station processing unit 25 (step S1433: processing mode change).

Subsequently, the switching processing unit 26 commands the base station processing unit 25 to transmit the bearer modification request message through the cellular communication unit (core network) 22 or the local communication unit 21. Alternatively, the switching processing unit 26 commands the base station processing unit 25 to transmit the bearer release command through the cellular communication unit (core network) 22, the local communication unit 21, or the cellular communication unit (UE) 23 (step S1435: bearer modification request). Afterward, the base station processing unit 25 performs an operation required for the update process or the release process for a bearer of the mobile terminals 10a and 10c, such as a process of the message received from each communication unit (step S1437: performance of subsequent process).

<Configuration and Operation of LGW 30>

Figure 15:
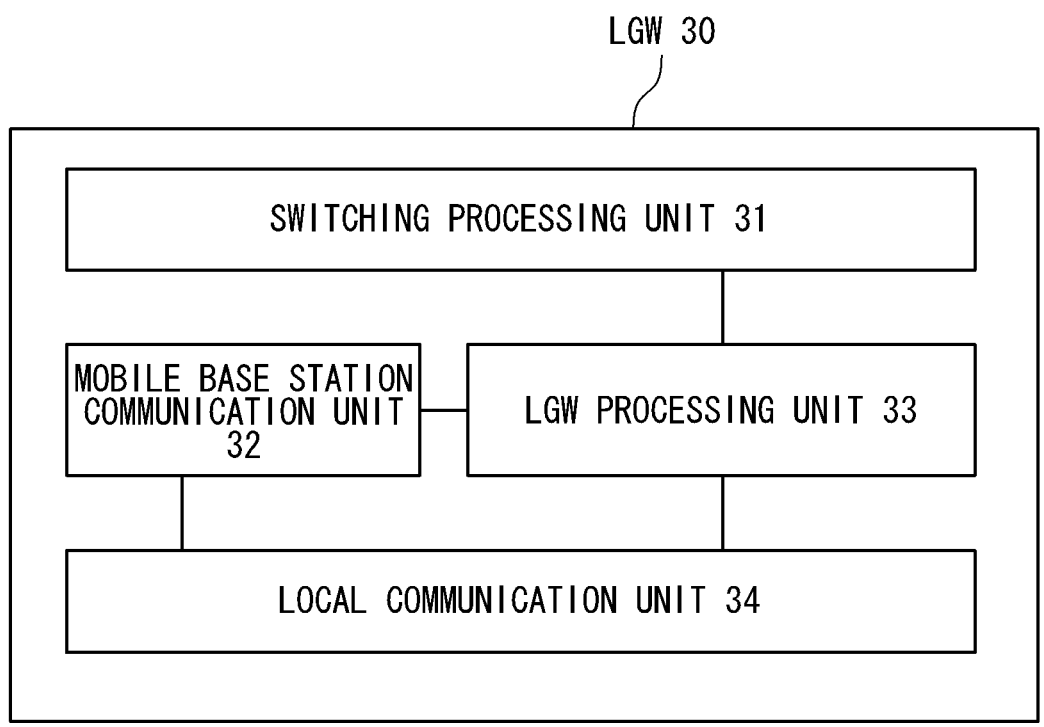
FIG. 15 is a block diagram illustrating a configuration of an LGW 30 according to the second embodiment.

A configuration of the LGW 30 according to the present embodiment will be described with reference to FIG. 15. FIG. 15 is a block diagram illustrating a configuration of the LGW 30 according to the second embodiment. The LGW 30 shown in FIG. 15 includes a switching processing unit 31 that performs connection switching to the local network 110, a mobile base station communication unit 32 that securely communicates the mobile base station 20 through the local network 110, an LGW processing unit 33 that executes an LGW process on the mobile base station 20 or the core network device which are connected to the local network 110, and a local communication unit 34 that controls communication with the local network 110.

Figure 16:
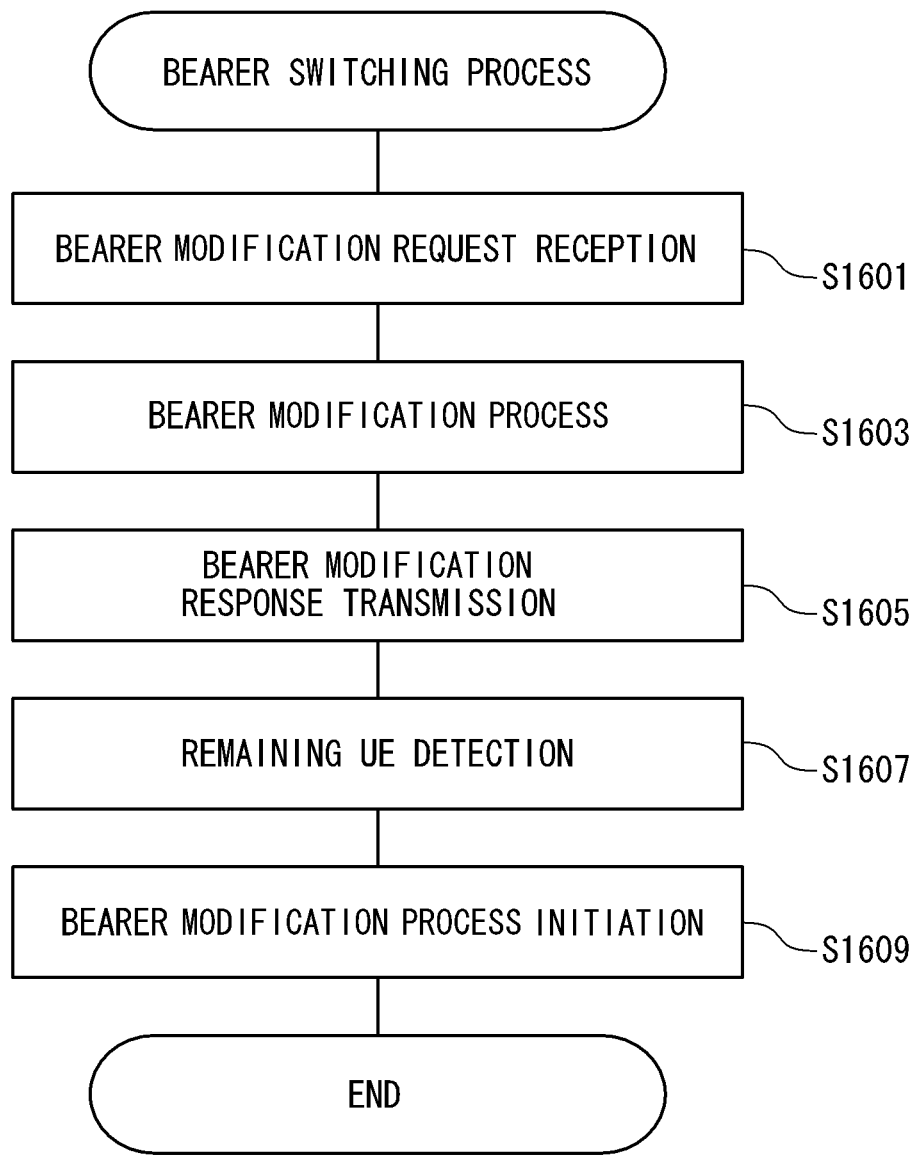
FIG. 16 is a diagram illustrating operations of the LGW 30 according to the second embodiment.

Operations of the LGW 30 shown in FIG. 15 will be described with reference to FIG. 16. FIG. 16 is a diagram illustrating operations of the LGW 30 according to the second embodiment. The mobile base station communication unit 32 receives the bearer modification request message together with the bearer context of the mobile terminal 10a to be targeted, from the SGW 70 for connection the access point name (APN) for RIPA through the local communication unit 34 (step S1601: bearer modification request reception).

The mobile base station communication unit 32 corrects the bearer context of the mobile terminal 10a to be targeted (step S1603: bearer modification process), and transmits a bearer modification response message to the SGW 70 through the local communication unit 34 (step S1605: bearer modification response transmission).

The switching processing unit 31 identifies the idle mode UE 10c based on bearer context information held by the LGW 30 itself (step S1607: remaining UE detection). That is, the mobile terminal 10c except the active mode UE 10a on which the bearer modification process is previously performed is identified to be the idle mode UE.

The switching processing unit 31 corrects the bearer context relating to the identified idle mode UE 10c (for example, a TEID (Tunnel Endpoint ID) used in an SGW address or a GTP, or a GRE key (Generic Routing Encapsulation Key) used in a PMIP is changed to a value notified by the SGW, or a value of the TEID or the GRE Key to be notified is set in the SGW), and performs a bearer modification process on the SGW 70 for the identified idle mode UE 10c through the LGW processing unit 33 (step S1609: bearer modification process initiation). Here, the SGW 70 is the same SGW as that previously allocated to the active mode UE 10a.

<Configuration and Operation of MME>

Figure 17:
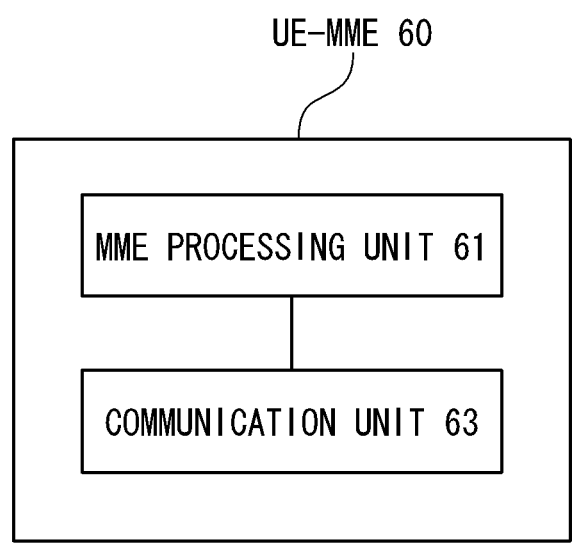
FIG. 17 is a block diagram illustrating a configuration of a UE-MME 60 according to the second embodiment.

Next, a configuration of the UE-MME 60 according to the second embodiment will be described with reference to FIG. 17. FIG. 17 is a block diagram illustrating a configuration of the UE-MME 60 according to the second embodiment. The UE-MME 60 shown in FIG. 17 includes an MME processing unit 61 that performs an MME process and a communication unit 63 that transmits and receives messages to and from the core network device such as the mobile base station 20 or the SGW 70.

Figure 18:
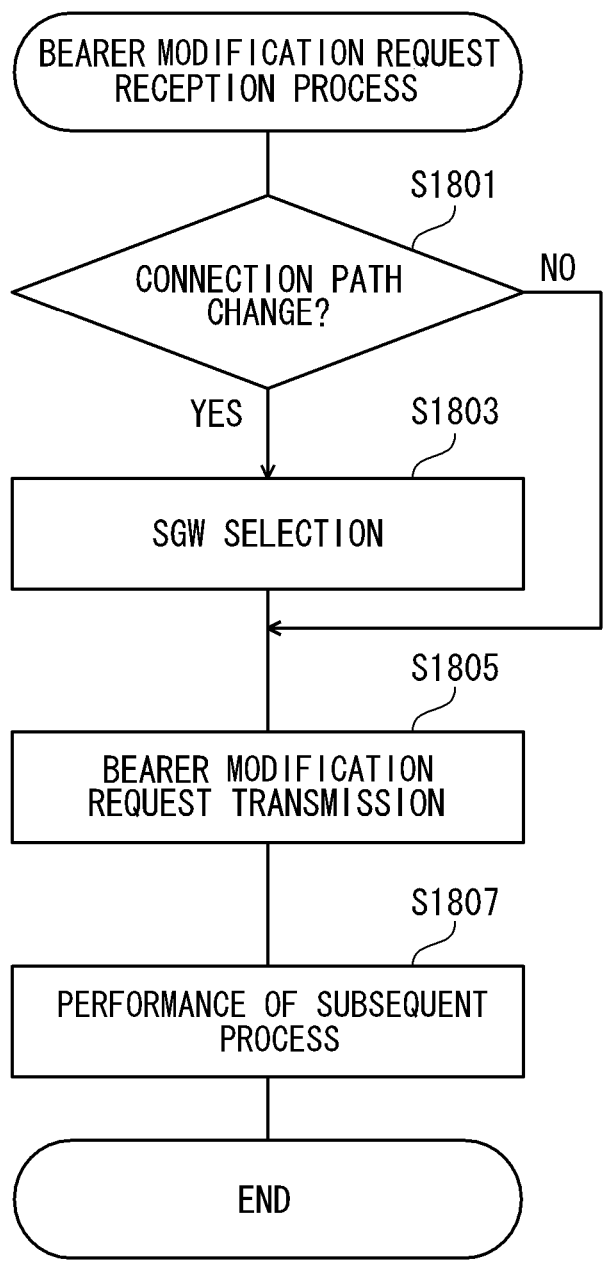
FIG. 18 is a diagram illustrating operations of the UE-MME 60 according to the second embodiment.

Operations of the UE-MME 60 shown in FIG. 17 will be described with reference to FIG. 18. FIG. 18 is a diagram illustrating operations of the UE-MME 60 according to the second embodiment.

The UE-MME 60 receives the bearer modification request message transferred from the mobile base station 20 through the communication unit 63, and the MME processing unit 61 determines whether the connection path of the mobile terminal (UE) is updated (step S1801: connection path change?). When it is determined that the connection path is updated (if Yes), the MME processing unit 61 selects the SGW 70 for connection to the access point name (APN) after the change (step S1803: SGW selection). Here, when the SGW 70 of the core network is allocated at the time of the LIPA connection, the same SGW may be used, thereby allowing a processing load associated with the SGW selection in the UE-MME 60 to be reduced. When it is determined that the connection path is not updated (if No), the process transitions to step S1805. The MME processing unit 61 then transmits a bearer modification request message to which a contact address or the like of the LGW 30 is added, to the selected SGW 70 (step S1805: bearer modification request message transmission). Afterward, an operation required for the connection establishment process of the mobile terminal (UE) is performed (step S1807: performance of subsequent connection establishment process).

Third Embodiment

In a communication system according to a third embodiment, a description will be made of a method of causing the LGW 30 to detect the movement of the mobile base station 20, and switching the LIPA connection of the mobile terminal (UE) accommodated by the mobile base station 20 to the RIPA connection. According to the communication system of the present embodiment a connection path of the mobile terminal to the local network is switched to any of direct connection or remote connection in accordance with the connection configuration of the mobile base station, and thus an optimum communication path of the mobile terminal can be established.

<Communication System Configuration>

Figure 19:
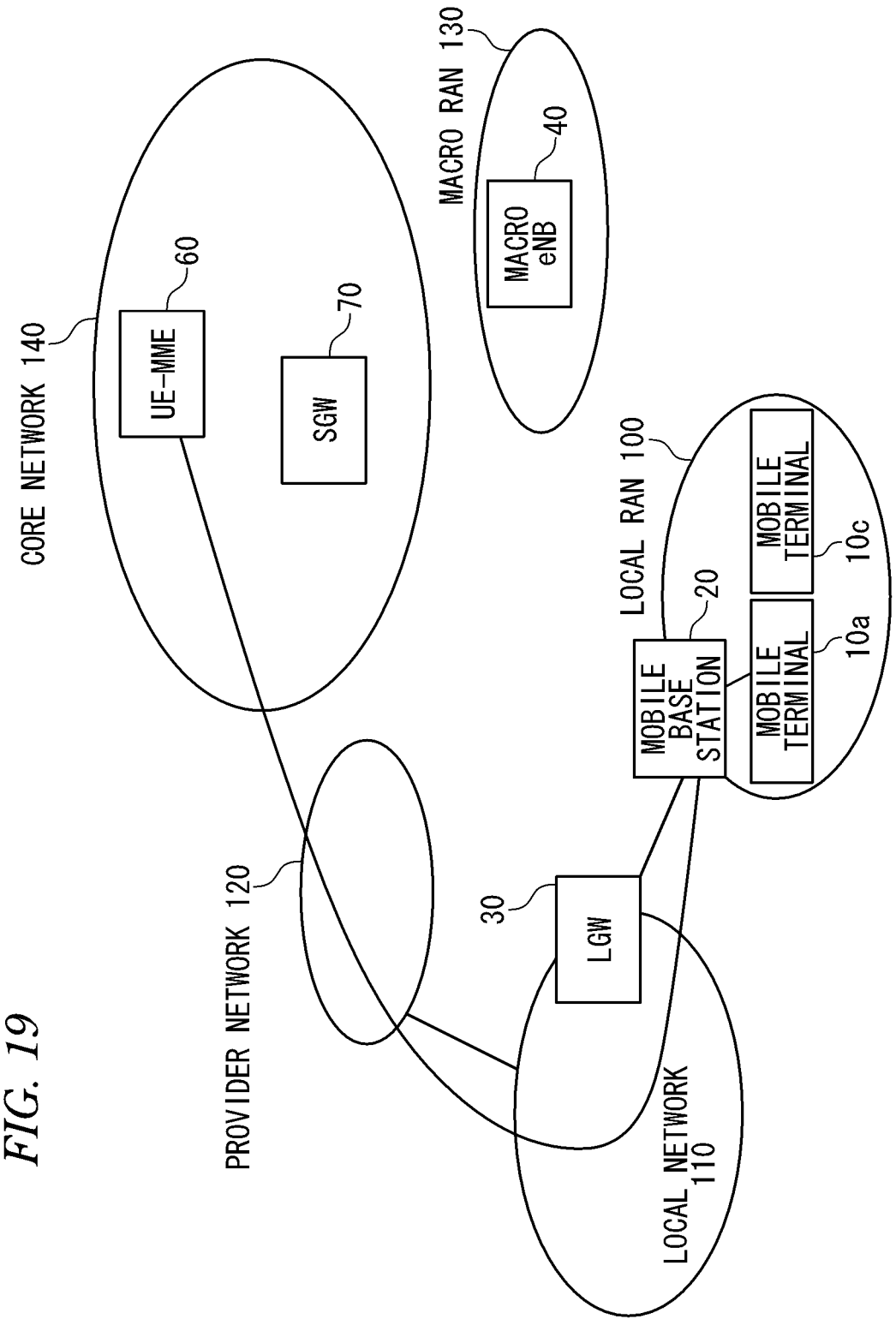
FIG. 19 is a diagram illustrating a configuration of a communication system according to a third embodiment.

FIG. 19 is a diagram illustrating a configuration of the communication system according to the third embodiment. Here, the communication system shown in FIG. 19 is different from the communication system shown in FIG. 1, in that, in the mobile terminals 10a and 10c accommodated by the mobile base station 20, the mobile terminal 10a is the active mode UE, and the mobile terminal 10c is the idle mode UE. The configurations other than this point are the same as those of the first embodiment. In FIG. 19, components common to those in FIG. 1 are denoted by the same reference numerals and signs.

In FIG. 19, the mobile base station 20 is connected directly to the local network 110. In addition, the mobile terminals 10a and 10c are LIPA-connected to the local network 110 through the mobile base station 20 and the LGW 30. The UE-MME 60 is connected to the core network 140, and performs the management of the states and mobility of the mobile terminals 10a and 10c.

After this, in the present embodiment, for convenience, the mobile terminal 10a which is in an active mode may be referred to as the active mode UE 10a, and the mobile terminal 10c which is in an idle mode may be referred to as the idle mode UE 10c.

Figure 20:
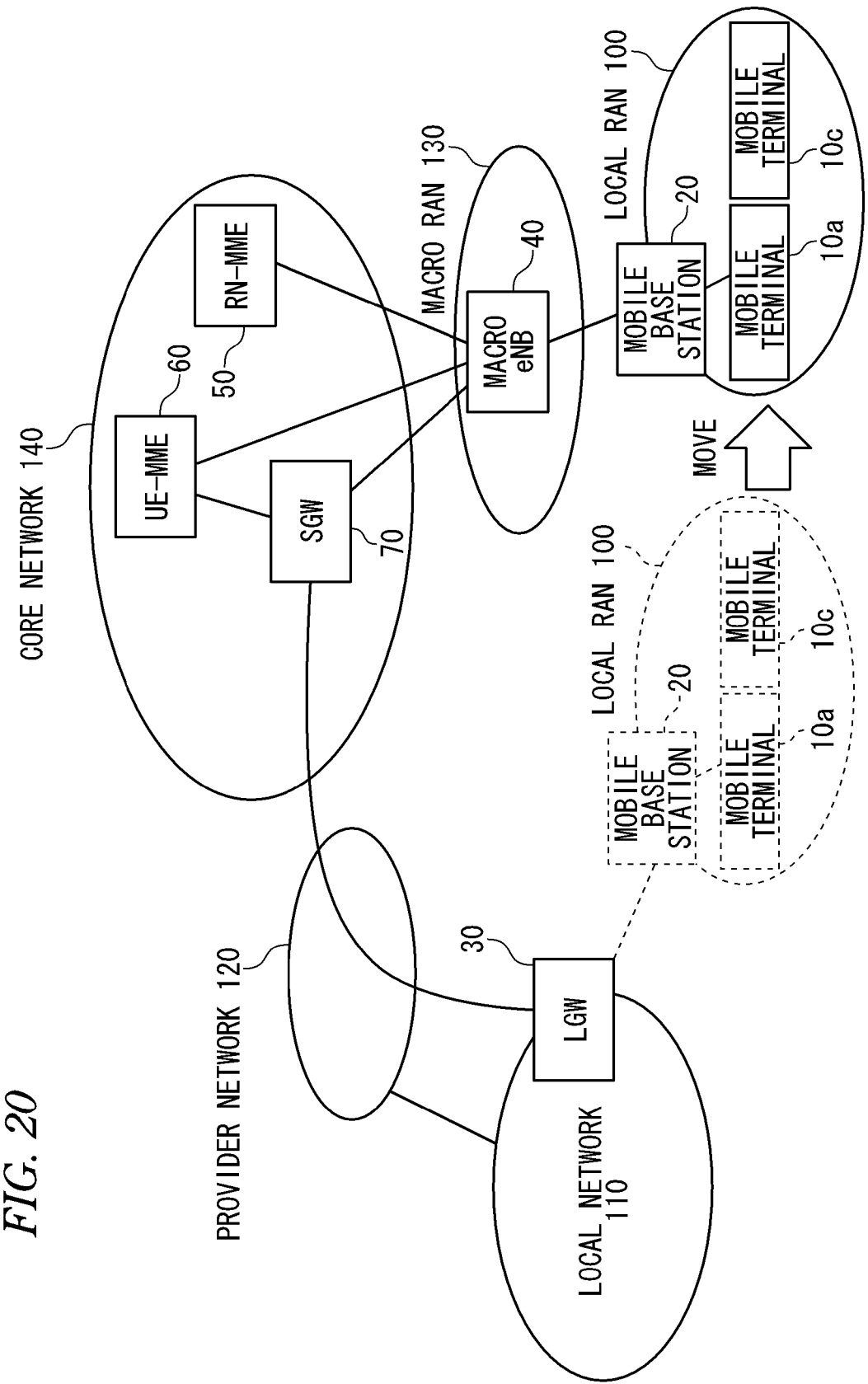
FIG. 20 is a diagram illustrating a state of the communication system according to the third embodiment.

FIG. 20 is a diagram illustrating a state of the communication system according to the third embodiment, and shows a state of the communication system when the mobile base station 20 is disconnected from the local network 110, and is connected to the macro eNB 40 of the macro RAN 130. A state of the communication system shown in FIG. 20 is different from a state of the communication system shown in FIG. 2, in that the active mode UE 10a and the idle mode UE 10c are mixed. The configurations other than this point are the same as those of the first embodiment. In FIG. 20, components common to those in FIG. 2 are denoted by the same reference numerals and signs.

<System Operation>

Figure 21:
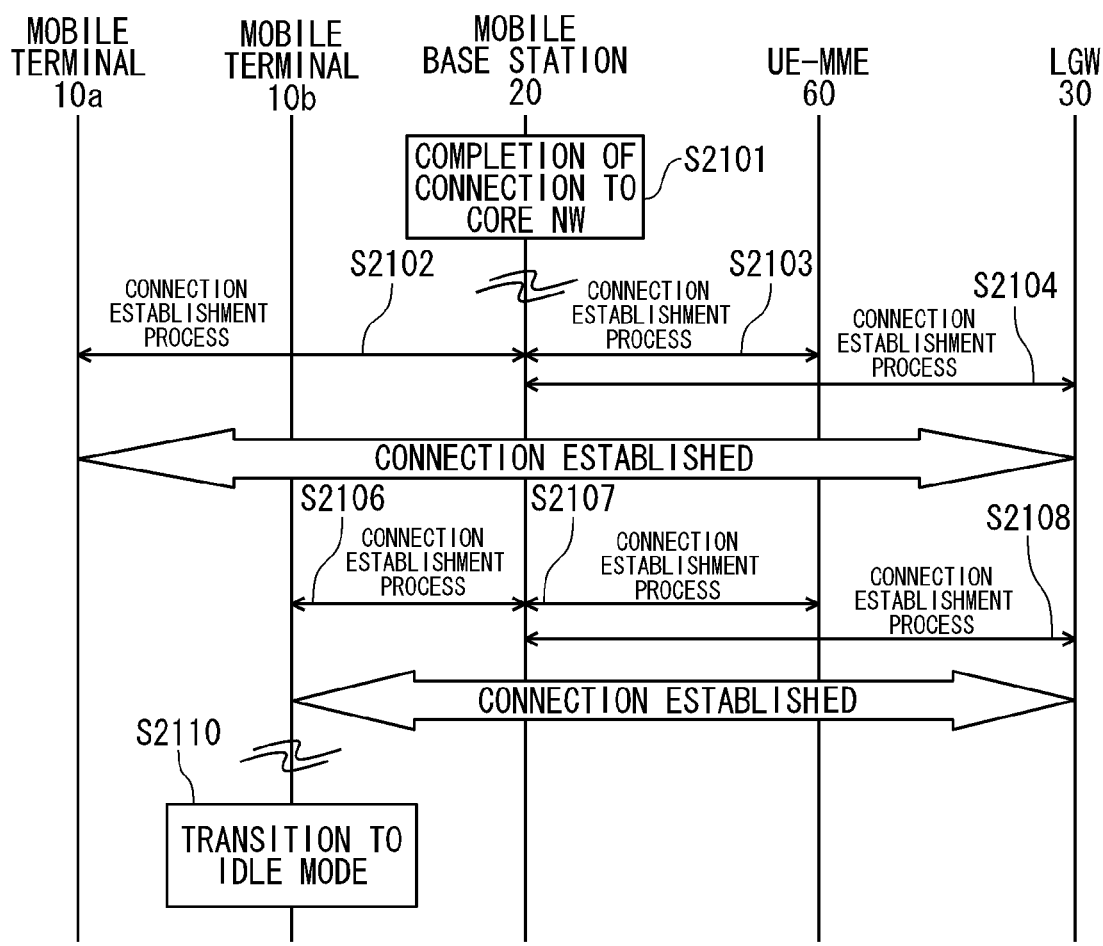
FIG. 21 is a connection sequence diagram of mobile terminals 10a and 10c according to the third embodiment.

Operations of the communication system shown in FIGS. 19 and 20 will be described with reference to FIGS. 21 and 22. FIG. 21 is a connection sequence diagram of the mobile terminals 10a and 10c according to the third embodiment.

As shown in FIG. 21, prior to the connection of the mobile terminals 10a and 10c, the mobile base station 20 secures the connectivity to the core network 140 via the local network 110 and the provider network 120 (step S2101: completion of connection to core NW). Specifically, the mobile base station 20 establishes secure connection to the core network 140 using a protocol such as PPPoE.

Subsequently, the mobile terminal 10a starts a connection establishment process. When the mobile terminal 10a transmits a connection request to the mobile base station 20, the mobile base station 20 transfers the connection request to the UE-MME 60, and after this, the process is performed based on an initial connection procedure disclosed in TR23.829 (steps S2102 to S2104: connection establishment process). Communication connection for LIPA (for example, PDN connection or PDP context) is established between the mobile terminal 10a and the LGW 30. Similarly to the mobile terminal 10a, the mobile terminal 10c establishes the communication connection for LIPA between the mobile terminal 10c and the LGW 30 (steps S2106 to S2108: connection establishment process).

Further, in the connection sequence shown in FIG. 21, it is assumed that the mobile terminal 10c establishes connection for LIPA, and then transitions to an idle mode (step S2110: transition to idle mode). Thereby, a bearer context relating to the mobile terminal 10c in the mobile base station 20 is deleted.

Figure 22:
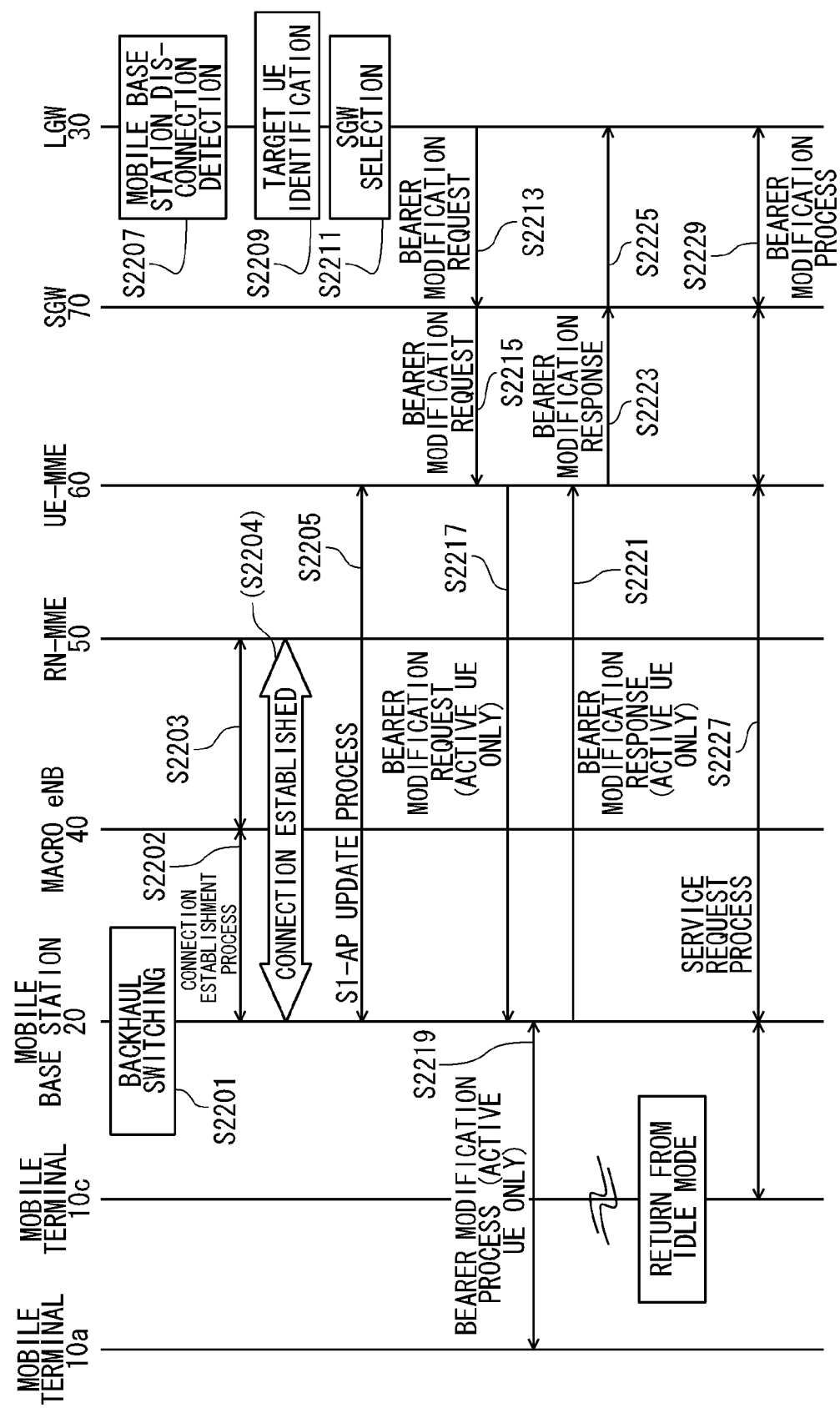
FIG. 22 is a switching sequence diagram of local network connection according to the third embodiment.

FIG. 22 is a switching sequence diagram of the local network connection according to the third embodiment. Particularly, reference will be made to the present drawing to describe a switching sequence of the local network connection when the local RAN 100 including the mobile base station 20 and the mobile terminals 10a and 10c moves and is accommodated in the macro eNB 40.

As shown in FIG. 22, the mobile base station 20 switches a backhaul to a cellular channel (step S2201: backhaul switching), and establishes a connection with the macro eNB 40 and the RN-MME 50 (steps S2202 and S2203: connection establishment process, and step S2204: connection established).

Here, in the communication system according to the present embodiment, an interface to the UE-MME 60 to which the mobile terminals 10a and 10c accommodated by the mobile base station 20 are connected is updated between the mobile base station 20 and the UE-MME 60 (step S2205: S1-AP update process). Meanwhile, the interface to the UE-MME 60 to which the mobile terminals 10a and 10c accommodated by the mobile base station 20 are connected is disclosed as S1-AP in TS23.401. Thereby, a message relating to a bearer update process initiated in the core network device can be received by the mobile base station 20.

On the other hand, when the backhaul switching of the mobile base station 20 occur, the disconnection of the mobile base station 20 from the local network is detected by the LGW 30 (step S2207: mobile base station disconnection detection). For example, the mobile terminals UE 10a and 10c transmit existence confirmation packets (for example, ping request or the like) periodically to the mobile base station 20 from the time when the LIPA connection is established, and the LGW 30 manages response reception. That is, while the mobile base station 20 is connected to the local network 110, the mobile base station responds to the existence confirmation packets from the LGW 30. Since the response is broken off in a point of time when the backhaul is switched to a cellular channel, the LGW 30 detects the disconnection of the mobile base station 20 from the local network when the response is broken off.

The LGW 30 having detected the disconnection of the mobile base station 20 identifies the mobile terminals 10a and 10c in which the LIPA connection is established, via the mobile base station 20 (step S2209: target UE identification). For example, when the mobile terminals 10a and 10c establish the LIPA connection, the LGW 30 collects any of a cell ID or a base station ID, a CSG ID, a location registration area ID, and the like (or a plurality of combinations) of the mobile base station 20 accommodating the mobile terminals 10a and 10c, and the mobile terminal (UE) consistent with any of the IDs (or a combination of a plurality of IDs) included in the mobile base station 20 having detected the disconnection is set to a mobile terminal (UE) to be targeted.

Meanwhile, as a method of causing the LGW 30 to collect any of a cell ID or a base station ID, a CSG ID, a location registration area ID, and the like (or a plurality of combinations) of the mobile base station 20 accommodating the mobile terminals 10a and 10c, there is a method of, for example, (1) causing the mobile terminals 10a and 10c to include a cell ID or a base station ID, a CSG ID, and a location registration area ID of the mobile base station 20 in a message transmitted to the LGW 30, or (2) causing the mobile base station 20 to include a cell ID or a base station ID, a CSG ID, and a location registration area ID of the mobile base station 20 in a message transmitted to the LGW 30.

Subsequently, the LGW 30 selects and allocates the SGW 70 serving as a destination of a message in order to perform the bearer update of the identified mobile terminals 10a and 10c (step S2211: SGW selection). Meanwhile, when the SGW 70 is previously allocated at the time of the LIPA connection established, the SGW 70 is used. That is, the LGW 30 may omit the "SGW selection" process. In addition, when the SGW of the core network is previously specified at the time of the LIPA connection, the LGW 30 may select the SGW 70 allocated in the "SGW selection" process again.

In addition, the LGW 30 does not perform the "SGW selection" process, but the UE-MME 60 may perform the "SGW selection" process. For example, the LGW 30 may transmit a message that commands the UE-MME 60 to perform the "SGW selection" process, via a PCRF (Policy and Charging Rules Function) which is a core network device (not shown). Thereby, the UE-MME 60 can utilize an SGW selection function which is previously implemented, and thus LGW device costs can be reduced. The LGW 30 is notified, via the PCRF, of information (for example, contact address or the like) relating to the SGW 70 selected by the UE-MME 60. Alternatively, a subsequent bearer modification process may be performed by the UE-MME 60.

The LGW 30 determining the SGW 70 serving as a relay gateway when the LIPA connection is switches to the RIPA connection transmits a bearer modification request message to the SGW 70 (step S2213: bearer modification request).

Meanwhile, the LGW 30 may issue the bearer modification request message for each bearer. In addition, the LGW 30 may issue the bearer modification request message for each mobile terminal, or for each PDN connection/PDP context. Further, the LGW 30 may collectively issue the bearer modification request message to all the bearers, thereby allowing the LGW 30 to reduce signaling traffic.

The SGW 70 generates a bearer context of the mobile terminal 10a (active mode) and 10c (idle mode) to be targeted for a bearer modification request, and transmits the bearer modification request message to the UE-MME 60 (step S2215: bearer modification request).

The UE-MME 60 updates the bearer context of the mobile terminals 10a and 10c held by the UE-MME 60, based on the received bearer modification request message (for example, updates a contact address or the like of the SGW), and detects any of an active mode and an idle mode from the state recorded in the context of the mobile terminals 10a and 10c. The UE-MME 60 then transmits the bearer modification request to the mobile base station 20, for the active mode UE 10a only (step S2217: bearer modification request (active UE only)). That is, the UE-MME 60 transmits the bearer modification request message for the bearer of the active mode UE 10a to the mobile base station 20, and does not transmit the bearer modification request message for the bearer of the idle mode UE 10c to the mobile base station 20. Thereby, the UE-MME 60 can cause the idle mode of the mobile terminal 10c to be continued, and can reduce the battery consumption of the mobile terminal 10c.

The mobile base station 20 performs the bearer modification process of updating a wireless bearer (particularly, QoS parameter or the like) of the mobile terminal 10a which is in an active mode, based on the received bearer modification response message (step S2219: bearer modification process). When the generation/update of the bearer context is completed, the mobile base station 20 transmits the bearer modification response message to the UE-MME 60 (step S2221: bearer modification response).

The UE-MME 60 transmits the bearer modification response including the states (idle mode and active mode) of the mobile terminals 10a and 10c and other context information to the SGW 69, and the SGW 70 reflects the received context information in its own context data (step S2223: bearer modification response). In the meantime, the UE-MME 60 notifies the SGW 70 of information such as the address or the TEID of the mobile base station 20, in order to update an S1 bearer (bearer between the mobile base station 20 and the SGW 70, which constitutes a portion of the bearer of the UE) of the active mode UE 10a, and the SGW 70 updates (corrects) the bearer context of the active mode UE 10a. An operation of updating such an S1 bearer is not performed on the bearer of the idle mode UE 10c. Further, the SGW 70 transfers the bearer modification response message to the LGW 30 (step S2225: bearer modification response), and the LGW 30 updates its own context data and completes the bearer modification process.

During a service request process performed when the mobile terminal 10c returns from an idle mode afterward, the reestablishment (mainly, reestablishment of a QoS parameter) of the entire communication connection including a wireless bearer is performed (step S2227: service request process, and step S2229: bearer modification process).

<LGW Operation>

Figure 23:
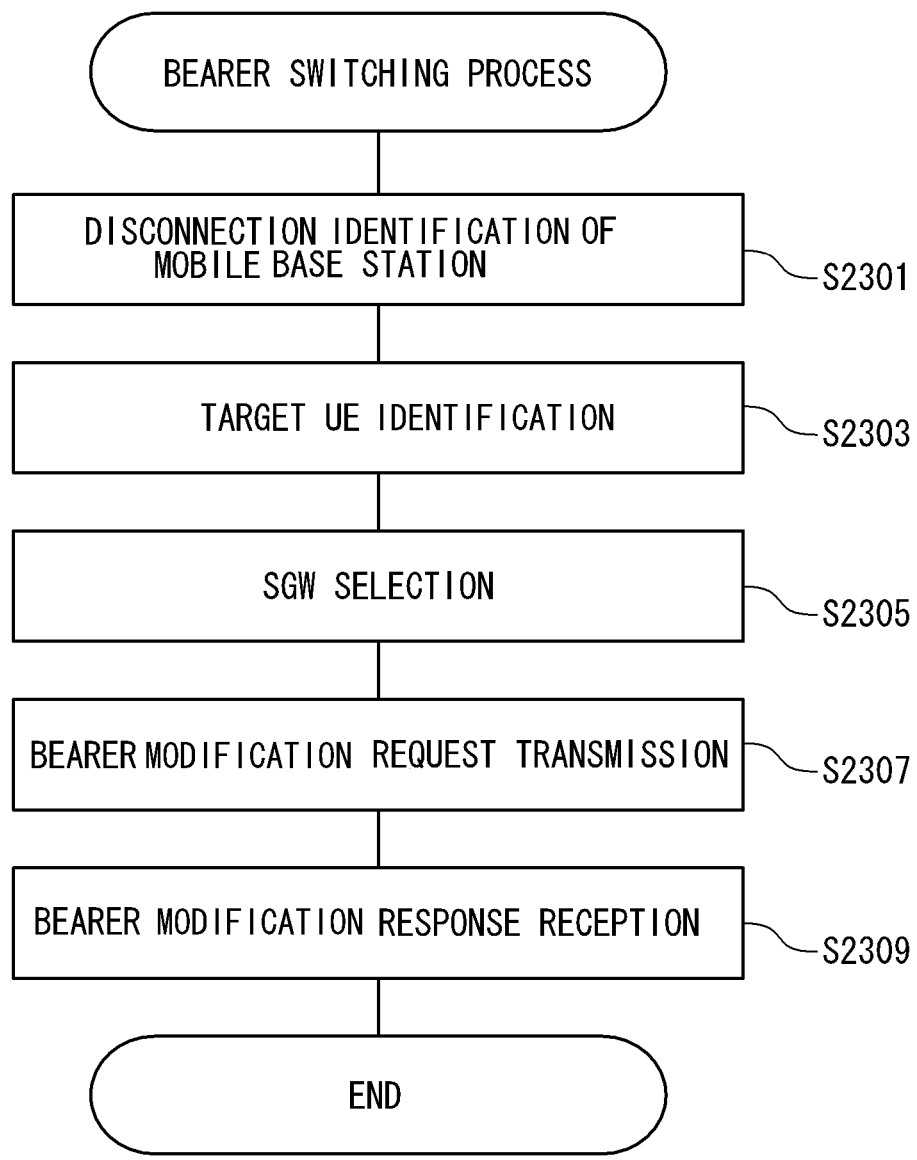
FIG. 23 is a diagram illustrating operations of a LGW 30 according to the third embodiment.

Next, operations of the LGW 30 according to the third embodiment will be described with reference to FIG. 23. FIG. 23 is a diagram illustrating operations of the LGW 30 according to the third embodiment. Meanwhile, the configuration of the LGW 30 according to the present embodiment has the same configuration as that of the LGW 30 according to the second embodiment shown in FIG. 15, and thus the description thereof will be omitted.

As shown in FIG. 23, the mobile base station communication unit 32 detects the disconnection of the mobile base station 20 from the local network through the local communication unit 34 (step S2301: disconnection detection of mobile base station).

The switching processing unit 31 identifies the mobile terminals 10a and 10c in which LIPA connection is established, via the mobile base station 20 (step S2303: target UE identification). For example, when the mobile terminals 10a and 10c establish the LIPA connection, the LGW 30 collects any of a cell ID or a base station ID, a CSG ID, a location registration area ID, and the like (or a plurality of combinations) of the mobile base station 20 accommodating the mobile terminals 10a and 10c, through the local communication unit 34, and the mobile terminal (UE) consistent with any of the IDs (or a combination of a plurality of IDs) included in the mobile base station 20 having detected the disconnection is set to a mobile terminal (UE) to be targeted.

The switching processing unit 31 selects and allocates the SGW 70 serving as a destination of a message in order to perform the bearer update of the identified mobile terminals 10a and 10c (step S2305: SGW selection). Meanwhile, when the SGW 70 is previously allocated at the time of the LIPA connection established, the SGW 70 is used.

The mobile base station communication unit 32 transmits a bearer modification request message to the SGW 70 serving as a relay gateway when the LIPA connection is switched to the RIPA connection through the local communication unit 34 (step S2307: bearer modification request transmission).

The mobile base station communication unit 32 receives a bearer modification response including the states (idle mode and active mode) of the mobile terminals 10a and 10c and other context information from the UE-MME 60 through the local communication unit 34 (step S2309: bearer modification response reception). The "bearer switching process" shown in FIG. 23 is then terminated.

<Operation of MME>

Next, operations of the UE-MME 60 according to the present embodiment will be described with reference to FIGS. 24(a) and 24(b). In addition to the "bearer modification request reception process" flow (1) of the UE-MME 60 according to the third embodiment, the configuration of the UE-MME 60 has the same configuration as that of the UE-MME 60 according to the second embodiment shown in FIG. 17, and thus the description thereof will be omitted.

Figure 24:
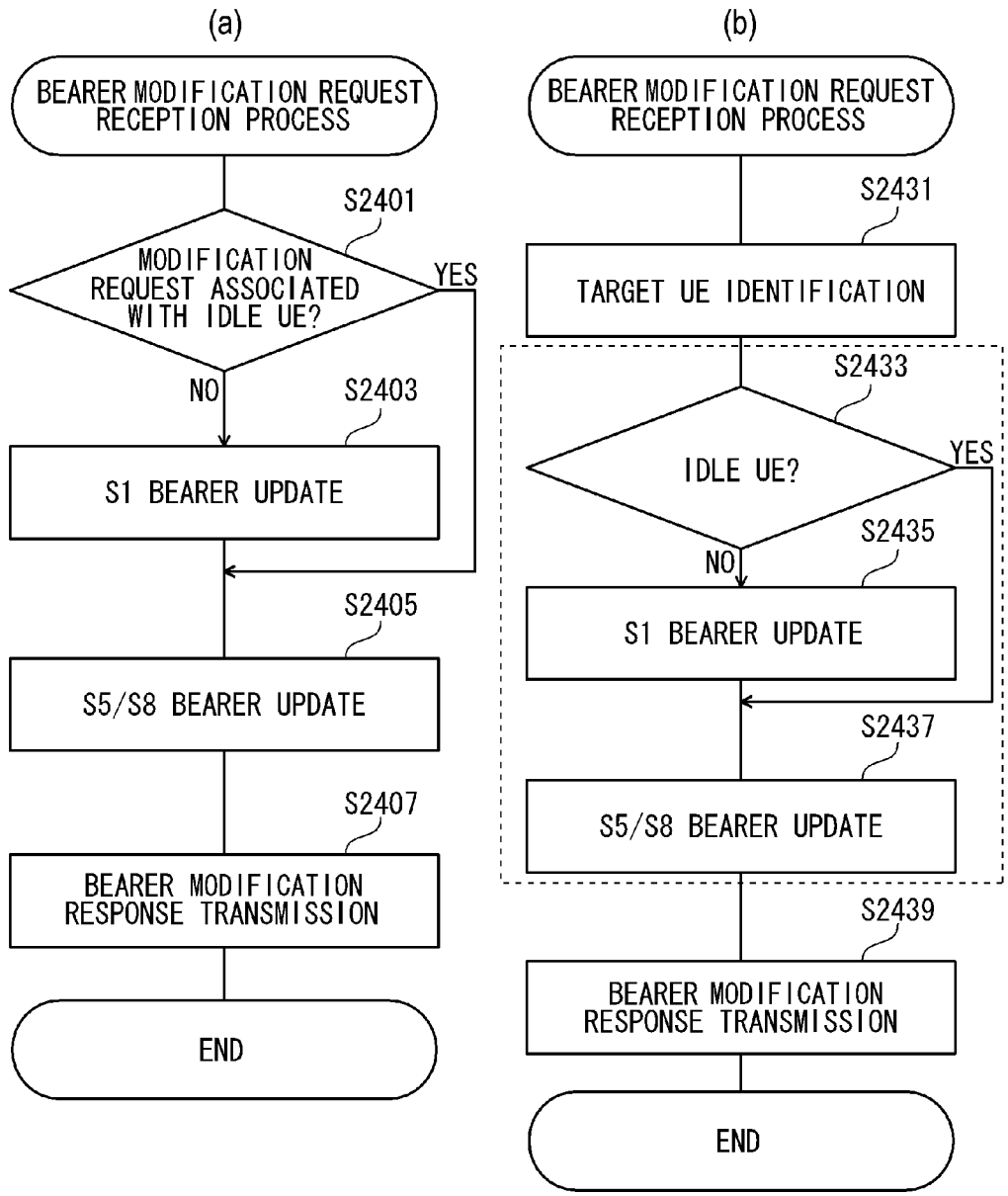
FIG. 24(a) is a flow (1) illustrating a "bearer modification request reception process" of a UE-MME 60 according to the third embodiment.
FIG. 24(b) is a flow (2) illustrating a "bearer modification request reception process" of the UE-MME 60 according to the third embodiment.

As shown in FIG. 24(a), the MME processing unit 61 determines whether the bearer modification request message received from the SGW 70 is associated with the mobile terminal in an idle mode through the communication unit 63 (step S2401: correction request associated with Idle UE?).

When the bearer modification request message is associated with the mobile terminal in an idle mode (if Yes), the process transitions to step S2405. Otherwise (if No), then the process transitions to step S2403.

When the bearer modification request message is not associated with the mobile terminal in an idle mode, the MME processing unit 61 performs a process of updating contexts of an S1 bearer and an S5/S8 bearer to be held (step S2403: S1 bearer update, and step S2405: S5/S8 bearer update).

When the bearer modification request message is associated with the mobile terminal in an idle mode, the MME processing unit 61 updates the context of the S5/S8 bearer to be held (step S2405: S5/S8 bearer update). That is, the update of the S1 bearer is not performed.

The MME processing unit 61 transmits the bearer modification request message for the bearer of the active mode UE 10a to the mobile base station 20 in order to update a wireless bearer (particularly, QoS parameter or the like) of the active mode UE 10a through the communication unit 63. The bearer modification request reception process flow (1) is then terminated.

As shown in FIG. 24(b), the MME processing unit 61 communicates with the LGW 30 via the core network device PCRF through the communication unit 63, and identifies the mobile terminals 10a and 10c in which the LIPA connection is established (step S2431: target UE identification).

The MME processing unit 61 determines whether the identified mobile terminals 10a and 10c are mobile terminals in an idle mode (step 2433: Idle UE?). When the identified mobile terminals 10a and 10c are mobile terminals in an idle mode (if Yes), the process transitions to step S2437. When the identified mobile terminals 10a and 10c are not mobile terminals in an idle mode, the process transitions to step S2435.

When the identified mobile terminals 10a and 10c are not mobile terminals in an idle mode, the MME processing unit 61 updates the contexts of the S1 bearer and the S5/S8 bearer to be held (step S2435: S1 bearer update, and step S2437: S5/S8 bearer update).

When the identified mobile terminals 10a and 10c are mobile terminals in an idle mode, the MME processing unit 61 updates the context of the S5/S8 bearer to be held (step S2437: S5/S8 bearer update).

The MME processing unit 61 transmits the bearer modification request message for the bearer of the active mode UE 10a to the mobile base station 20 in order to update a wireless bearer (particularly, QoS parameter or the like) of the active mode UE 10a through the communication unit 63 (step S2439). The bearer modification request reception process flow (2) is then terminated.

Meanwhile, each process shown in step S2433 to step S2437 is performed on all the identified mobile terminals 10a and 10c.

Fourth Embodiment

In a communication system according to a fourth embodiment, the mobile base station 20 gives notice of information (information specifying the mobile base station 20) relating the mobile base station 20 such as a CSG ID or a cell ID, a base station ID, a location registration area ID, and the like at the time of detecting the switching of a backhaul. The UE-MME 60 detects a mobile terminal (UE) to be switched, and causes the mobile terminals 10a and 10c to perform reconnection to the RIPA connection. For this reason, according to the communication system of the present embodiment, a connection path of the mobile terminal to the local network is switched to any of direct connection or remote connection in accordance with the connection configuration of the mobile base station, and thus an optimum communication path of the mobile terminal can be established.

<Configuration of Communication System>

Figure 25:
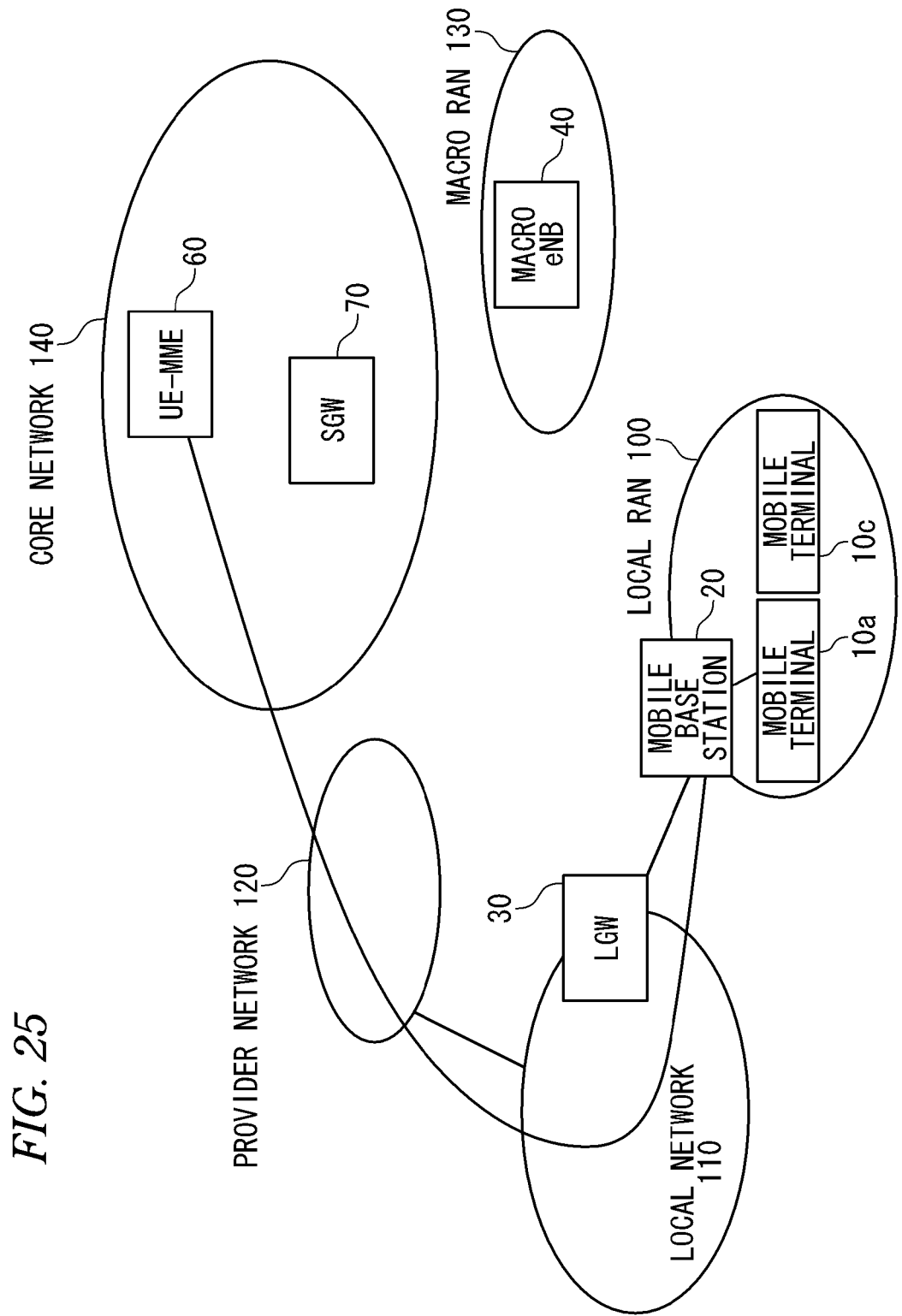
FIG. 25 is a diagram illustrating a configuration of a communication system according to a fourth embodiment.

FIG. 25 is a diagram illustrating a configuration of the communication system according to the fourth embodiment of the present invention. Here, the communication system shown in FIG. 25 is different from the communication system shown in FIG. 1, in that, in the mobile terminals 10a and 10c accommodated by the mobile base station 20, the mobile terminal 10a is the active mode UE, and the mobile terminal 10c is the idle mode UE. The configurations other than this point are the same as those of the first embodiment. In FIG. 25, components common to FIG. 1 are denoted by the same reference numerals and signs.

In FIG. 25, the mobile base station 20 is connected directly to the local network 110. In addition, the mobile terminals 10a and 10c are LIPA-connected to the local network 110 through the mobile base station 20 and the LGW 30. The UE-MME 60 is connected to the core network 140, and performs the management of the states and mobility of the mobile terminals 10a and 10c.

After this, in the present embodiment, for convenience, the mobile terminal 10a which is in an active mode may be referred to as the active mode UE 10a, and the mobile terminal 10c which is in an idle mode may be referred to as the idle mode UE 10c.

Figure 26:
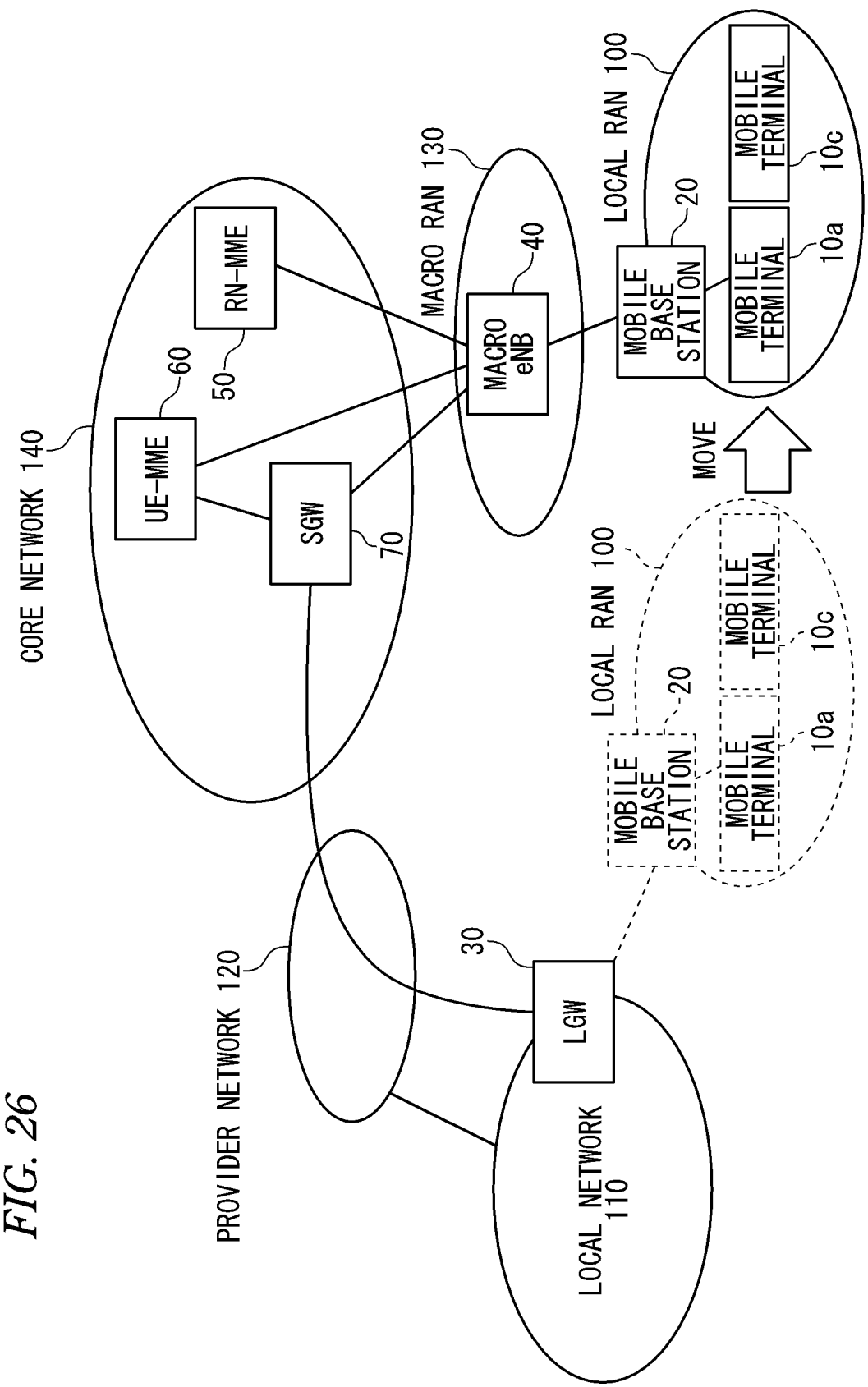
FIG. 26 is a diagram illustrating a state of the communication system according to the fourth embodiment.

FIG. 26 is a diagram illustrating a state of the communication system according to the fourth embodiment, and particularly, shows a state of the communication system when the mobile base station 20 is disconnected from the local network 110, and is connected to the macro eNB 40 of the macro RAN 130. The communication system shown in FIG. 26 is different from the communication system shown in FIG. 2, in that the active mode UE 10a and the idle mode UE 10c are mixed. The configurations other than this point are the same as those of the first embodiment. In FIG. 26, components common to those in FIG. 2 are denoted by the same reference numerals and signs.

<System Operation>

Figure 27:
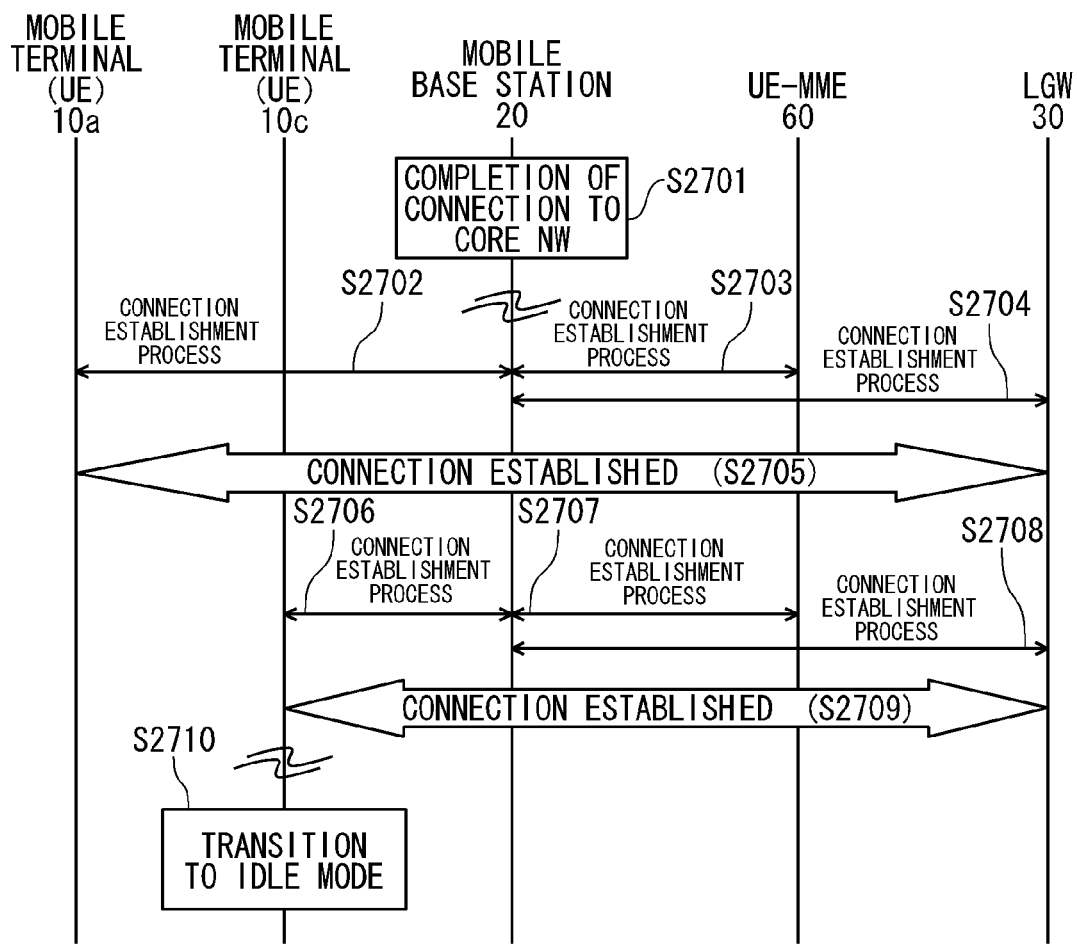
FIG. 27 is a connection sequence diagram of mobile terminals 10a and 10c according to the fourth embodiment.

Operations of the communication system shown in FIGS. 25 and 26 will be described with reference to FIGS. 27 and 28. FIG. 27 is a connection sequence diagram of the mobile terminals 10a and 10c according to the fourth embodiment.

As shown in FIG. 27, prior to the connection of the mobile terminals 10a and 10c, the mobile base station 20 secures the connectivity to the core network 140 via the local network 110 and the provider network 120 (step S2701: completion of connection to core NW). Specifically, the mobile base station 20 establishes secure connection to the core network 140 using a protocol such as PPPoE.

Subsequently, the mobile terminal 10a starts a connection establishment process. When the mobile terminal 10a transmits a connection request to the mobile base station 20, the mobile base station 20 transfers the connection request to the UE-MME 60, and after this, the process is performed based on an initial connection procedure disclosed in TR23.829 (steps S2702 to S2704: connection establishment process). Communication connection for LIPA (for example, PDN connection or PDP context) is established between the mobile terminal 10a and the LGW 30 (S2705: connection established). Similarly to the mobile terminal 10a, the mobile terminal 10c establishes the communication connection for LIPA between the mobile terminal 10c and the LGW 30 (steps S2706 to S2708: connection establishment process, and S2709: connection established).

Further, in the connection sequence shown in FIG. 27, it is assumed that the mobile terminal 10c establishes connection for LIPA, and then transitions to an idle mode (step S2710: transition to idle mode). Thereby, a bearer context relating to the mobile terminal 10c in the mobile base station 20 is deleted.

Figure 28:
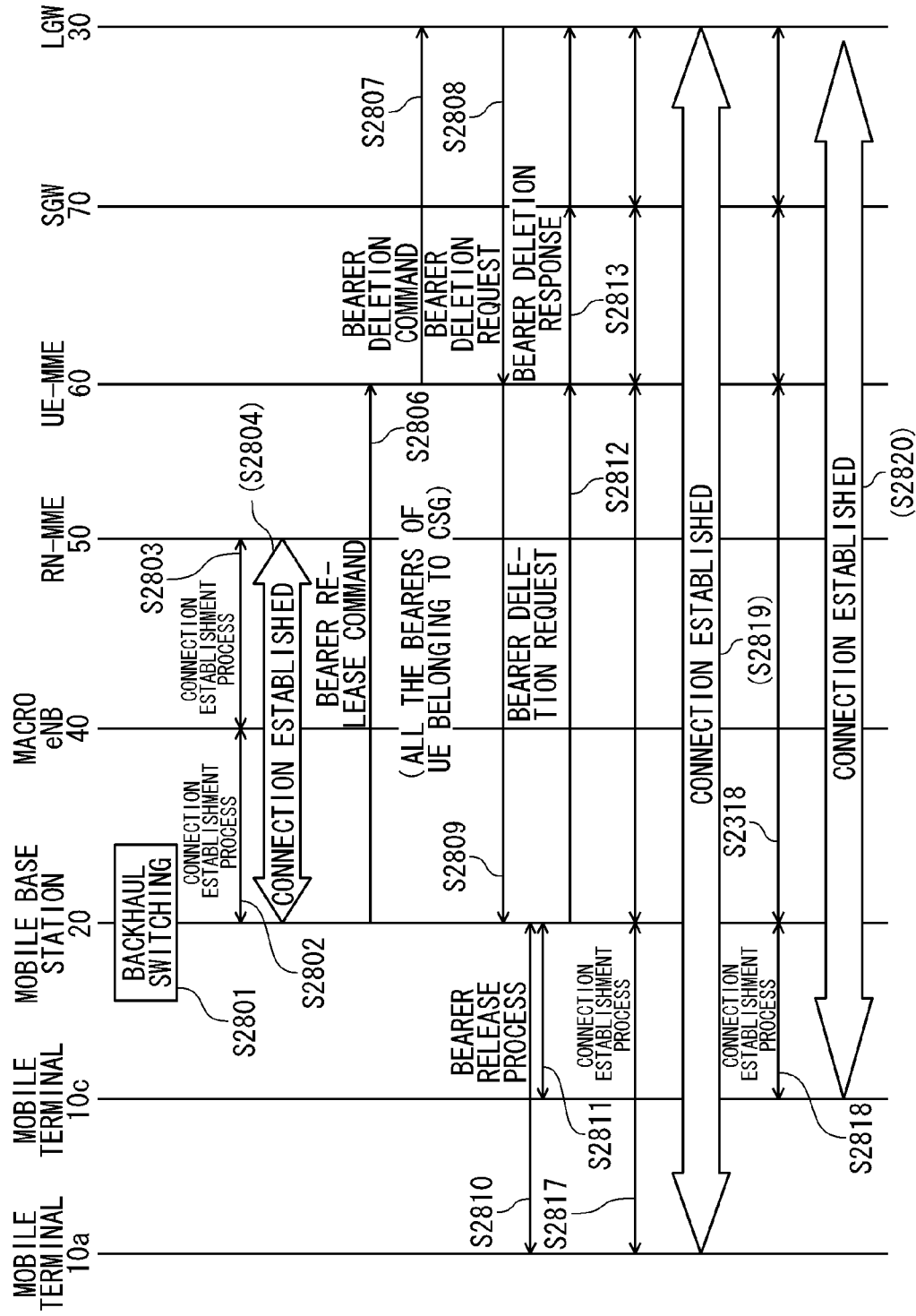
FIG. 28 is a switching sequence diagram of local network connection according to the fourth embodiment.

FIG. 28 is a switching sequence diagram of the local network connection according to the fourth embodiment, and particularly, shows a switching sequence of the local network connection when the local RAN 100 including the mobile base station 20 and the mobile terminals 10a and 10c moves, and is accommodated in the macro eNB 40.

As shown in FIG. 28, the mobile base station 20 switches a backhaul to a cellular channel (step S2801: backhaul switching), and establishes a connection with the macro eNB 40 and the RN-MME 50 (steps S2802 and S2803: connection establishment process, and step S2804: connection established).

Here, in the communication system according to the present embodiment, the mobile base station 20 transmits a bearer release command message for releasing bearers (all the bearers such as an EPS bearer, a PDN connection, a PDP context, and a radio bearer) on which the mobile terminals 10a and 10c located thereunder is established, to the UE-MME 60 (step S2806: bearer release command). At this time, any of a cell ID or a base station ID, a CSG ID, a location registration area ID (for example, tracking area ID, location area ID, and routing area ID) (or a plurality of combinations) are included in the bearer release command message, as identification information for identifying the mobile base station 20.

The UE-MME 60 identifies the mobile terminals 10a and 10c in which the LIPA connection is establish, via the mobile base station 20 based on identification information for identifying the mobile base station 20 included in the bearer release command message. For example, when the mobile terminals 10a and 10c establishes the LIPA connection, the UE-MME 60 collects any of a cell ID or a base station ID, a CSG ID, a location registration ID, and the like (or a plurality of combinations) of the mobile base station 20 accommodating the mobile terminals 10a and 10c, and identifies the mobile terminals 10a and 10c in which the LIPA connection is established, from the mobile base station 20 consistent with an identifier included in the bearer release command message received from the mobile base station 20.

Here, as a method of causing the UE-MME 60 to collect any of cell ID or a base station ID, a CSG ID, a location registration ID, and the like (or a plurality of combinations) of the mobile base station 20 accommodating the mobile terminals 10a and 10c, for example, the mobile terminals 10a and 10c may cause these IDs to be included in a message transmitted to the UE-MME 60, and the mobile base station 20 may cause these IDs to be included in a message transmitted to the UE-MME 60.

The UE-MME 60 transmits a bearer deletion command for the LIPA connection established by the identified mobile terminals 10a and 10c, to the LGW 30 (step S2807: bearer deletion command).

Meanwhile, the UE-MME 60 may issue the bearer modification request message for each bearer. In addition, the UE-MME 60 may issue the bearer modification request message for each mobile terminal, or for each PDN connection/PDP context. Further, the UE-MME 60 may collectively issue the bearer modification request message to all the bearers, thereby allowing the UE-MME 60 to reduce signaling traffic.

The LGW 30 releases a context for the commanded bearer, and transmits a bearer deletion request to the UE-MME 60 (step S2808: bearer deletion request).

The UE-MME 60 transmits the bearer deletion request to the mobile base station 20 (step S2809: bearer deletion request).

The mobile base station 20 causes the mobile terminals 10*a* and 10*c* to perform a bearer release process on the specified bearer (steps S2810 and S2811: bearer release process). Here, the bearer to be targeted is a bearer of the mobile terminals 10*a* and 10*c* accommodated by the mobile base station 20 which are previously identified by the UE-MME 60, and the bearer of the active mode UE 10*a* and the bearer of the idle mode UE 10*c* are also subject to the bearer release process.

When the bearer release process for the mobile base station 20 and the mobile terminals 10*a* and 10*c* is completed, the mobile base station 20 transmits a bearer deletion response message to the UE-MME 60 (step S2812).

The UE-MME 60 releases the context of the bearer to be targeted and then transmits the bearer deletion response message to the LGW 30 (step S2813: bearer deletion response), and the bearer release process is completed. Meanwhile, when the SGW 70 is allocated to the LIPA connection of the mobile terminals 10*a* and 10*c*, the SGW 70 is also involved in the bearer deletion process between the UE-MME 60 and the LGW 30.

The mobile terminals 10*a* and 10*c* in which the bearer constituting the LIPA connection is released perform a reconnection establishment process (steps S2817 and S2818: connection establishment process). At this time, the mobile terminals 10*a* and 10*c* specify the access point name (APN) for LIPA and perform reconnection.

Receiving the reconnection from the mobile terminals 10*a* and 10*c*, the mobile base station 20 (1) performs rewriting to the access point name (APN) for RIPA, or (2) adds information (for example, access point name (APN) for RIPA and switching command flag, or only access point name (APN) for RIPA) that commands switching to the access point name (APN) for RIPA, to the connection request message from the mobile terminals 10*a* and 10*c*, and causes the UE-MME 60 to continue the reconnection establishment process of the mobile terminals 10*a* and 10*c*. By receiving this, the UE-MME 60 selects and allocates the SGW 70 for connection to the APN for RIPA, that is, connection to the LGW 30, and establishes the RIPA connection (step S2819, S2820: connection established).

Meanwhile, the mobile base station 20 may notify the mobile terminals of the access point name (APN) for RIPA during the bearer release process, and may notify the mobile terminals 10*a* and 10*c* of information (for example, flag or the like) that promotes connection to the access point name (APN) for RIPA. By receiving this, the mobile terminals 10*a* and 10*c* specify the access point name (APN) for RIPA, and perform the reconnection establishment process. Thereby, the mobile base station 20 can reduce a load of (1) checking the connection request message from the mobile terminals 10*a* and 10*c* one by one to perform replacement with the access point name (APN) for RIPA, or (2) commanding the UE-MME 60 to perform switching to the access point name (APN) for RIPA. This is means particularly effective in reducing the load in the communication system according to the present embodiment in which a plurality of mobile terminals (UE) are accommodated.

<Operation of Mobile Base Station>

Figure 29:
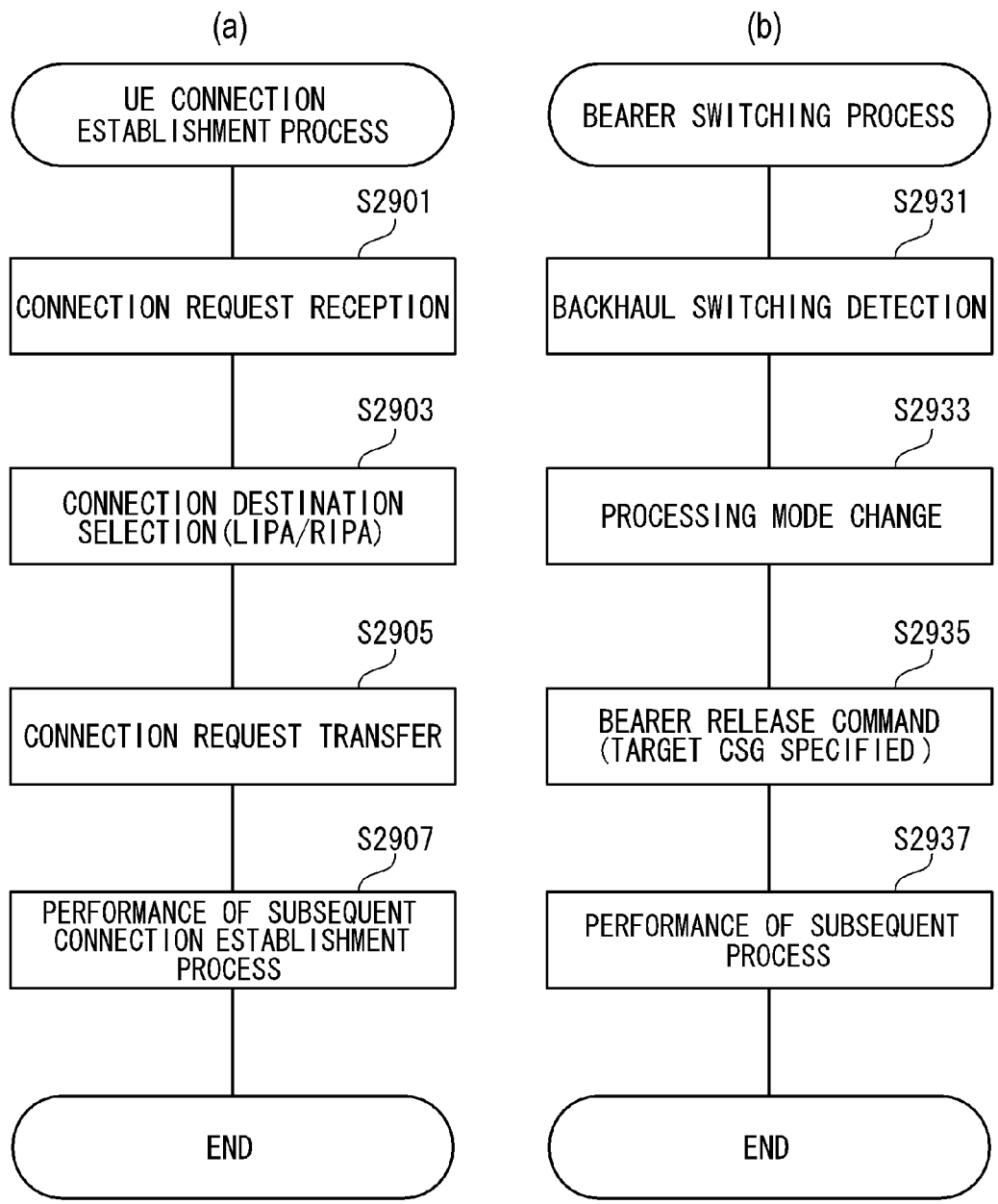
FIG. 29(a) is a flow diagram illustrating a "UE connection establishment process" of a mobile base station 20 according to the fourth embodiment.
FIG. 29(b) is a flow diagram illustrating a "bearer switching process" of the mobile base station 20 according to the fourth embodiment.

Operations of the mobile base station 20 according to the present embodiment will be described with reference to FIGS. 29(*a*) and 29(*b*). FIG. 29(*a*) is a flow diagram illustrating a "UE connection establishment process" of the mobile base station 20 according to the fourth embodiment, and particularly, shows connection establishment process of the mobile terminal (UE) to the local network. In addition, FIG. 29(*b*) is a flow diagram illustrating a "bearer switching process" of the mobile base station 20 according to the fourth embodiment, and particularly, shows bearer switching of the mobile terminal (UE). Meanwhile, the configuration of the mobile base station 20 according to the present embodiment is the same as the configuration of the mobile base station according to the first embodiment shown in FIG. 6, and thus the description thereof will be omitted.

In the "UE connection establishment process" shown in FIG. 29(*a*), when the base station processing unit 25 receives a connection request from the mobile terminal (UE) through the cellular communication unit (UE) 23 (step S2901: connection request reception), the base station processing unit 25 notifies the switching processing unit 26 of that effect.

The switching processing unit 26 selects a connection destination based on the backhaul media used at the time of receiving a notification from the base station processing unit 25 (step S2903: connection destination selection). That is, when the backhaul media is the local communication unit 21, the switching processing unit 26 selects local IP access (LIPA). When the backhaul media is the cellular communication unit (core network) 22, the switching processing unit 26 selects remote access (RIPA) to the local network.

Subsequently, as the access point name (APN) equivalent to the selected connection destination, the access point name (APN) for LIPA or the access point name (APN) for RIPA) is added to the connection request message of the mobile terminals 10*a* and 10*c* (or overwritten to the access point name (APN) which is written in the connection request message), and is transferred to the UE-MME 60 through the base station processing unit 25, and the backhaul media (cellular communication unit (core network) 22 or local communication unit 21) (step S2905: connection transfer request). Afterward, the base station processing unit 25 performs an operation required for the connection establishment process of the mobile terminals (UE), such as a process of the message received from each communication unit (step S2907: performance of subsequent connection establishment process).

In the "bearer switching process" shown in FIG. 29(*b*), when the switching processing unit 26 detects that the switching of the backhaul media is performed (or switching is required) (step S2931: backhaul switching detection), the switching processing unit 26 selects, as a processing mode of the base station processing unit 25, any one mode of (1) a mode operating as the femto base station, and (2) a mode operating as a relay node, and applies the mode to the base station processing unit 25 (step S2933: processing mode change).

Subsequently, the switching processing unit 26 commands the base station processing unit 25 to transmit the bearer modification request message through the cellular communication unit (core network) 22 or the local communication unit 21. Alternatively, the switching processing unit 26 commands the base station processing unit 25 to transmit the bearer release command through the cellular communication unit (core network) 22, the local communication unit 21, or the cellular communication unit (UE) 23 (step S2935: bearer release request (target CSG specified)). Afterward, the base station processing unit 25 performs an operation required for the update process or the release process for a bearer of the mobile terminals 10*a* and 10*c*, such as a process of the message received from each communication unit (step S2937: performance of subsequent process).

<Operation of MME>

Next, operations of the UE-MME 60 according to the present embodiment will be described with reference to FIG.

Figure 30:
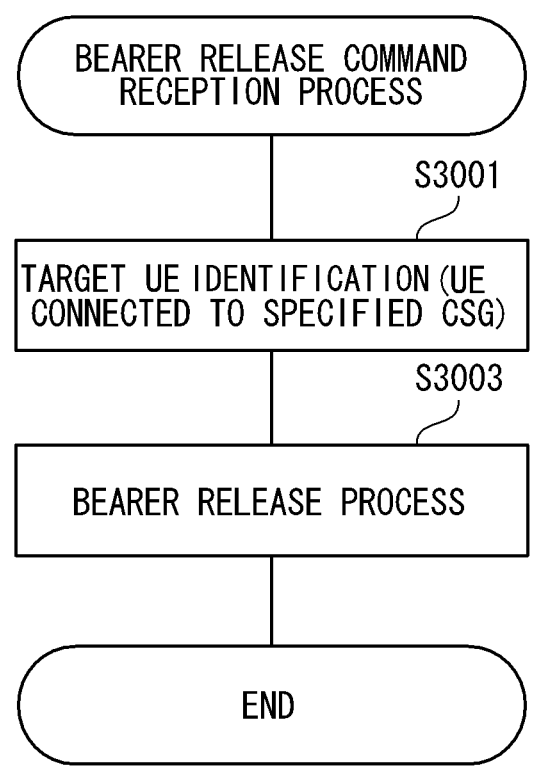
FIG. 30 is a diagram illustrating operations of a UE-MME 60 according to the fourth embodiment.

30. FIG. 30 is a diagram illustrating operations of the UE-MME 60 according to the fourth embodiment. The configuration of the UE-MME 60 according to the present embodiment is the same as the configuration of the UE-MME 60 according to the second embodiment, and thus the description thereof will be omitted.

In the "bearer release command reception process" shown in FIG. 30, first, the MME processing unit 61 identifies the mobile terminals 10a and 10c in which the LIPA connection is established via the mobile base station 20, based on identification information for identifying the mobile base station 20 included in the bearer release command message through the communication unit 63 (step S3001: target UE identification (UE connected to specified CSG)).

The MME processing unit 61 releases a context of the bearer to be targeted through the communication unit 63 and then transmits a bearer deletion response message to the LGW 30, and the bearer release process is completed (step S3003: bearer deletion response).

Fifth Embodiment

In a communication system according to a fifth embodiment, the mobile base station 20 provides information relating to the mobile base station 20 such as a CSG ID or a base station ID, a cell ID, a location registration area ID, and the like, at the time of detecting the switching of a backhaul. The UE-MME 60 detects the mobile terminal (UE) to be switched, and switches the LIPA connection of the mobile terminal (UE) to the RIPA connection. For this reason, according to the communication system of the present embodiment, a connection path of the mobile terminal to the local network is switched to any of direct connection or remote connection in accordance with the connection configuration of the mobile base station, and thus an optimum communication path of the mobile terminal can be established.

<Configuration of Communication System>

Figure 31:
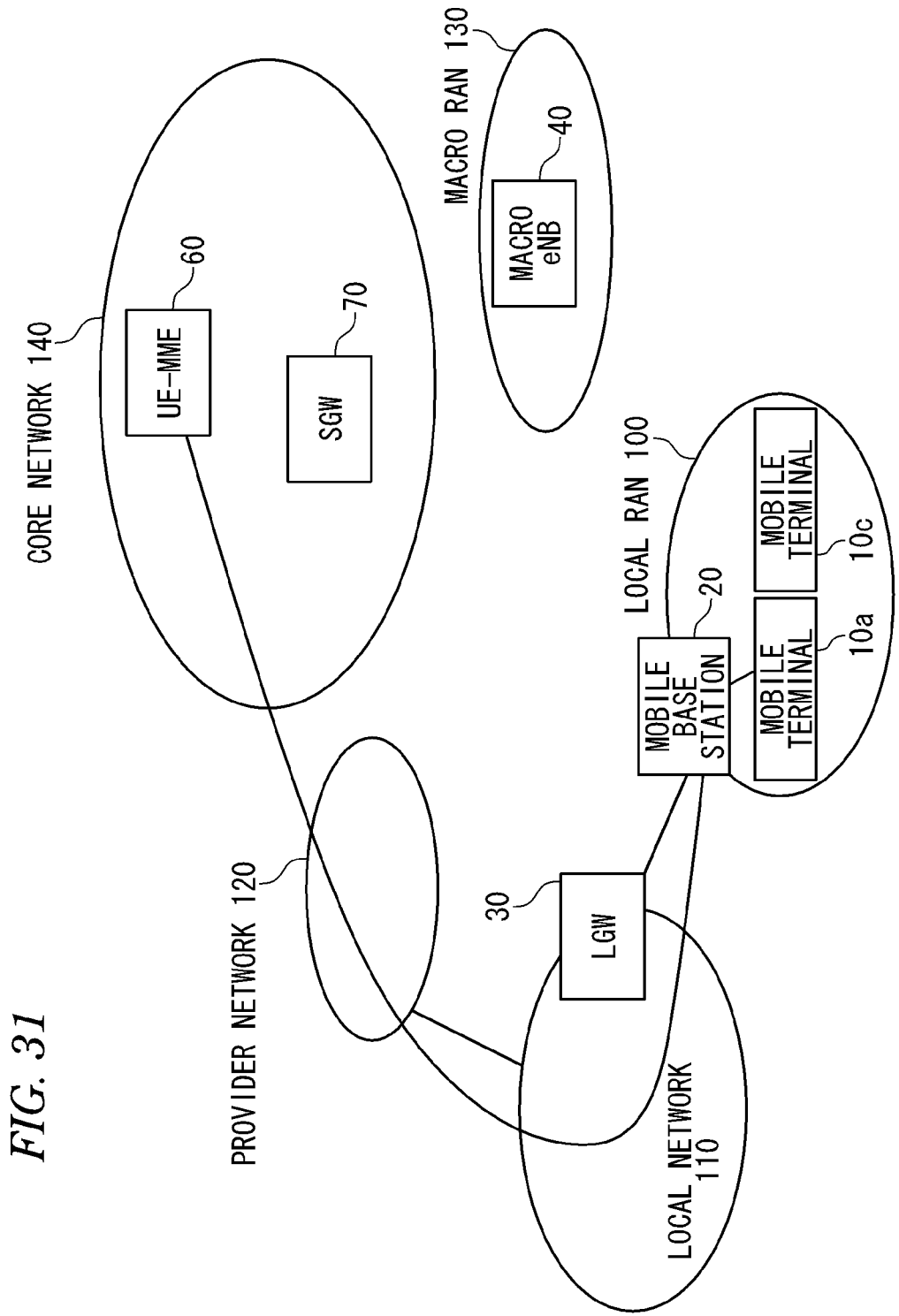
FIG. 31 is a diagram illustrating a configuration of a communication system according to a fifth embodiment.

FIG. 31 is a diagram illustrating a configuration of the communication system according to the fifth embodiment. Here, the communication system shown in FIG. 31 is different from the communication system shown in FIG. 1, in that, in the mobile terminals 10a and 10c accommodated by the mobile base station 20, the mobile terminal 10a is the active mode UE, and the mobile terminal 10c is the idle mode UE. The configurations other than this point are the same as those of the first embodiment. In FIG. 31, components common to FIG. 1 are denoted by the same reference numerals and signs.

In FIG. 31, the mobile base station 20 is connected directly to the local network 110. In addition, the mobile terminals 10a and 10c are LIPA-connected to the local network 110 through the mobile base station 20 and the LGW 30. The UE-MME 60 is connected to the core network 140, and performs the management of the states and mobility of the mobile terminals 10a and 10c.

After this, in the present embodiment, for convenience, the mobile terminal 10a which is in an active mode may be referred to as the active mode UE 10a, and the mobile terminal 10c which is in an idle mode may be referred to as the idle mode UE 10c.

Figure 32:
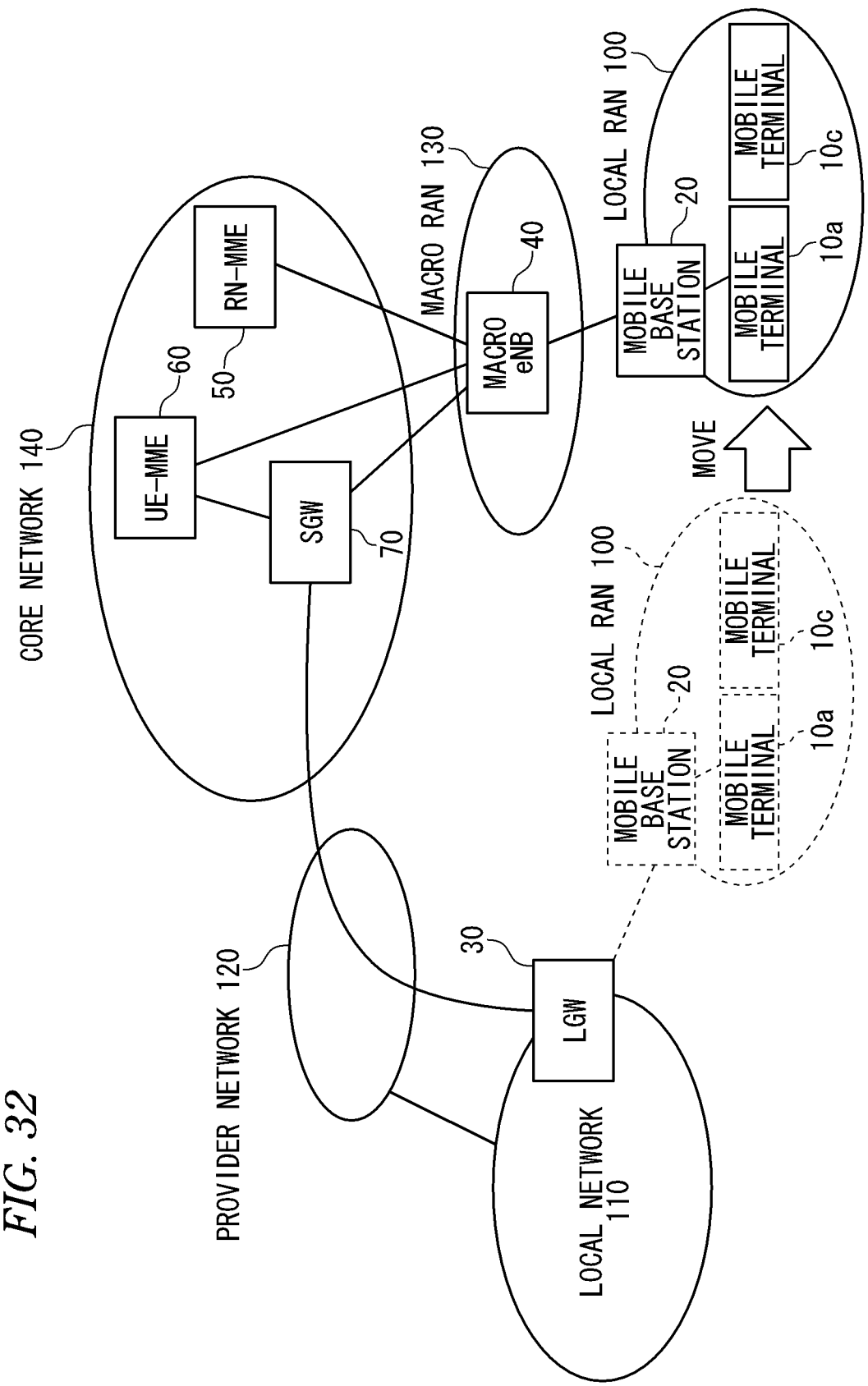
FIG. 32 is a diagram illustrating a state of the communication system according to the fifth embodiment.

FIG. 32 is a diagram illustrating a state of the communication system according to the fifth embodiment, and particularly, shows a state of the communication system when the mobile base station 20 is disconnected from the local network 110, and is connected to the macro eNB 40 of the macro RAN 130. The communication system shown in FIG. 32 is different from the communication system shown in FIG. 2, in that the active mode UE 10a and the idle mode UE 10c are mixed. The configurations other than this point are the same as those of the first embodiment. In FIG. 32, components common to FIG. 2 are denoted by the same reference numerals and signs.

<System Operation>

Figure 33:
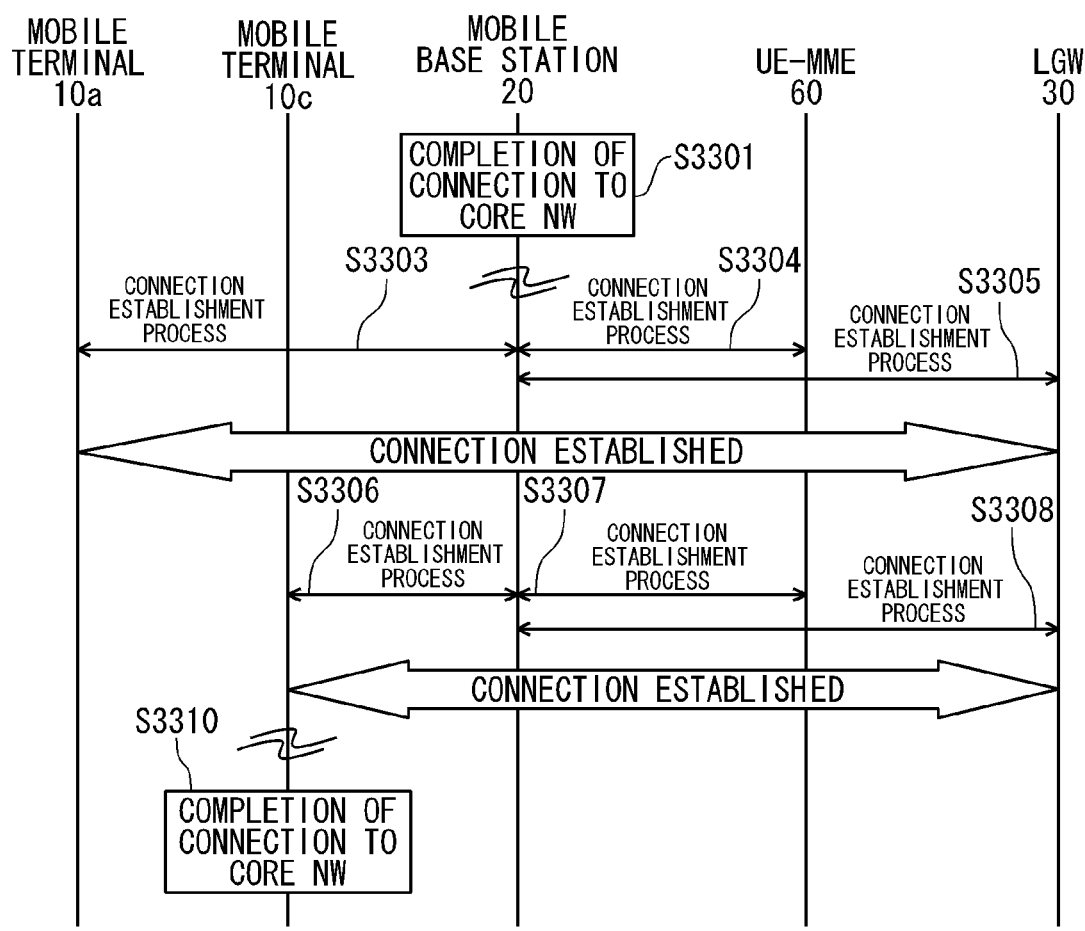
FIG. 33 is a connection sequence diagram of mobile terminals 10a and 10c according to the fifth embodiment.

Operations of the communication system shown in FIGS. 31 and 32 will be described with reference to FIGS. 33 and 34. FIG. 33 is a connection sequence diagram of the mobile terminals 10a and 10c according to the fifth embodiment.

As shown in FIG. 33, prior to the connection of the mobile terminals 10a and 10c, the mobile base station 20 secures the connectivity to the core network 140 via the local network 110 and the provider network 120 (step S3301: completion of connection to core NW). Specifically, the mobile base station 20 establishes secure connection to the core network 140 using a protocol such as PPPoE.

Subsequently, the mobile terminal 10a starts a connection establishment process. When the mobile terminal 10a transmits a connection request to the mobile base station 20, the mobile base station 20 transfers the connection request to the UE-MME 60, and after this, the process is performed based on an initial connection procedure disclosed in TR23.829 (steps S3303 to S3305: connection establishment process). Communication connection for LIPA (for example, PDN connection or PDP context) is established between the mobile terminal 10a and the LGW 30. Similarly to the mobile terminal 10a, the mobile terminal 10c establishes the communication connection for LIPA between the mobile terminal 10c and the LGW 30 (steps S3306 to S3308: connection establishment process).

Further, in the connection sequence shown in FIG. 33, it is assumed that the mobile terminal 10c establishes connection for LIPA, and then transitions to an idle mode (step S3310: transition to idle mode). Thereby, a bearer context relating to the mobile terminal 10c in the mobile base station 20 is deleted.

Next, reference will be made to FIG. 34 to describe a switching sequence of the local network connection when the local RAN 100 including the mobile base station 20 and the mobile terminals 10a and 10c moves, and is accommodated in the macro eNB 40. FIG. 34 is a switching sequence diagram of the local network connection according to the fifth embodiment, and particularly, shows the switching of the local network connection when the local RAN 100 including the mobile base station 20 and the mobile terminals 10a and 10c moves, and is accommodated in the macro eNB 40.

Figure 34:
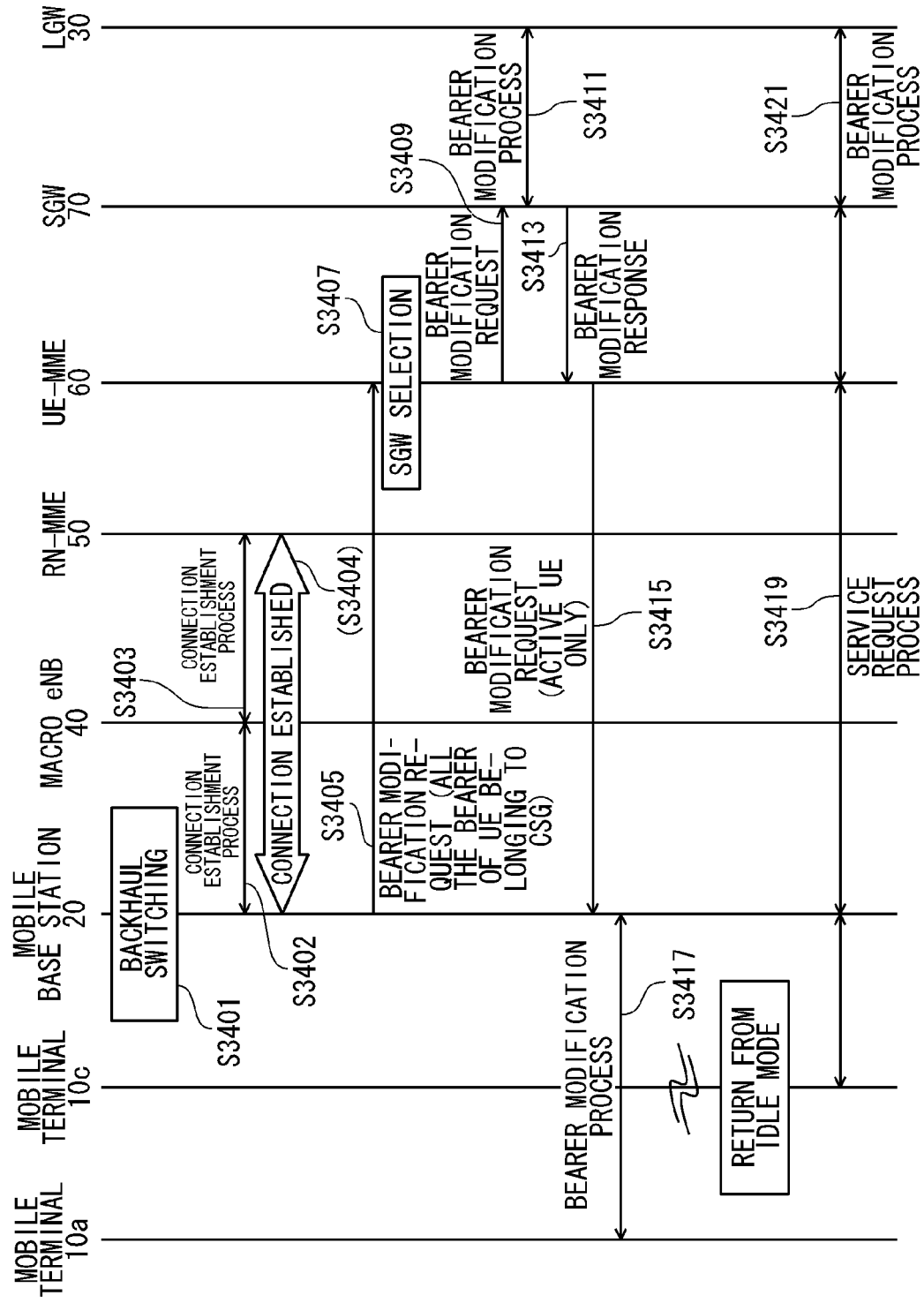
FIG. 34 is a switching sequence diagram of local network connection according to the fifth embodiment.

FIG. 34 is a sequence diagram illustrating a method of commanding bearer release. The mobile base station 20 detects the switching of a backhaul (step S3401: backhaul switching). The backhaul of the mobile base station 20 uses a wired LAN or a wireless LAN such as Ethernet (registered trademark) when being connected to the local network 110. In addition, the mobile base station 20 uses a cellular channel when being connected to the macro RAN. Here, it is detected that the backhaul of the mobile base station 20 is switched, for example, from a wired LAN to a cellular channel.

Meanwhile, as mentioned above, the mobile base station 20 may detects that the backhaul of the mobile base station 20 is actually switched. In addition, the mobile base station 20 may determine that the backhaul of the mobile base station 20 is switched by receiving a signal that commands the switching of the backhaul of the mobile base station 20. It is considered that the signal commanding the switching of the backhaul of the mobile base station 20 is, for example, a switching command signal which is input through a screen or a button by a user, a switching command signal which is remotely input, or the like. At that time, further, when the mobile base station 20 determines that the backhaul of the mobile base station 20 is switched in a point of time when the connectivity of backhaul media of a switching destination is confirmed, the mobile base station 20 can switch the backhaul media accurately by preventing false detection.

When the backhaul switching to a cellular channel is detected, the mobile base station 20 performs a connection establishment process to the RN-MME 50 through the macro eNB 40 (steps S3402 and S3403: connection establishment process), and establishes communication connection for accommodating UE traffic (step S3404: connection established). Detailed operations for establishing the communication connection can use, for example, a procedure as disclosed in TR36.806.

In step S3404, when the connection for accommodating UE traffic is established, the mobile base station 20 transmits a bearer modification request message for switching the LIPA connection established by the mobile terminals 10a and 10c located thereunder to the RIPA connection, to the UE-MME 60 (step S3405: bearer modification request). At this time, any of a cell ID or a base station ID, a CSG ID, and a location registration area ID (or a plurality of combinations) is included in the bearer modification request message, as information for identifying the mobile base station 20.

The UE-MME 60 having received the bearer modification request message identifies the mobile terminals 10a and 10c in which the LIPA connection is established, via the mobile base station 20. For example, when the mobile terminals 10a and 10c establish the LIPA connection, the UE-MME 60 collects any of a cell ID or a base station ID, a CSG ID, a location registration area ID, and the like (or a plurality of combinations) of the mobile base station 20 accommodating the mobile terminals 10a and 10c, and identifies the mobile terminals 10a and 10c in which LIPA connection is established, from the mobile base station 20 consistent with an identifier included in the bearer modification request message received from the mobile base station 20.

Here, as a method of causing the UE-MME 60 to collect any of cell ID or a base station ID, a CSG ID, a location registration area ID, and the like (or a plurality of combinations) of the mobile base station 20 accommodating the mobile terminals 10a and 10c, for example, the mobile terminals 10a and 10c may cause these IDs to be included in a message transmitted to the UE-MME 60, and the mobile base station 20 may cause these IDs to be included in a message transmitted to the UE-MME 60.

In addition, the mobile base station 20 commands the switching of a connection destination of a bearer to be targeted from the access point name (APN) for LIPA to the access point name (APN) for RIPA, in the bearer modification request message. For example, the access point name (APN) for RIPA may be added to the message, and information (for example, flag) that commands APN switching explicitly may be further added to the message.

Meanwhile, the mobile base station 20 may issue the bearer modification request message for each bearer. In addition, the mobile base station 20 may issue the bearer modification request message for each mobile terminal, or for each PDN connection/PDP context. Further, the mobile base station 20 may collectively issue the bearer modification request message to all the bearers, thereby allowing the mobile base station 20 to reduce signaling traffic.

The UE-MME 60 receiving a bearer modification request selects and allocates the SGW 70 for connection to the access point name (APN) for RIPA (step S3407: SGW selection), and transmits the bearer modification request message to which a contact address or the like of the LGW 30 is added, to the SGW 70 (step S3409: bearer modification request).

The SGW 70 receiving the message generates the bearer context of the mobile terminals 10a and 10c to be targeted, and transfers the bearer modification request message to the LGW 30. The LGW 30 corrects the bearer context (for example, contact address or the like of the SGW) of the mobile terminals 10a and 10c to be targeted, and performs a bearer modification process such as the transmission of the bearer modification response message to the SGW 70 (step S3411: bearer modification process).

When the SGW 70 completes the generation/update of the bearer context, the SGW 70 transmits the bearer modification response message to the UE-MME 60 (step S3413: bearer modification response).

The UE-MME 60 detects any of an active mode and an idle mode from the state recorded in the context of the mobile terminals UE 10a and 10c to be targeted. Only when the mobile terminal is in an active mode, the UE-MME 60 performs the bearer modification response message on the mobile base station 20 (step S3415: bearer modification request (active UE only)). That is, the UE-MME 60 transmits the bearer modification request message for the bearer of the active mode UE 10a to the mobile base station 20, and does not transmit the bearer modification request message for bearer of the idle mode UE 10c to the mobile base station 20. Thereby, the UE-MME 60 can cause the idle mode of the mobile terminal 10c to be continued, and can reduce the battery consumption of the mobile terminal 10c.

The mobile base station 20 performs the bearer modification process of updating a wireless bearer (particularly, QoS parameter or the like) of the mobile terminal 10a which is in an active mode, based on the received bearer modification response message (step S3417: bearer modification process).

During a service request process performed when the mobile terminal 10c returns from an idle mode afterward, the reestablishment (mainly, reestablishment of a QoS parameter) of the entire communication connection including a wireless bearer is performed (step S3419: service request process, and step S3421: bearer modification process).

<Operation of Mobile Base Station>

Figure 35:
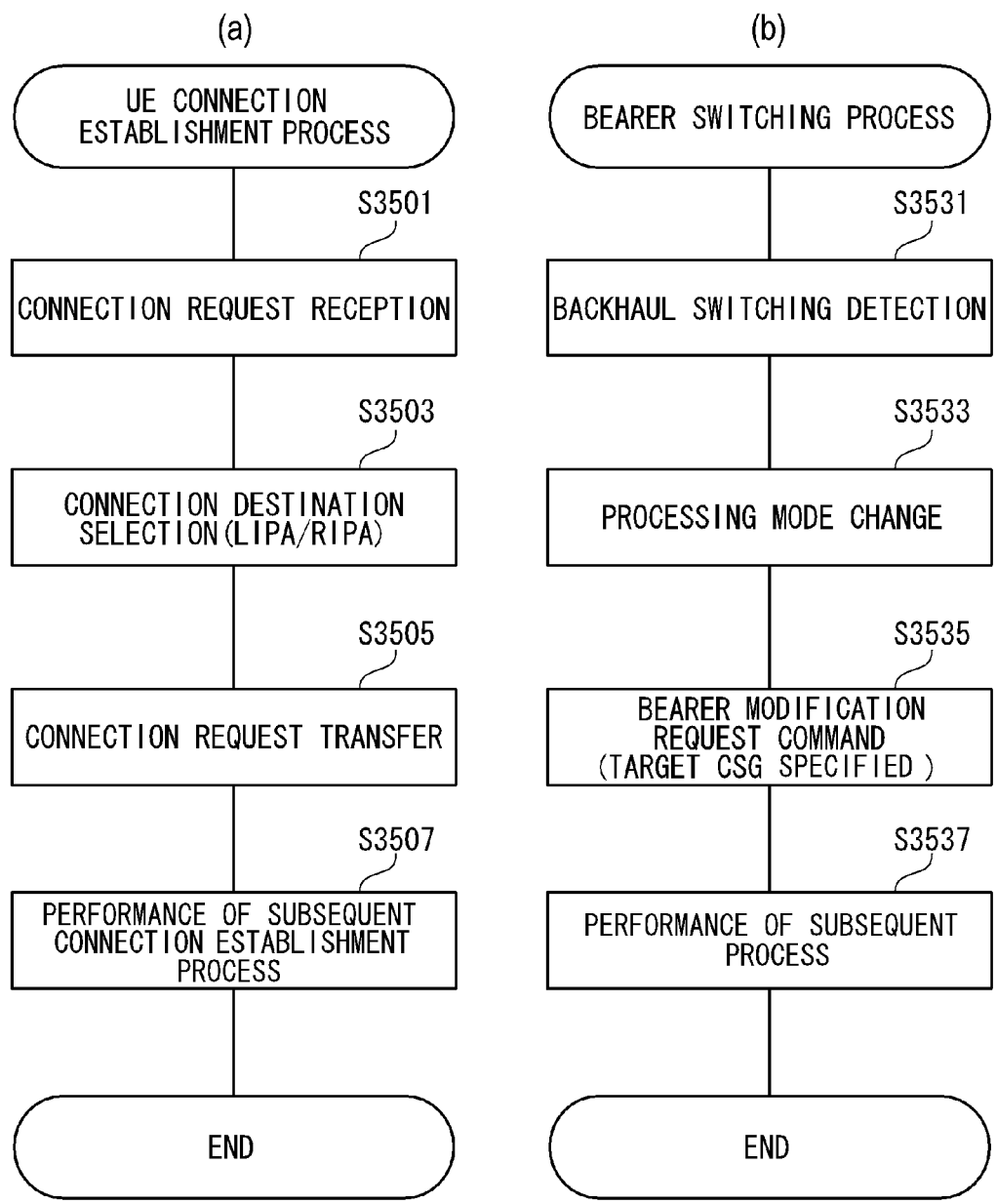
FIG. 35(a) is a flow diagram illustrating a "UE connection establishment process" of a mobile base station 20 according to the fifth embodiment.
FIG. 35(b) is a flow diagram illustrating a "bearer switching process" of the mobile base station 20 according to the fifth embodiment.

Next, operations of the mobile base station 20 according to the present embodiment will be described with reference to FIG. 35. Meanwhile, the configuration of the mobile base station 20 according to the present embodiment is the same as the configuration of the mobile base station 20 according to the first embodiment shown in FIG. 6, and thus the detailed description thereof will be omitted.

Here, operations of the mobile base station 20 according to the present embodiment will be described with reference to FIGS. 35(a) and 35(b). FIG. 35(a) is a flow diagram illustrating a "UE connection establishment process" of the mobile base station 20 according to the fifth embodiment, and FIG. 35(b) is a flow diagram illustrating a "bearer switching process" of the mobile base station 20 according to the fifth embodiment.

In the "UE connection establishment process" shown in FIG. 35(a), when the base station processing unit 25 receives a connection request from the mobile terminal (UE) through the cellular communication unit (UE) 23 (step S3501: connection request reception), the base station processing unit 25 notifies the switching processing unit 26 of that effect.

The switching processing unit 26 selects a connection destination based on the backhaul media used at the time of receiving a notification from the base station processing unit 25 (step S3503: connection destination selection). That is, when the backhaul media is the local communication unit 21, the switching processing unit 26 selects local IP access (LIPA).

When the backhaul media is the cellular communication unit (core network) 22, the switching processing unit 26 selects remote access (RIPA) to the local network.

Subsequently, as the access point name (APN) equivalent to the selected connection destination, the access point name (APN) for LIPA or the access point name (APN) for RIPA) is added to the connection request message of the mobile terminals 10a and 10b (or overwritten to the access point name (APN) which is written in the connection request message), and is transferred to the UE-MME 60 through the base station processing unit 25, and the backhaul media (cellular communication unit (core network) 22 or local communication unit 21) (step S3505: connection transfer request). Afterward, the base station processing unit 25 performs an operation required for the connection establishment process of the mobile terminals (UE), such as a process of the message received from each communication unit (step S3507: performance of subsequent connection establishment process).

In the "bearer switching process" shown in FIG. 35(b), when the switching processing unit 26 detects that the switching of the backhaul media is performed (or switching is required) (step S3531: backhaul switching detection), the switching processing unit 26 selects, as a processing mode of the base station processing unit 25, any one mode of (1) a mode operating as the femto base station, and (2) a mode operating as a relay node, and applies the mode to the base station processing unit 25 (step S3533: processing mode change).

Subsequently, the switching processing unit 26 commands the base station processing unit 25 to transmit the bearer modification request message through the cellular communication unit (core network) 22 or the local communication unit 21. Alternatively, the switching processing unit 26 commands the base station processing unit 25 to transmit the bearer release command through the cellular communication unit (core network) 22, the local communication unit 21, or the cellular communication unit (UE) 23 (step S3535: bearer modification request command). Afterward, the base station processing unit 25 performs an operation required for the update process or the release process for a bearer of the mobile terminals 10a and 10b, such as a process of the message received from each communication unit (step S3537: performance of subsequent process).

<Operation of MME>

Next, the configuration of the UE-MME 60 according to the present embodiment is the same as the configuration of the UE-MME 60 according to the second embodiment shown in FIG. 17, and thus the description thereof will be omitted.

Figure 36:
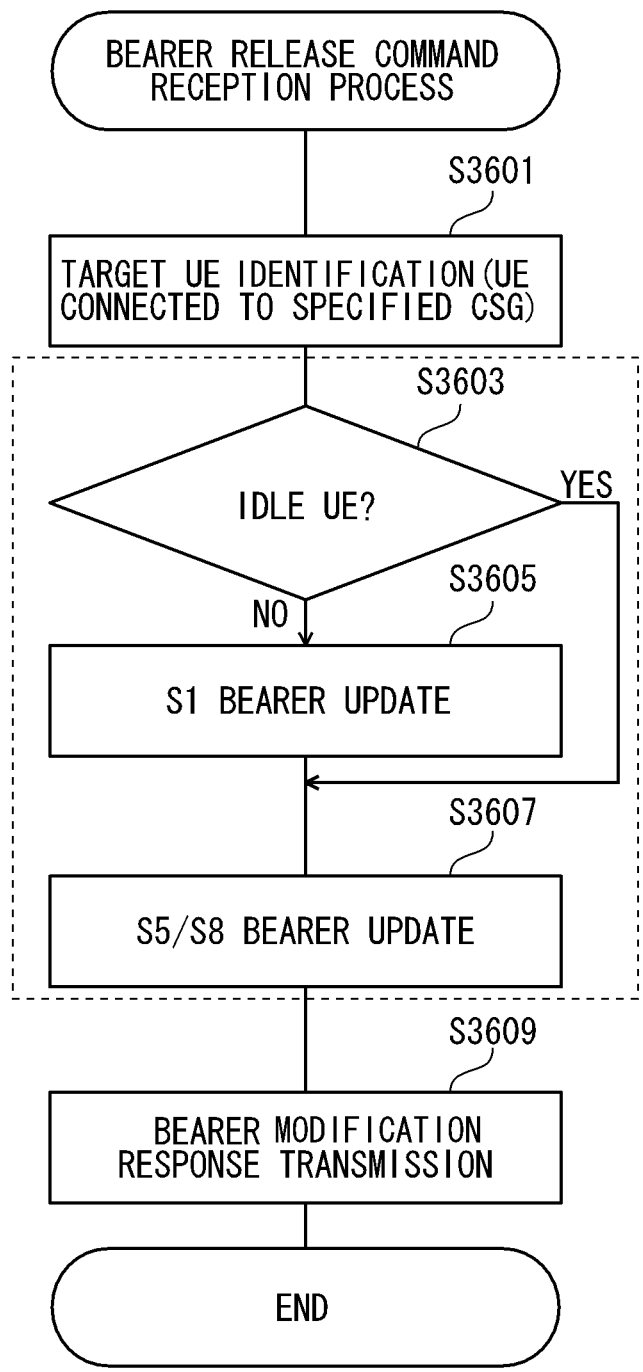
FIG. 36 is a diagram illustrating operations of a UE-MME 60 according to the fifth embodiment.

Operations of the UE-MME 60 according to the present embodiment will be described with reference to FIG. 36. FIG. 36 is a diagram illustrating operations of the UE-MME 60 according to the present embodiment.

In a "bearer release command reception process" shown in FIG. 36, the MME processing unit 61 identifies the mobile terminals 10a and 10c in which the LIPA connection is established via the mobile base station 20, through the communication unit 63 (step S3601: target UE identification).

The MME processing unit 61 determines whether the identified mobile terminals 10a and 10c are mobile terminals in an idle mode (step 3603: Idle UE?). When the identified mobile terminals 10a and 10c are mobile terminals in an idle mode (if Yes), the process transitions to step S3607. When the identified mobile terminals 10a and 10c are not mobile terminals in an idle mode, the process transitions to step S3605.

When the identified mobile terminals 10a and 10c are not mobile terminals in an idle mode, the MME processing unit 61 updates the contexts of the S1 bearer and the S5/S8 bearer to be held (step S3605: S1 bearer update, and step S3607: S5/S8 bearer update).

When the identified mobile terminals 10a and 10c are mobile terminals in an idle mode, the MME processing unit 61 updates the context of the bearer to be held S5/S8 (step S3607: S5/S8 bearer update). That is, the context of the S1 bearer is not updated.

The MME processing unit 61 transmits the bearer modification response message for the bearer of the active mode UE 10a to the mobile base station 20, in order to update a wireless bearer (particularly, QoS parameter or the like) of the active mode UE 10a, through the communication unit 63 (step S3609: bearer modification response transmission).

Meanwhile, each process shown in step S3603 to step S3607 is performed on all the identified mobile terminals 10a and 10c.

Meanwhile, in each of the above-mentioned embodiments, the operations in the case of switching from the LIPA connection to the RIPA connection have been illustrated, but reverse switching can also be performed by the same operations.

Further, in each of the above-mentioned embodiment, when the mobile terminal (UE) establishes or hands over the connection to the macro PDN, the mobile base station 20 initiates (performs) the bearer modification process (particularly, correction of S1 bearer) at the time of the detection of backhaul change. Alternatively, the mobile terminal (UE) or the UE-MME is commanded to initiate the bearer modification process. Thereby, the SGW and the S1 bearer context of the mobile base station 20, as necessary, are updated (mobile base station address/TEID, SGW address/TEID, or the like is updated).

In addition, in each of the above-mentioned embodiments, particularly, a 3GPP SAE (System Architecture Evolution) system is taken by way of example, but an application to cellular communication systems or WiMAX systems specified in UMTS or GPRS, and 3GPP2 in the related art can also be made by a slight change of message names, parameters or the like. Here, the operations described in each of the above-mentioned embodiments can be applied to other systems by those skilled in the art, without substantial changes.

Here, reference will be made to FIGS. 37 to 40 to describe operations in systems including so-called non-GPRS based public wireless access systems such as 3GPP2, WiMAX, and WLAN, and public wired access systems using Ethernet (registered trademark), dial-up or the like (hereinafter, collectively called public access, a public system, a Non-3GPP access system, and the like).

Figure 37:
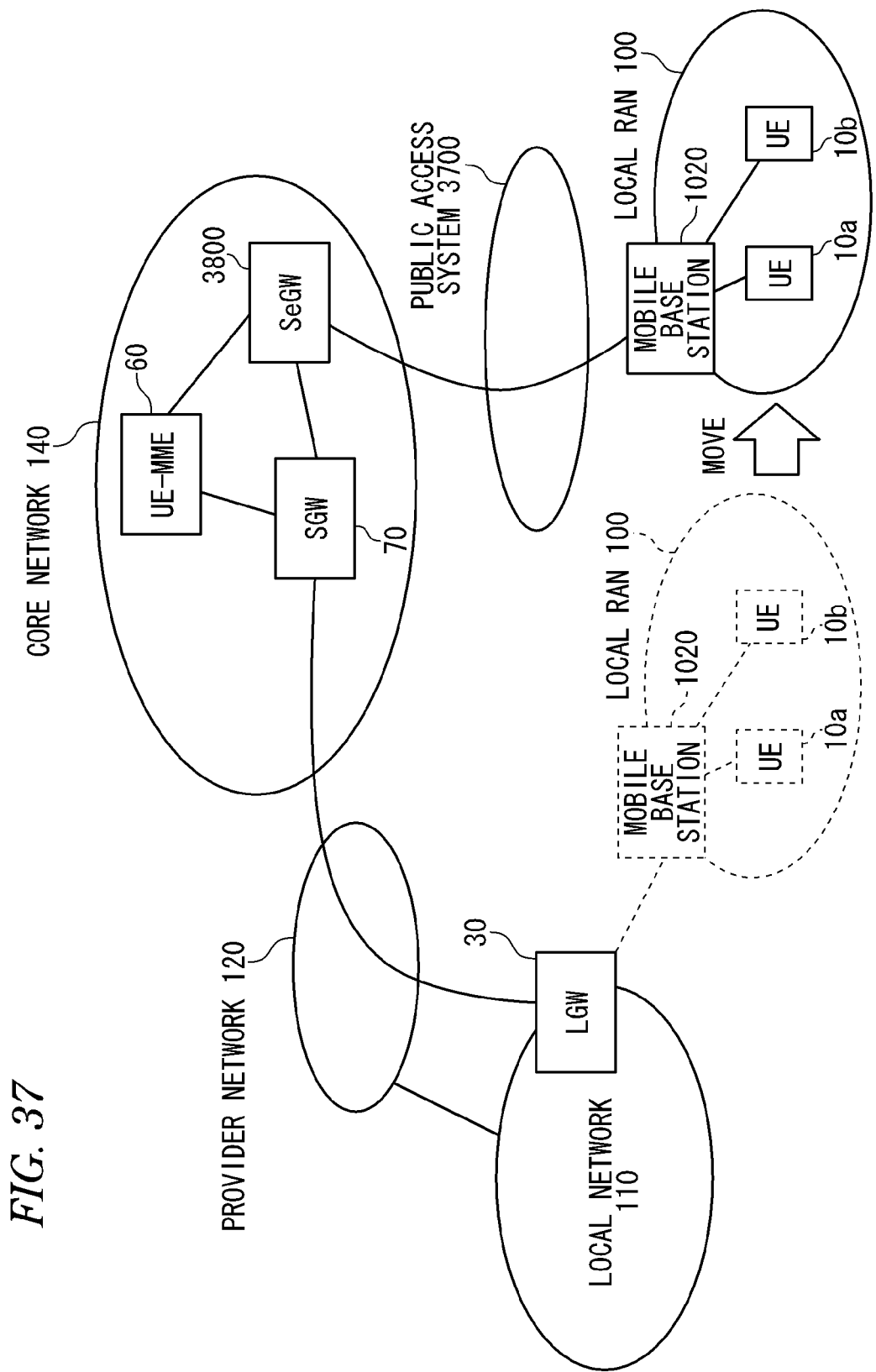
FIG. 37 is a diagram illustrating a configuration of a communication system including a public access system 3700 formed by technology such as WiMAX, WLAN, and 3GPP2.

FIG. 37 is a diagram illustrating a configuration of a communication system including a public access system 3700 constituted by techniques such as WiMAX, WLAN, 3GPP2, and Ethernet (registered trademark). The above communication system is mainly different from a communication system targeting 3GPP SAE/LTE, for example, the system shown in FIG. 2 in that the public access system 3700 is included, and that a security gateway (SeGW) 3800 for connection to the core network 140 via the public access system 3700 is disposed in the core network 140. Meanwhile, for the purpose of simple description, the macro RAN 130 is omitted from the configuration diagram, but the macro RAN 130 and the entity (for example, RN-MME 50) of the core network 140 accommodating the macro RAN may be included together.

Figure 38:
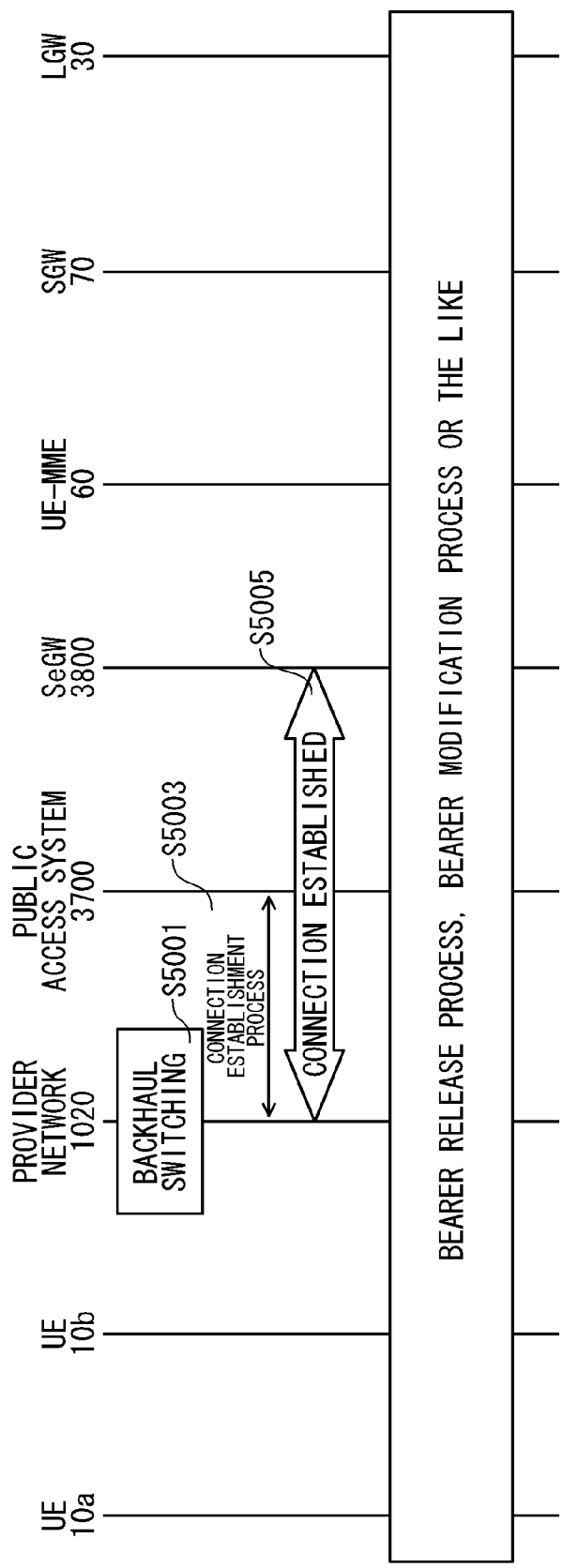
FIG. 38 is a diagram illustrating operations of the communication system shown in FIG. 37.

FIG. 38 is a diagram illustrating operations of the communication system shown in FIG. 37. When a mobile base station 1020 detects connectable public access in the detection of backhaul switching (performance by the detection of a relevant frequency, the detection of connectability through a report channel, and the like) (step S5001: backhaul switching), a mode operating as the femto base station that performs remote access to the local network via the public access is selected, and a connection establishment process to the public access is performed (step S5003: connection establishment process). Thereafter, secure connection to the security gateway (SeGW) 3800 is established for connection to the core network 140 (step S5005: connection established). The secure connection can use an L2 tunnel, an IPsec tunnel or the like. Thereby, the mobile base station 1020 completes a preparation for switching the LIPA connection to the local network of the mobile terminals 10a and 10b located thereunder to the RIPA connection, and issues the bearer release process, the bearer modification process or the like, as described in the above embodiments. Thus, a process of switching the LIPA connection to the RIPA connection is performed.

Figure 39:
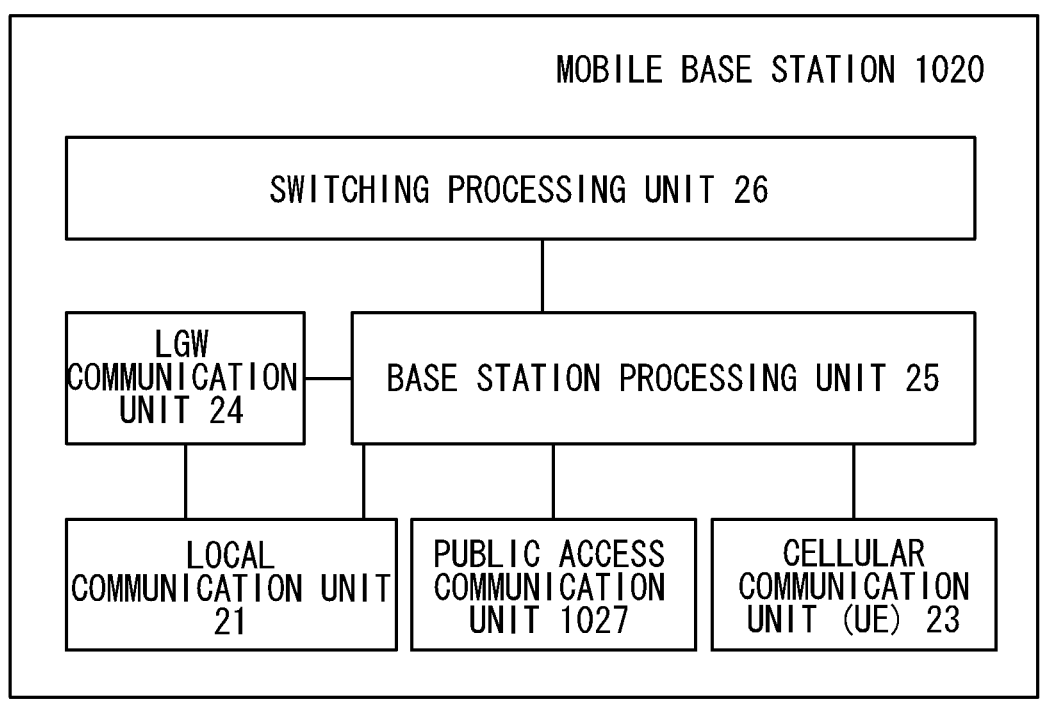
FIG. 39 is a diagram illustrating a configuration of a mobile base station 1020 in the communication system shown in FIG. 37.

FIG. 39 is a diagram illustrating a configuration of the mobile base station 1020 in the communication system shown in FIG. 37. The above configuration is different from the configuration of the mobile base station illustrated so far, in that a public access communication unit 1027 is included. Meanwhile, for the purpose of simple description, the cellular communication unit (core network) 22 for connection the macro RAN 130 is omitted, but the cellular communication unit may be included together.

Figure 40:
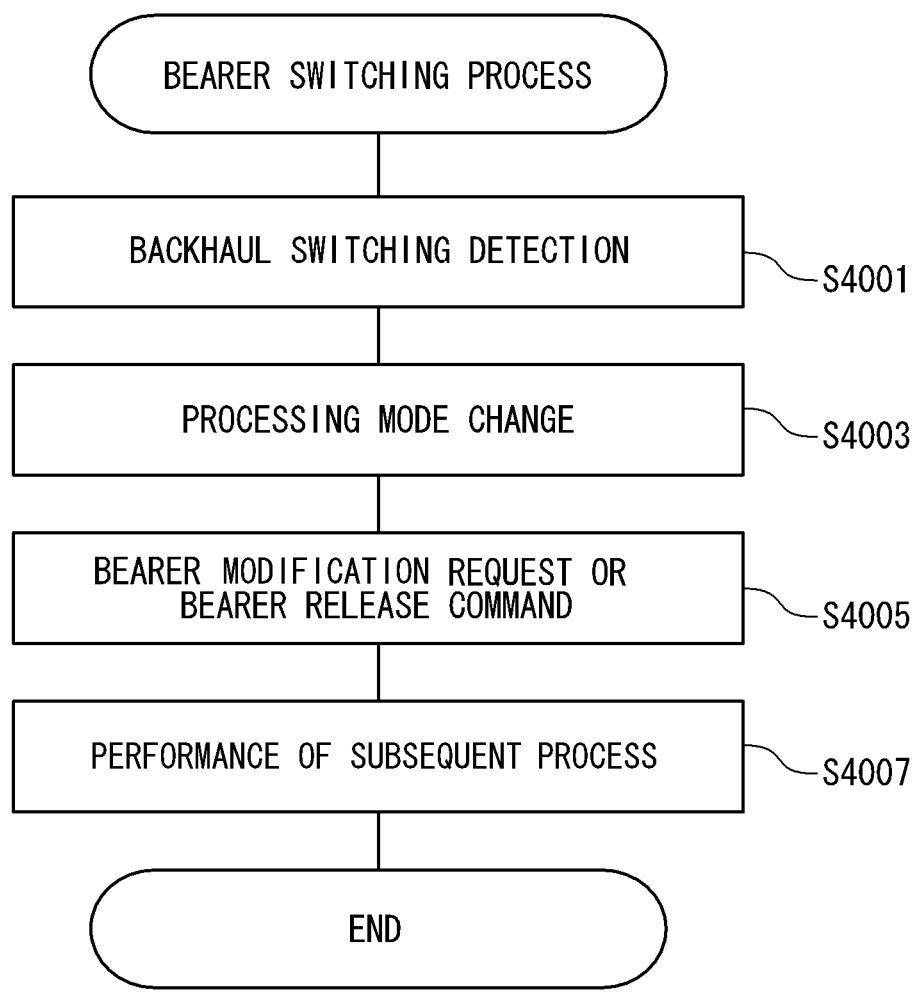
FIG. 40 is a flow diagram illustrating a bearer switching process of the mobile base station 1020 shown in FIG. 39.

FIG. 40 is a flow diagram illustrating a bearer switching process of the mobile base station 1020 shown in FIG. 39. When the public access system constituted by techniques such as WiMAX, WLAN, and 3GPP2 is detected based on information from the local communication unit 21 or the public access communication unit 1027 (step S4001: backhaul switching detection), the switching processing unit 26 selects a mode operating as the femto base station that performs remote access to the local network via the public access via, and applies the mode to the base station processing unit 25 (step S4003: processing mode change). The base station processing unit 25 is connected to the public access system 3700, and establishes security connection to the SeGW 3800 to establish a connection path to the core network 140.

In this manner, in the processing mode change in the mobile base station of the communication system including the public access system 3700 which is the Non 3GPP access, the following any of the modes is selected and applied to the base station processing unit 25, in accordance with the type of a backhaul serving as a connection destination.

1) A mode operating as the femto base station that performs local access (LIPA) to the local network (when connection to the local network 110 through the local communication unit 21 can be made).

2) A mode operating as the relay node that performs remote access (RIPA) to the local network (when the cellular communication unit (core network) 22 is included, and connection to the macro RAN 130 can be made).

3) A mode operating as the femto base station that performs remote access (RIPA) to the local network via the public access (when connection to the public access system 3700 through the public access communication unit 1027).

Meanwhile, when the public access is formed by the same technique as that used at the time of the connection to the local network, particularly, such as WLAN or Ethernet (registered trademark), whether direct connection to the local network from the public access is able to be made may be verified.

That is, thereby, it is possible to perform the connection to the local network through the local access, to improve the communication efficiency of user traffic as compared to the remote access, and to reduce a traffic load of the network (particularly, core network 140).

The verification of whether the direct connection to the local network from the public access is able to be made is performed by, for example, the following method. That is, when a subnet constituting a local network is stored, and connection to the same subnet via the public access is made, when communication confirmation (for example, communication confirmation using a ping) for the LGW is made successful after network connection (before establishment with the SeGW), when an address (such as MAC address or IP address) of a connection destination access point or a router is stored in advance or acquired dynamically, and it can be detected that the address is the same as an address of an access point or a router connected in the public access, or when an identifier (such as SSID) used at the time of the connection to the local network is stored in advance, and it can be detected that the identifier is the same as an identifier used at the time of the connection to the public access, it is determined that the direct connection to the local network from the public access is able to be made.

When it is determined that the direct connection to the local network is able to be made, the switching processing unit 26 selects a mode operating as the femto base station that performs local access (LIPA), in a processing mode change step.

Meanwhile, in the configuration of the mobile base station for verifying whether the direct connection to the local network from the public access is able to be made, the public access communication unit 1027 may be integrated with the local communication unit 21.

Subsequent step S4005 (bearer modification request or bearer release command) and step S4007 (performance of subsequent process) in FIG. 40 are performed similarly to those described previously.

In addition, each functional block used for the description of each of the above-mentioned embodiments is typically realized as an LSI which is an integrated circuit. The functional blocks may be individually formed in one chip, and may be formed in one chip so as to include some or all of them. Although referred to as the LSI herein, it may also be referred to as an IC, a system LSI, a super LSI, and an ultra LSI, depending on the difference in the degree of integration.

In addition, an approach for forming an integrated circuit is not limited to the LSI, but may be realized by a dedicated circuit or a general-purpose processor. After LSI manufacturing, FPGA (Field Programmable Gate Array) capable of being programmed or a reconfigurable processor capable of reconfiguring the connection and setting of a circuit cell in the inside of the LSI may be used.

Further, when technology for forming an integrated circuit replaced with the LSI by the development of semiconductor technology or another technology derived therefrom makes its appearance, the integration of the functional block may be naturally performed using the technology. Biotechnology or the like may be possibly applied.

Although the present invention has been described in detail and with reference to specific embodiments, it will be obvious to those skilled in the art that various changes and modifications can be made without departing from the spirit and scope of the present invention.

The present application is based upon Japanese Patent Application No. 2010-202515 filed on Sep. 9, 2010, the content of which is incorporated herein by reference.

INDUSTRIAL APPLICABILITY

A communication system, a communication method, a mobile terminal, and a mobile base station device according to the present invention are capable of appropriately establishing a connection path of a mobile terminal to a local network in accordance with the connection configuration of the mobile base station, and are useful as a communication method, a mobile terminal and a mobile base station device, and the like.

REFERENCE SIGNS LIST 10a, 10b, 10c: mobile terminal
11: wireless communication unit
12: communication processing unit
13: application unit
20: mobile base station
21: local communication unit
22: cellular communication unit (core network)
23: cellular communication unit (UE)
24: LGW communication unit
25: base station processing unit
26: switching processing unit
30: LGW
31: switching processing unit
32: mobile base station communication unit
33: LGW processing unit
34: local communication unit
40: macro eNB
50: RN-MME
60: UE-MME
61: MME processing unit
63: communication unit
70: SGW
100: local RAN
110: local network
120: provider network
130: macro RAN
140: core network of operator

The invention claimed is:

1. A communication system, comprising:
a mobile base station device which is capable of accommodating a plurality of mobile terminals including a mobile terminal in an active mode and a mobile terminal in an idle mode, and connectable to a local network through a local gateway; and
a mobility management entity (MME) which is connected to a core network, and performs management of states and mobility of the plurality of mobile terminals, wherein
the local gateway detects disconnection of the mobile base station device from the local network based on a response reception from the mobile base station device, to identify the plurality of mobile terminals accommodated in the mobile base station device, and transmits a bearer modification request of the plurality of identified mobile terminals to the MME, and
based on the bearer modification request of the plurality of mobile terminals received from the local gateway, the MME performs the bearer modification request to the mobile base station device with respect to the mobile terminal in the active mode, and does not perform the bearer modification request to the mobile base station device with respect to the mobile terminal in the idle mode.

2. A communication system, comprising:
a mobile base station device which is capable of accommodating a plurality of mobile terminals including a mobile terminal in an active mode and a mobile terminal in an idle mode, and connectable to a local network; and
a mobility management entity (MME) which is connected to a core network, and performs management of states and mobility of the plurality of mobile terminals, wherein
when it is detected that a backhaul media is switched, the mobile base station device transmits identification information of the mobile base station device included in a bearer release command message established by the plurality of accommodated mobile terminals, to the MME, and
the MME identifies the plurality of mobile terminals having a bearer established, based on the identification information of the mobile base station device, and performs management of states and mobility of the plurality of identified mobile terminals.

3. A communication system, comprising:
a mobile base station device which is capable of accommodating a plurality of mobile terminals including a mobile terminal in an active mode and a mobile terminal in an idle mode, and connectable to a local network; and
a mobility management entity (MME) which is connected to a core network, and performs management of states and mobility of the plurality of mobile terminals, wherein
when it is detected that a backhaul media is switched, the mobile base station device transmits identification information of the mobile base station device included in a bearer modification request established by the plurality of mobile terminals, to the MME, and
the MME identifies the plurality of mobile terminals having a bearer established based on the identification information of the mobile base station device, wherein the MME performs the bearer modification request to the mobile base station device with respect to the mobile terminal in the active mode, and does not perform the bearer modification request to the mobile base station device with respect to the mobile terminal in the idle mode based on the bearer modification request of the plurality of mobile terminals received from a local gateway.

* * * * *